US009537341B2

(12) United States Patent
Lee

(10) Patent No.: US 9,537,341 B2
(45) Date of Patent: *Jan. 3, 2017

(54) POWER SUPPLY OUTPUT CONFIGURATION SYSTEM AND METHOD

(71) Applicant: LITE-ON, INC., Milpitas, CA (US)

(72) Inventor: Victor K. J. Lee, Milpitas, CA (US)

(73) Assignee: LITE-ON, INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,754

(22) Filed: Oct. 28, 2015

(65) Prior Publication Data

US 2016/0049822 A1  Feb. 18, 2016

Related U.S. Application Data

(63) Continuation-in-part of application No. 14/843,880, filed on Sep. 2, 2015, now Pat. No. 9,444,280, which is
(Continued)

(51) Int. Cl.
*H02J 7/00* (2006.01)
*H02J 9/06* (2006.01)
(Continued)

(52) U.S. Cl.
CPC .............. *H02J 7/0068* (2013.01); *G06F 1/30* (2013.01); *H02J 9/06* (2013.01); *H02J 9/061* (2013.01); *H02J 9/062* (2013.01); *H02M 7/44* (2013.01)

(58) Field of Classification Search
None
See application file for complete search history.

(56) References Cited

U.S. PATENT DOCUMENTS 9,047,075 B1   6/2015   Lee
9,047,076 B1   6/2015   Lee
(Continued)

FOREIGN PATENT DOCUMENTS

DE           3031981 A1   4/1982
DE       10200802422 A1   2/2009
(Continued)

OTHER PUBLICATIONS

EPO, European Search Report for EP1419244 dated Jul. 10, 2015.
EPO, European Search Report for EP14199267 dated May 7, 2015.

*Primary Examiner* — Kim Huynh
*Assistant Examiner* — Vincent Chang
(74) *Attorney, Agent, or Firm* — David W. Carstens; Kevin M. Klughart; Carstens & Cahoon, LLP

(57) ABSTRACT

A power supply output configuration system/method providing a digitally controlled uninterruptable power supply (UPS) to protected load devices (PLD) configured as power supply units (PSU) serviced by one or more power supply sources (PSS) is disclosed. The system generally includes a number of power supply sources (PSS) that are monitored by power condition sensing (PCS) circuitry that determines individual power source states within the PSS. This physical state information is used by a digitally controlled switching network (DSN) that reconfigures the electrical connections between the PSS and the individual PLD elements to properly route power from the PSS to the PLD in the event of individual PSS failures. The DSN receives phase/voltage state information from the PSS to ensure that current between the PSS and PLD is transferred in a synchronized manner and that PSS resources are properly protected during the switching transition.

40 Claims, 64 Drawing Sheets

Related U.S. Application Data a continuation of application No. 14/565,754, filed on Dec. 10, 2014, which is a continuation-in-part of application No. 14/509,454, filed on Oct. 8, 2014, now Pat. No. 9,047,075, which is a continuation of application No. 14/461,110, filed on Aug. 15, 2014, now Pat. No. 9,047,076.

(60) Provisional application No. 62/245,807, filed on Oct. 23, 2015, provisional application No. 61/922,311, filed on Dec. 31, 2013.

(51) Int. Cl.
  *H02M 7/44* (2006.01)
  *G06F 1/30* (2006.01)

(56) References Cited

U.S. PATENT DOCUMENTS

| | | |
|---|---|---|
| 2004/0164618 A1 | 8/2004 | Bryde |
| 2006/0050465 A1 | 3/2006 | Cho et al. |
| 2010/0180139 A1 | 7/2010 | Denney et al. |
| 2011/0291606 A1 | 12/2011 | Lee |
| 2012/0081078 A1 | 4/2012 | Matsumura et al. |
| 2012/0086269 A1 | 4/2012 | Nakano et al. |
| 2013/0020872 A1 | 1/2013 | Kinnard |
| 2013/0141828 A1 | 6/2013 | Yamaguchi et al. |
| 2013/0246815 A1 | 9/2013 | Uehara |

FOREIGN PATENT DOCUMENTS

| | | |
|---|---|---|
| EP | 2833504 A1 | 2/2015 |
| KR | 101322617 B1 | 10/2013 |

Traditional Offline UPS

*Prior Art*

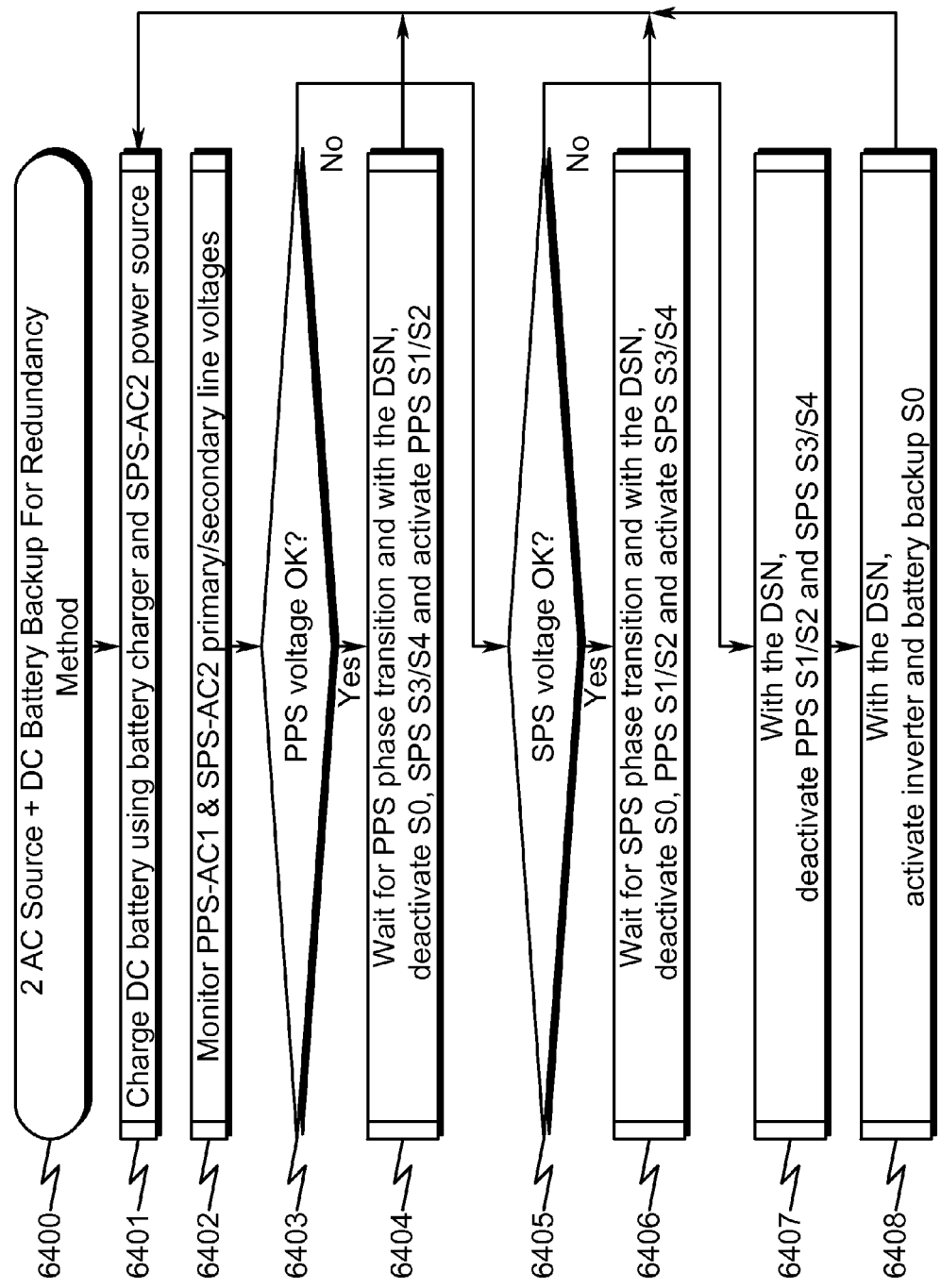

POWER SUPPLY OUTPUT CONFIGURATION SYSTEM AND METHOD

CROSS REFERENCE TO RELATED APPLICATIONS

Continuation-in-Part Patent Application (CIP)

This is a continuation-in-part (CIP) patent application of and incorporates by reference United States Utility Patent Application for POWER SUPPLY OUTPUT CONFIGURATION SYSTEM AND METHOD by inventor Victor K. J. Lee, filed electronically with the USPTO on Dec. 10, 2014, with Ser. No. 14/565,754, EFSID 20919171, confirmation number 2974.

Continuation Chain

The United States Utility patent application for POWER SUPPLY OUTPUT CONFIGURATION SYSTEM AND METHOD Ser. No. 14/565,754 is a continuation-in-part of United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198.

Utility Patent Applications

This application claims benefit under 35 U.S.C. §120 and incorporates by reference United States Utility patent application for POWER SUPPLY OUTPUT CONFIGURATION SYSTEM AND METHOD by inventor Victor K. J. Lee, filed electronically with the USPTO on Dec. 10, 2014, with Ser. No. 14/565,754, EFSID 20919171, confirmation number 2974.

This application claims benefit under 35 U.S.C. §120 and incorporates by reference United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198.

This application claims benefit under 35 U.S.C. §120 and incorporates by reference United States Utility patent application for UNINTERRUPTABLE POWER SUPPLY SYSTEM AND METHOD by inventor Victor K. J. Lee, filed electronically with the USPTO on Oct. 8, 2014, with Ser. No. 14/509,454, EFSID 20358607, confirmation number 3152.

Provisional Patent Applications

This application claims benefit under 35 U.S.C. §119 and incorporates by reference United States Provisional patent application for POWER SUPPLY OUTPUT CONFIGURATION SYSTEM AND METHOD by inventor Victor K. J. Lee, filed electronically with the USPTO on Oct. 23, 2015, with Ser. No. 62/245,807, EFS ID 23881058, confirmation number 6409.

This application claims benefit under 35 U.S.C. §119 and incorporates by reference United States Provisional patent application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated with uninterruptable power supplies (UPS). Specifically, the present invention relates in some preferred embodiments to UPS power supply output configuration systems/methods as applied to large computing data centers.

PRIOR ART AND BACKGROUND OF THE INVENTION

Within the context of modern data centers there is a need to provide for uninterrupted power to protected load devices that are serviced by power supply units (PSU). The PSU architecture described in United States patent applications incorporated by reference herein (Ser. Nos. 14/461,110 and 14/509,454) may be configured in a variety of ways to ensure that this requirement for uninterrupted protected load power supply is achieved. The present invention describes a variety of power supply output configuration systems/methodologies to achieve this desired result.

BRIEF SUMMARY OF THE INVENTION

The present invention augments the AC+DC power supply configurations detailed in United States patent applications incorporated by reference herein (Ser. Nos. 14/461,110 and 14/509,454) by providing for a variety of systems and methods to ensure uninterrupted service to protected load devices via monitoring of power supply sources (PSS) and digitally controlled switching of these PSS to AC+DC power supplies that service the protected load devices.

BRIEF DESCRIPTION OF THE DRAWINGS

For a fuller understanding of the advantages provided by the invention, reference should be made to the following detailed description together with the accompanying drawings wherein:

FIG. 64 illustrates a flowchart depicting a preferred exemplary invention method embodiment implementing general output configuration processing.

DESCRIPTION OF THE PRESENTLY PREFERRED EXEMPLARY EMBODIMENTS

Figure 1:
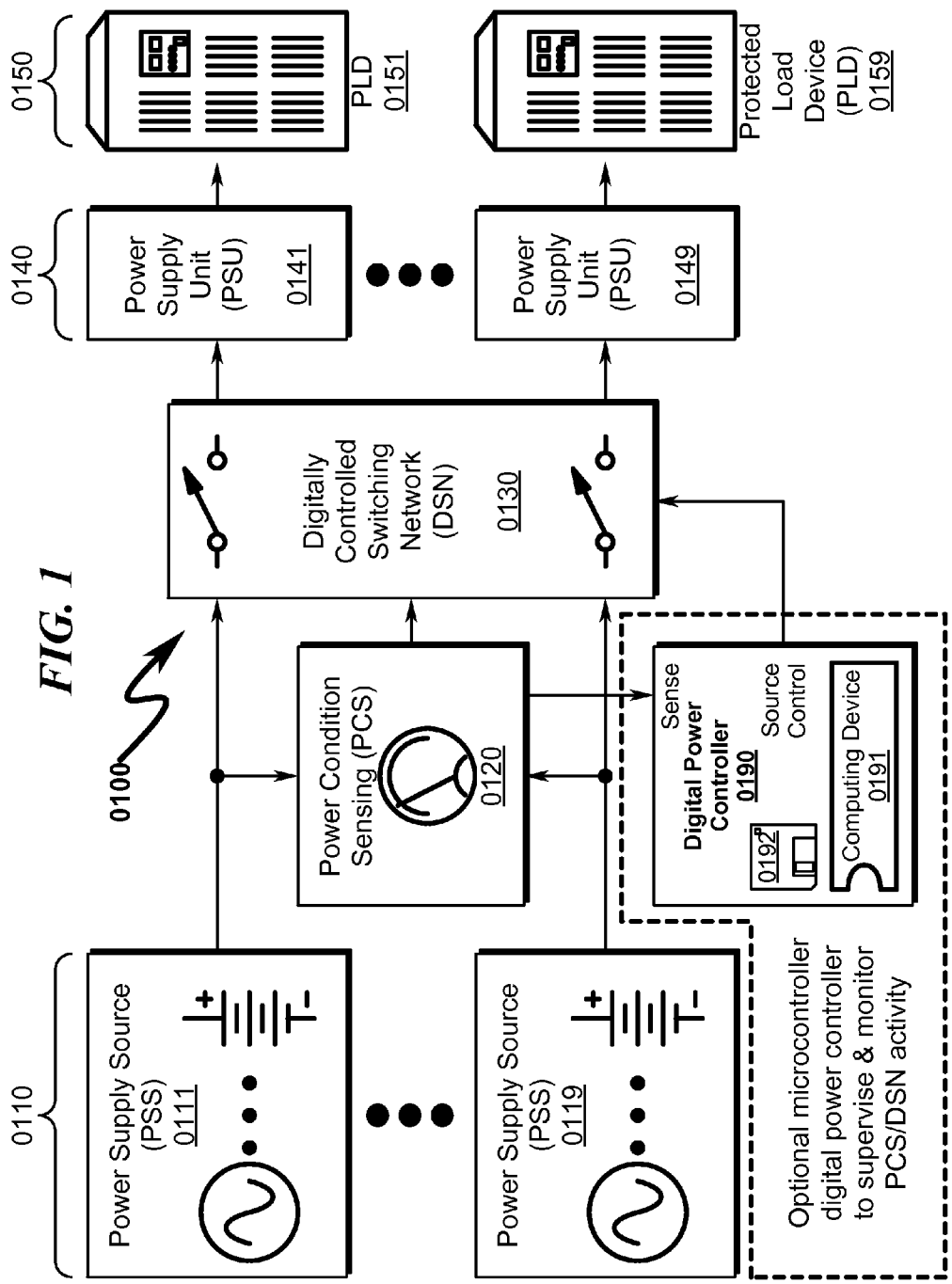
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a POWER SUPPLY OUTPUT CONFIGURATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Switch Methodology not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, IGBTs, etc.

Control System not Limitive

The present invention may utilize a wide variety of constructs when implementing the power controller described herein. Many preferred invention embodiments may utilize a computerized control mechanism wherein the computer system executes machine instructions read from a tangible, non-transitory, computer readable medium.

PSU Limitive

The present invention describes controlled connections between power supply sources (PSS) and protected load devices (PLD). In this context the PLDs are limited in scope to power supply units (PSU) as described in United States Provisional patent application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260, docket AKJIM.0102, and incorporated herein by reference. Thus, the system described herein is designed as a "front-end" to the uninterruptable power supply (UPS) systems described in this referenced patent application.

DSN Timing Limitive

The present invention describes controlled connections between power supply sources (PSS) and protected load devices (PLD) serviced by a power supply unit (PSU) via the use of a digitally controlled switching network (DSN) that utilizes input from power condition sensing (PCS) circuitry. The switch timing described herein is limited to situations in which switching connection reconfigurations between the PSS and PSU are accomplished within one to two AC phase cycles. This timing requirement for switchover is approximately 0.020-0.040 seconds for 50 Hz AC systems and approximately 0.017-0.035 seconds for 60 Hz AC systems. While this limitation may be accomplished utilizing the hardware and equivalents described herein, it is not possible to achieve this functionality using manual or human operations. As such, the present invention and associated claims are strictly limited to automated hardware mechanisms that can meet this switch timing requirement.

System Overview (0100)

A preferred exemplary system embodiment of the present invention is depicted in FIG. 1 (0100). In this application context, a number of power supply sources (PSS) (0110, 0111, 0119) (typically comprising a primary power source (PPS) and a secondary power source (SPS)) are used to service a number of power supply units (PSU) (0140, 0141, 0149) that supply power to one or more protected load devices (0150, 0151, 0159). Within this context the power supply sources (PSS) (0110, 0111, 0119) are monitored by power condition sensing (PCS) circuitry (0120) that provide input to a digitally controlled switching network (DSN) (0130) that interconnect the power supply sources (PSS) (0110, 0111, 0119) with the power supply units (PSU) (0140, 0141, 0149).

The power supply units (PSU) (0140, 0141, 0149) are AC+DC power supplies as described in United States Utility patent application for UNINTERRUPTABLE POWER SUPPLY SYSTEM AND METHOD by inventor Victor K. J. Lee, filed electronically with the USPTO on Aug. 15, 2014, Ser. No. 14/461,110 and United States Utility patent application for UNINTERRUPTABLE POWER SUPPLY SYSTEM AND METHOD by inventor Victor K. J. Lee, filed electronically with the USPTO on Oct. 8, 2014, Ser. No. 14/509,454, incorporated herein by reference. In this context, the present invention describes systems and methods of configuring the UPS power supply systems in these prior applications that provide for UPS service to protected devices via failover switching of PSS to PSU devices. This failover switching comprises power condition sensing circuitry (0120) that monitors the PSS and a digitally controlled switching network (0130) that interconnects the PSS with the PSU.

As described in incorporated United States patent applications (Ser. Nos. 14/461,110 and 14/509,454), the use of a power controller (0190) comprising a microcontroller digital computing device (0191) that executes machine instructions read from a computer readable medium (0192) may be used in conjunction with the power condition sensing (PCS) circuitry (0120) and the digitally controlled switching network (DSN) (0130) to configure power connections between the power supply sources (PSS) (0110, 0111, 0119) and the AC+DC power supply units (PSU) (0140, 0141, 0149) and the protected load devices (PLD) (0150, 0151, 0159) that the PSU (0140, 0141, 0149) services. The digital computing device (0191) may be used to incorporate or augment the PCS (0120) and the control interface to activate and configure the DSN (0130).

Method Overview (0200)

Figure 2:
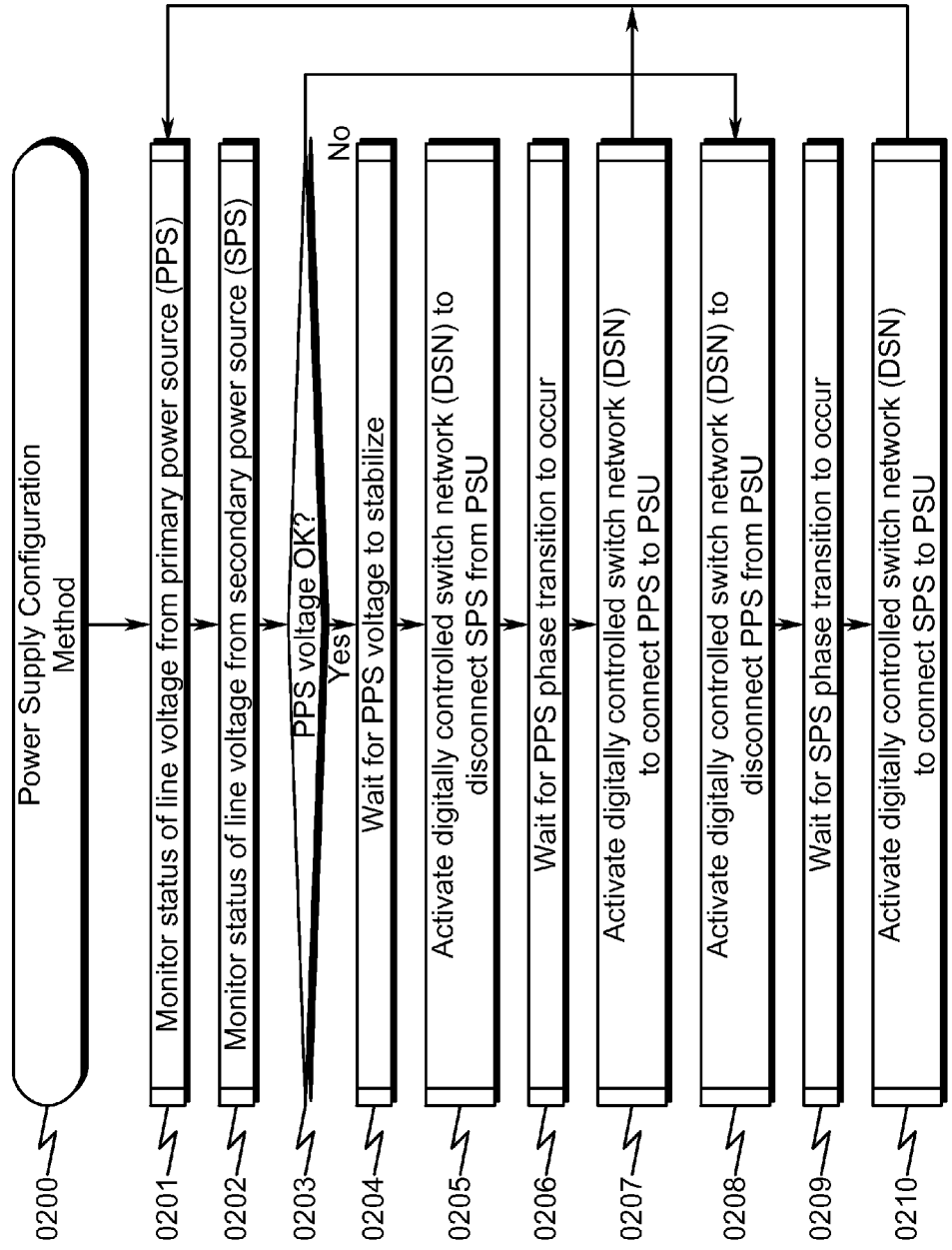
FIG. 2 illustrates a flowchart of a preferred exemplary method embodiment of the present invention.

The system context as depicted in FIG. 1 (0100) is typically associated with an overall methodology as depicted in FIG. 2 (0200) and involves the following steps:
(1) With the PCS circuit, monitoring the status of line voltage from a primary power source (PPS) (0201);
(2) With the PCS circuit, monitoring the status of line voltage from a secondary power source (SPS) (0202);
(3) Determining if the PPS voltage is within predetermined limits, and if not, proceeding to step (8) (0203);
(4) Waiting for the PPS voltage to stabilize (0204);
(5) Activating the DSN to disconnect the SPS from the PSU (0205);
(6) Waiting for a PSS phase transition to occur (0206);
(7) Activating the DSN to connect the PPS to the PSU and proceeding to step (1) (0207);
(8) Activating the DSN to disconnect the PPS from the PSU (0208);
(9) Waiting for SPS phase transition to occur if the SPS is an AC source (0209); and
(10) Activating the DSN to connect the SPS to the PSU and proceeding to step (1) (0210).
One skilled in the art will recognize that these method steps may be augmented or rearranged without limiting the teachings of the present invention. This general method overview may be augmented by the various elements described herein to produce a wide variety of invention embodiments consistent with this overall design description.

Exemplary Power Condition Sensing (PCS) (0300)

As depicted generally in FIG. 1 (0100), the power condition sensing (PCS) (0120) operates to monitor the power condition of the power supply sources (PSS) (0110, 0111, 0119). In a typical configuration, the PCS (0120) is configured to monitor at least one primary power source (0111).

Figure 3:
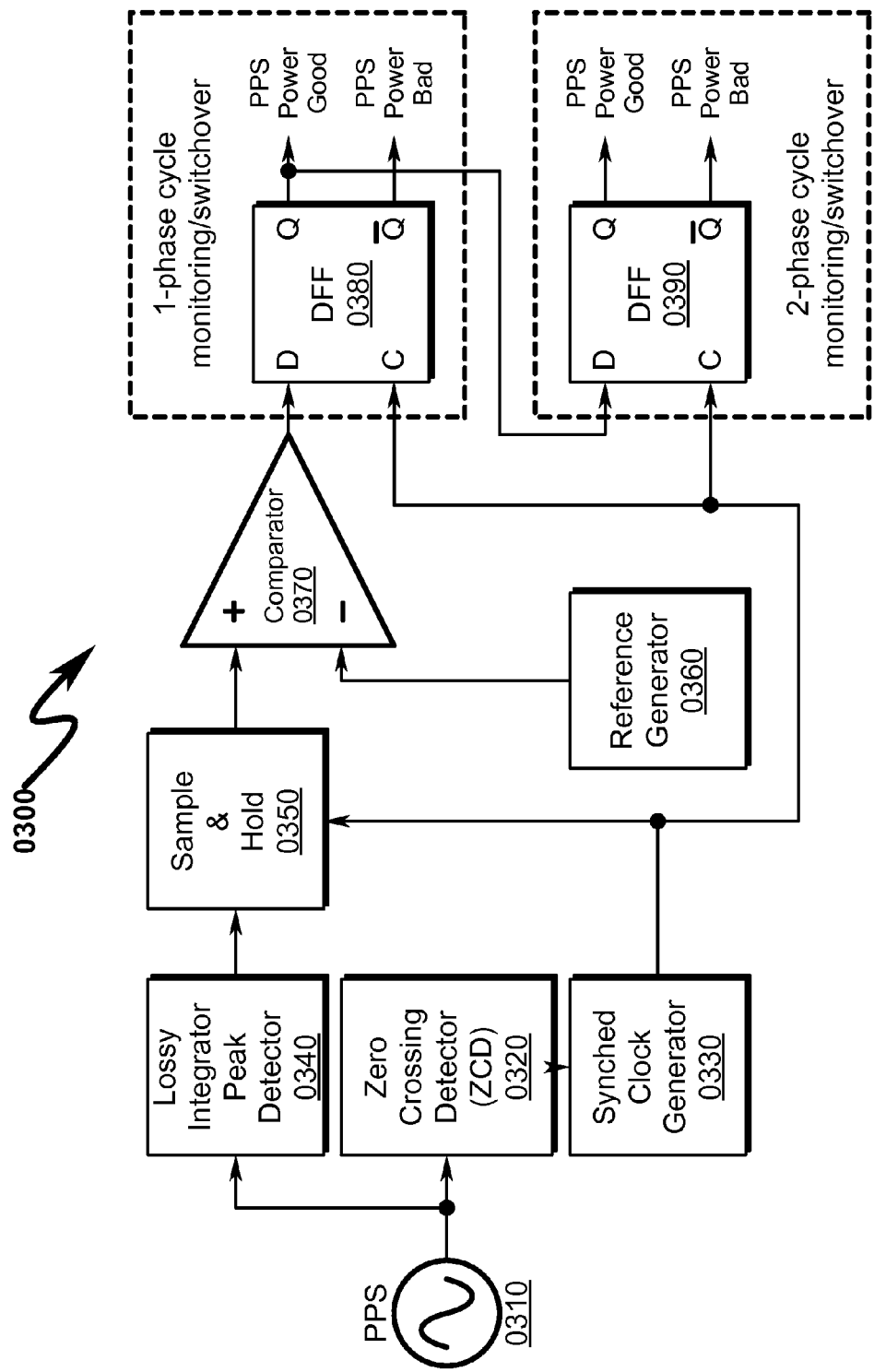
FIG. 3 illustrates a block diagram of a preferred exemplary system embodiment of the present invention detailing a power condition sensing (PCS) subsystem embodiment.

As depicted in FIG. 3 (0300), a typical PCS implementation monitors a PPS (0310) AC source in the following manner. The PPS (0310) output is processed by a zero crossing detector (ZCD) (0320) to determine positive and negative AC phase timing of the PPS (0310) AC signal. This phase information is then used to synchronize a clock generator (0330) that is used as a sampling clock for the output of a lossy integrator peak detector (0340). The clock generator (0330) is configured to operate at approximately a multiple of the line frequency of the PPS (0310) and so synchronizing it to the PPS (0310) source permits a sampling clock edge within the envelope of the PPS (0310) waveform to be reliably located. It is this sampling clock (0310) edge that determines when the PPS (0310) voltage is sampled for measurement.

The lossy integrator peak detector (0340) integrates a positive (or negative) portion of the AC waveform from the PPS (0310) output and holds this (with a sample and hold (0350) or equivalent circuit). This sampled positive or negative peak from the PPS (0310) output is then compared with the output of a reference generator (0360) with a digital comparator (0370). The digital output of this comparator (0370) is latched by a flip-flop (0380) to produce signals which indicate complementary PPS power good and PPS power bad.

Note that the configuration depicted will determine if a 1-phase cycle power good condition is achieved (0380). The system may also incorporate a second flip-flop (0390) to delay the activation of the DSN until at least one full PPS AC phase has been detected as being "good" before switching of the DSN is activated. This switchover delay may be modified to incorporate additional delay with additional flip-flop stages in some preferred invention embodiments. One skilled in the art will recognize that this delay may also incorporate some absolute time delay as well in addition to a detected phase count delay.

Exemplary Configuration Control Operation (0400)

Figure 4:
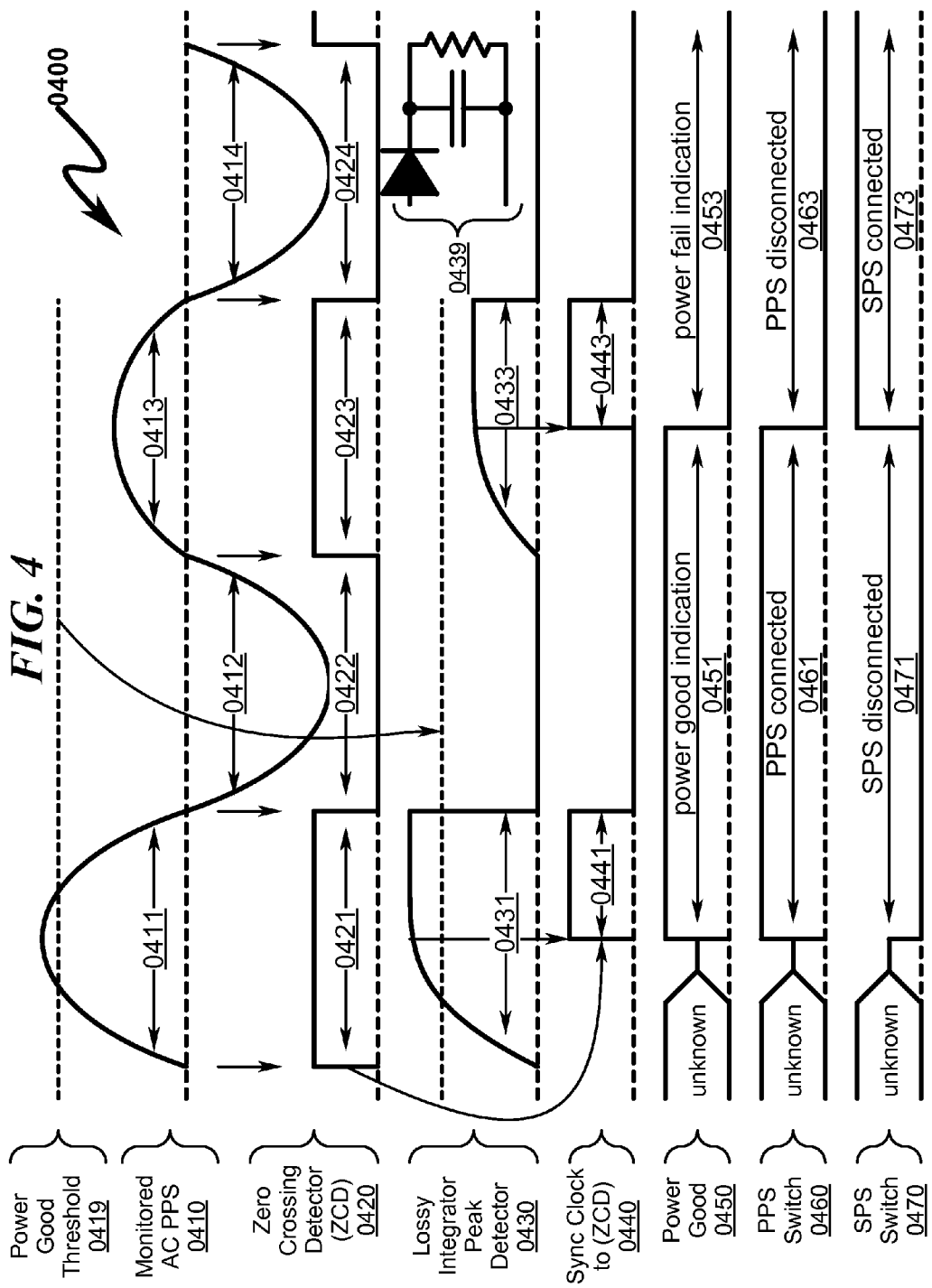
FIG. 4 illustrates typical waveforms and control signals associated with an exemplary PCS subsystem embodiment.

As depicted generally in FIG. 1 (0100), the power condition sensing (PCS) (0120) operates in conjunction with the digitally controlled switching network (DSN) (0130) to configure connections between the power supply sources (PSS) (0110, 0111, 0119) and the power supply units (0140, 0141, 0149) to service the protected load devices (PLDs) (0150, 0151, 0159). FIG. 4 (0400) depicts typical waveforms associated with monitored PSS in the context of a typical PPS and SPS.

In this example, a monitored AC PPS (0410) is associated with a power good threshold (0419) that defines the point in a positive transition phase where PPS voltage is considered acceptable. During the first positive phase (0411) the voltage meets the power good threshold (PGT) (0419) but during the second positive phase (0413) the voltage does not meet the power good threshold (PGT) requirement. For each AC phase polarity (0411, 0412, 0413, 0414) a zero crossing detector (ZCD) (0420) is configured to generate a digital signal corresponding to positive phase (0421, 0423) and negative phase (0422, 0424) states. The output of the ZCD (0420) is used to synchronize detection of voltage levels within the PPS.

A lossy integrator peak detector (0430) is configured to detect the voltage level of the PSP as depicted and may be configured in a variety of ways including the circuitry (0439) depicted in the figure. While only positive peak detection for two peaks (0431, 0433) is depicted, a similar circuit (0439) (not illustrated, but using a reversed diode) may be used to detect negative peak voltage levels for negative phase peaks.

A clock generator (0440) that is synchronously gated to the zero crossing detector (ZCD) (0430) is configured to edge clock (0441, 0443) within the internal region of the lossy integrator peak detector (0430) waveform envelopes (0431, 0433) to capture the state of the positive phase waveform voltages (0411, 0413). This captured voltage state is then latched for a phase cycle as a power good signal (PGS) (0450) which may indicate a power good condition (0451) or a power fail condition (0453).

Once the PPS power condition has been determined, the DSN activates the appropriate PPS switch (0460) to activate the PPS connection (when the PPS power is good) (0461) and deactivate the PPS connection (when the PPS power is bad) (0463). The DSN in a complementary fashion also activates the appropriate SPS switch (0470) to activate the SPS connection (when the PPS power is bad) (0473) and deactivate the SPS connection (when the PPS power is good) (0471).

Exemplary Zero Crossing Detector (ZCD) (0500)

Figure 5:
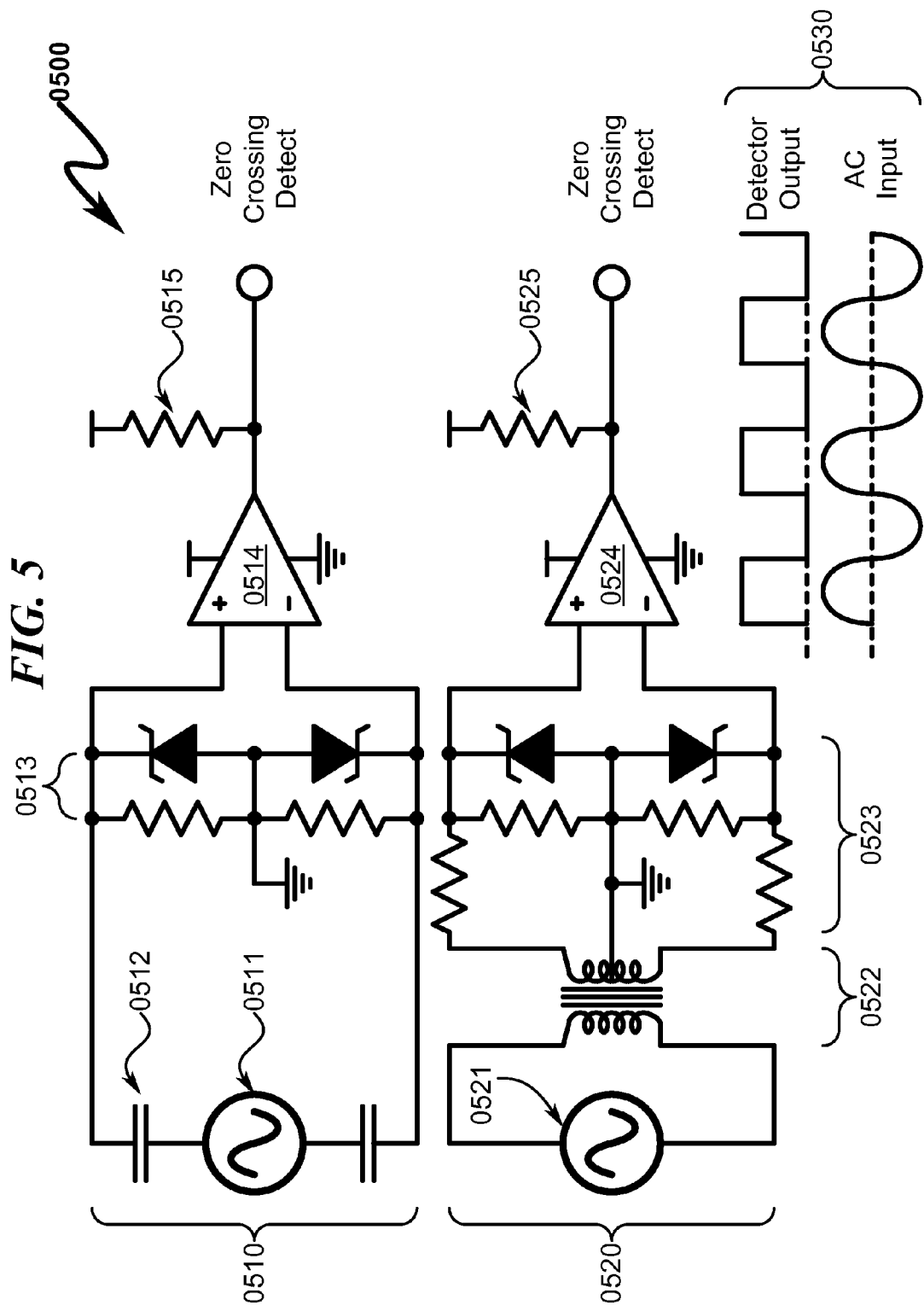
FIG. 5 illustrates a schematic of a preferred exemplary system embodiment of the present invention detailing a power condition sensing (PCS) zero crossing detector embodiment.

While many implementations of a zero crossing detector (ZCD) are possible with respect to the generalized system block diagram of FIG. 3 (0300), two possible implementations are depicted in FIG. 5 (0500). One depicted embodiment (0510) implements detection of the PSS (0511) using capacitive coupling (0512) to a clipping network (0513) that is input to a digital comparator (0514). Another depicted embodiment (0520) implements detection of the PSS (0521 using inductive coupling (0522) to a clipping network (0523) that is input to a digital comparator (0524). Pullup resistors (0515, 0525) condition the comparator (0514, 0524) output to digital levels. Exemplary input and detection waveforms (0530) are illustrated for reference purposes.

Exemplary Voltage Detector/Switch Control (0600)

Figure 6:
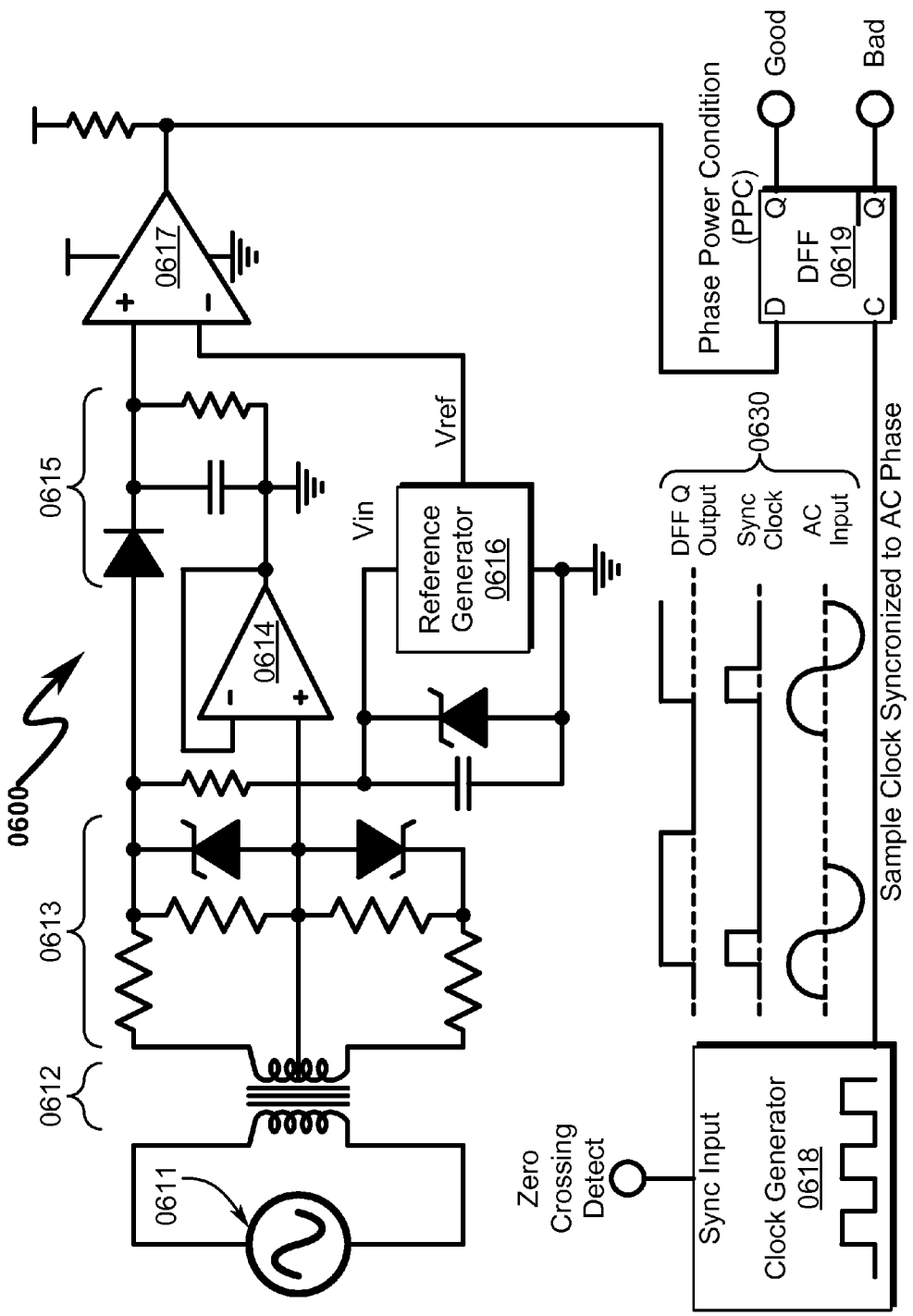
FIG. 6 illustrates a schematic of a preferred exemplary system embodiment of the present invention detailing a power condition sensing (PCS) threshold detector and power good/bad sampling detector embodiment.

Various elements of the system block diagram depicted in FIG. 3 (0300) that implement voltage sensing for the PPS are depicted in FIG. 6 (0600). In this exemplary voltage detection and switch control schematic, the power supply source (0611) is isolated from the detector inductively (0612) and processed through a clipping voltage divider network (0613). The output of this voltage divider network (0613) is used by an operational amplifier (0615) to form a virtual ground that is used by a lossy integrator peak detector (0615). The output of this lossy integrator peak detector (0615) is compared with a voltage reference generator (0616) reference output by a digital comparator (0617). The output of this digital comparator (0617) will vary based on the phase voltage timing of the PSS (0611) source.

To determine the proper timing to measure the PSS (0611) voltage a clock generator (0618) synchronized to the PSS (0611) generates a pulse train that clocks a flip flop (0619) during the mid-phase portion of the PSS (0611) AC waveform and latches the comparator (0617) output at this mid-phase time. The output of the flip-flop (0619) (interpreted as active high) produces phase power good/bad status that may be used by the digitally controlled switching network (DSN) to activate/deactivate connections between the PSS and downstream AC+DC power supply units (PSUs).

As illustrated by the exemplary timing waveforms (0630) in FIG. 6 (0600), the sample timing provided by the synchronized clock generator (0618) in conjunction with reference voltages produced by the reference generator (0616) ensure that the flip-flop (0619) outputs reflect a failure of the PSS (0611) within one phase cycle of the AC input. This permits rapid activation of the DSN to alternate power sources to ensure that the protected load devices are not subject to power disruptions.

Exemplary UPS System Integration (0700)

Figure 7:
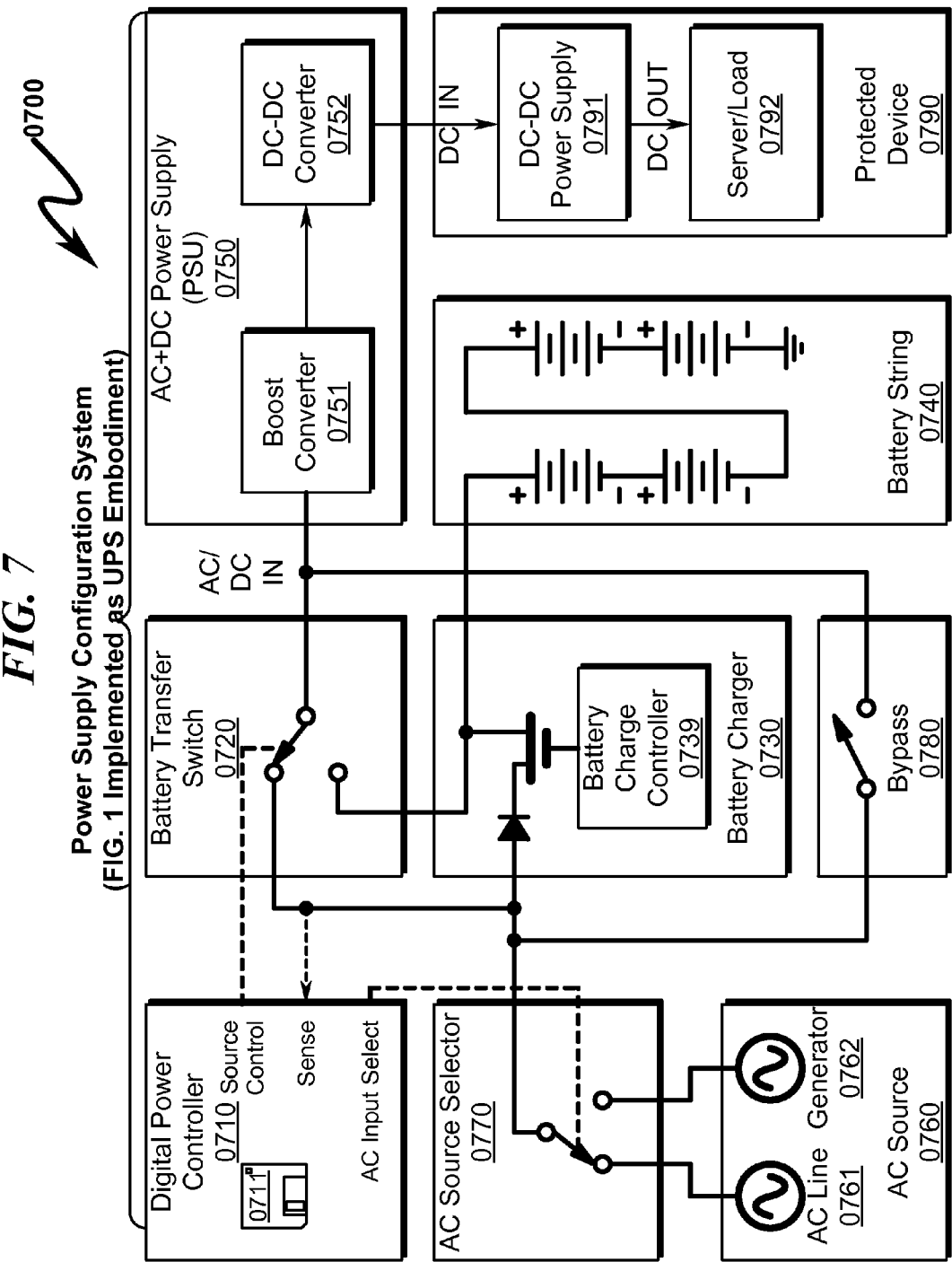
FIG. 7 illustrates a block diagram of a preferred exemplary system embodiment of the present invention as integrated within the UPS AC+DC power supply architecture described further in United States patent applications incorporated by reference herein (Ser. Nos. 14/461,110 and 14/509,454)

FIG. 7 (0700) illustrates integration of the power supply output configuration system (as depicted from FIG. 1 (0100)) within the context of the UPS architecture described in incorporated United States patent applications (Ser. Nos. 14/461,110 and 14/509,454). Here the power controller (0710), battery transfer switch (0720), battery charger (0730), AC+DC power supply (PSU) (0750), AC source selector (0770), and bypass (0780), are connected and controlled as described herein using PCS source sense and source control hardware to affect switching within the DSN. FIG. 7 (0700) illustrates only one back-end implementation of the UPS system supported by the present invention. Others described within the incorporated patent applications are also amenable to incorporation of the power supply output configuration system as depicted in FIG. 7 (0700) and in other drawings within the present invention patent application.

Exemplary DSN Switch Implementations (0800)

Figure 8:
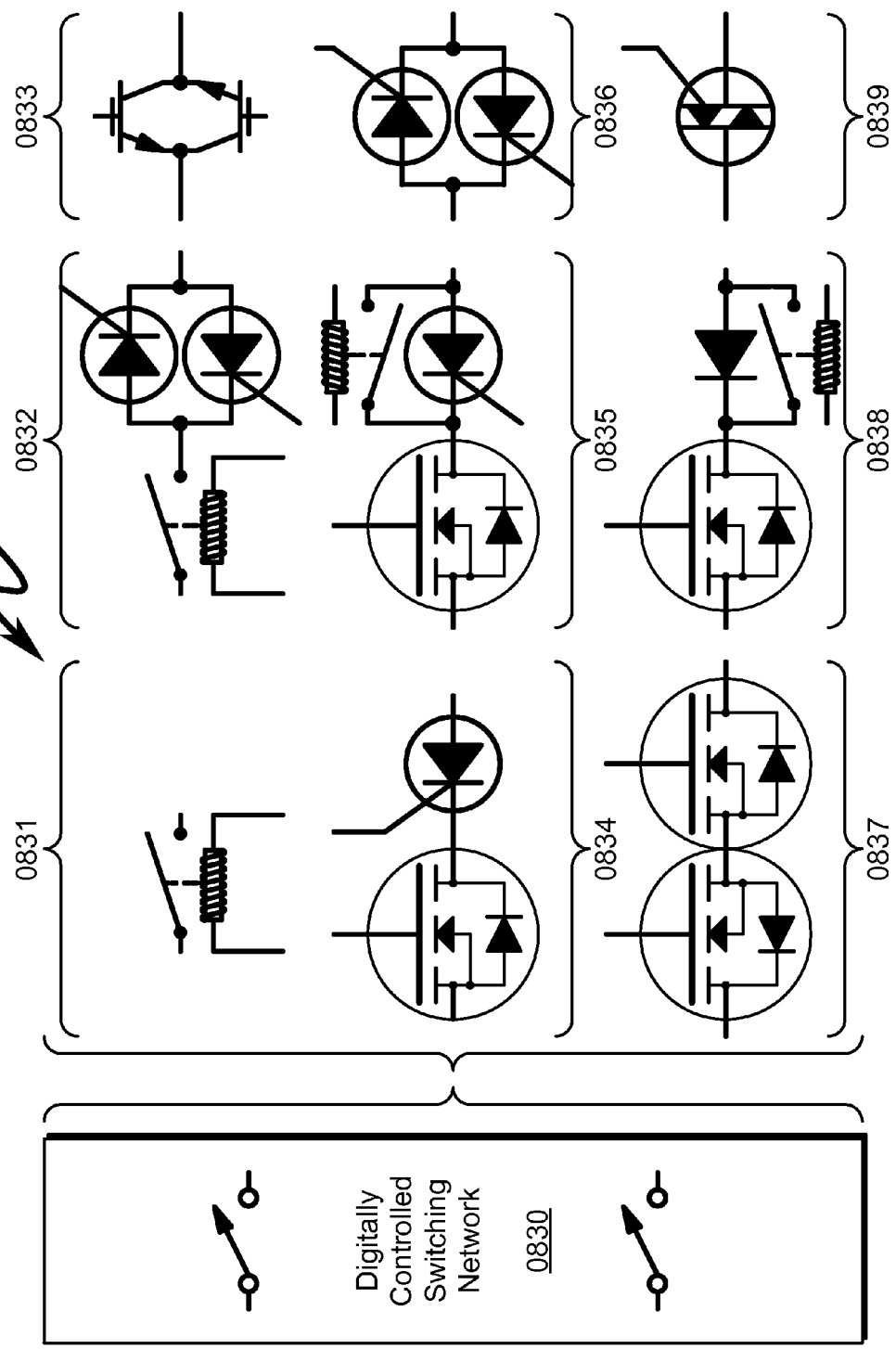
FIG. 8 illustrates exemplary implementations of switching elements utilized within the digitally controlled switching network.

The digitally controlled switching network (DSN) used to interconnect the PSS and the PSU may incorporate a wide variety of switching functions that may be implemented using a variety of components. Some exemplary switch implementations are depicted in FIG. 8 (0800) wherein the digitally controlled switching network (0830) is illustrated as incorporating one or more of the following circuit components:
  conventional relay or contactor (0831);
  conventional relay/contactor in series with complementary silicon controlled rectifiers (SCRs) (0832);
  complementary insulated gate bipolar transistors (IGBTs) (used singly or in complementary fashion as depicted)

or complementary bipolar transistors (connected as per the illustrated IGBTs) (0833);

MOSFET in series with a silicon controlled rectifier (SCR) (used singly as depicted or in complementary fashion as depicted in (0836)) (0834);

MOSFET in series with a silicon controlled rectifier (SCR) (used singly as depicted or in complementary fashion as depicted in (0836)) with a switch shunting the SCR for the purposes of terminating SCR conduction (0835);

complementary silicon controlled rectifiers (SCRs) (0836);

series MOSFETs (configured using NCH/NCH (as depicted), PCH/PCH, or NCH/PCH device types) (0837);

MOSFET in series with a diode that is shunted by a relay/contactor (0838); and/or

TRIAC (0839).

One skilled in the art will recognize that this list of switching components is non-exhaustive and only illustrative of some preferred switching configurations.

Exemplary Embodiments (0900)-(4800)

Figure 9:
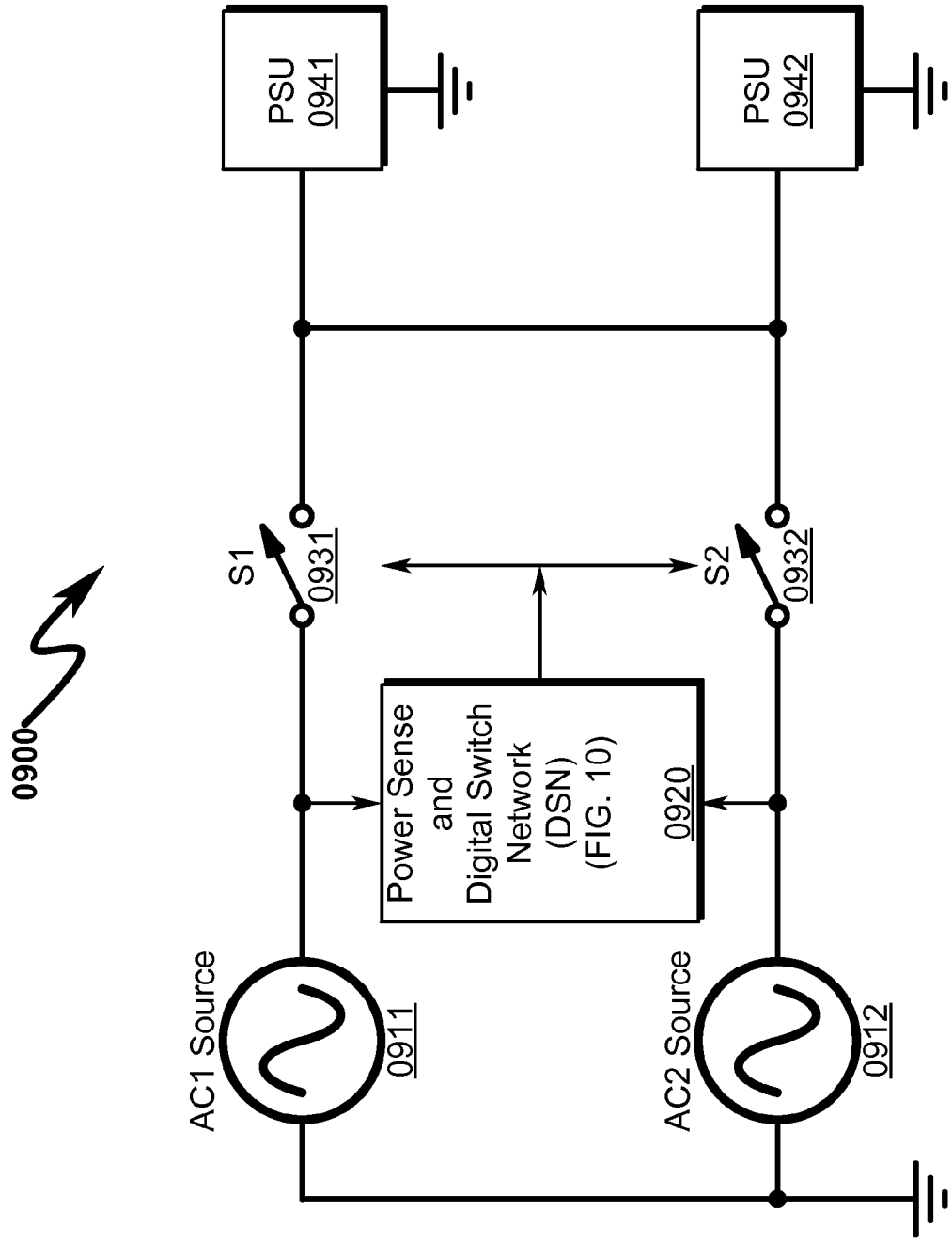
FIG. 9 illustrates an exemplary schematic diagram depicting a preferred system embodiment implementing a Dual AC Input System with Full Input Protection.

The general power supply output configuration system/method depicted in FIG. 1 (0100)-FIG. 7 (0700) may be implemented in a wide variety of specific and preferred configurations. FIG. 9 (0900)-FIG. 48 (4800) depict a variety of preferred exemplary invention system/method embodiments and serve as a general guideline in implementing the features of the present invention in a variety of application contexts.

Dual AC Input System—Full Input Protection (0900)-(1000)

Figure 10:
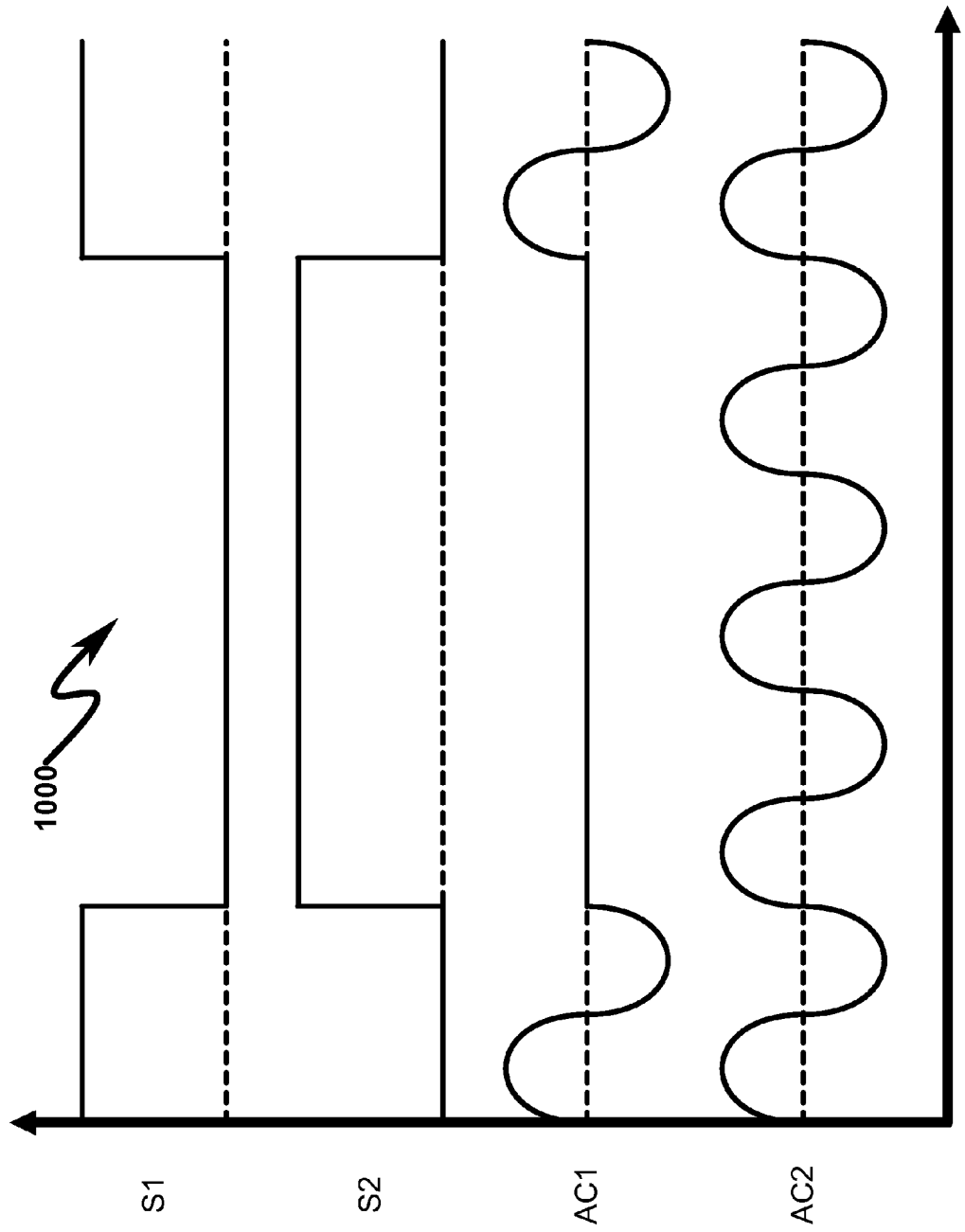
FIG. 10 illustrates exemplary power condition sensing and control waveforms associated with the schematic of FIG. 9.

FIG. 9 (0900)-FIG. 10 (1000) depict a power supply output configuration backup mechanism with two AC sources (0911, 0912) that supply power to two PSUs (0941, 0942) with full source protection. The power condition sense and digital switch network (DSN) (0920) functionality is depicted in FIG. 10 (1000) and ensures that all PSUs (0941, 0942) are source protected and that selection of the AC source (0911, 0912) is realized through on/off control of complementary switches S1 (0931) and S2 (0932).

Dual AC Input System—Partial Input Protection (1100)-(1200)

Figure 11:
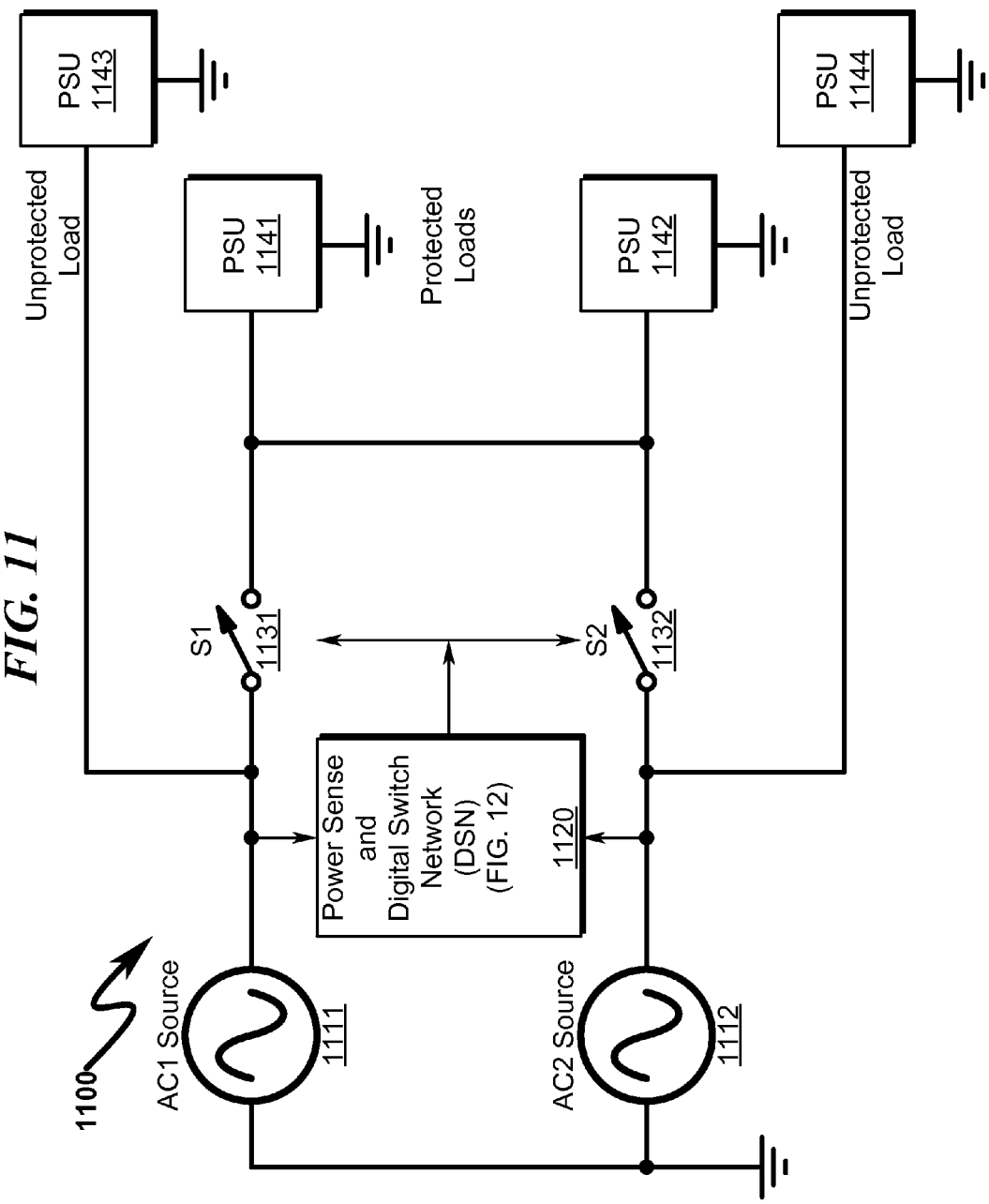
FIG. 11 illustrates an exemplary schematic diagram depicting a preferred system embodiment implementing a Dual AC Input System with Partial Input Protection.
Figure 12:
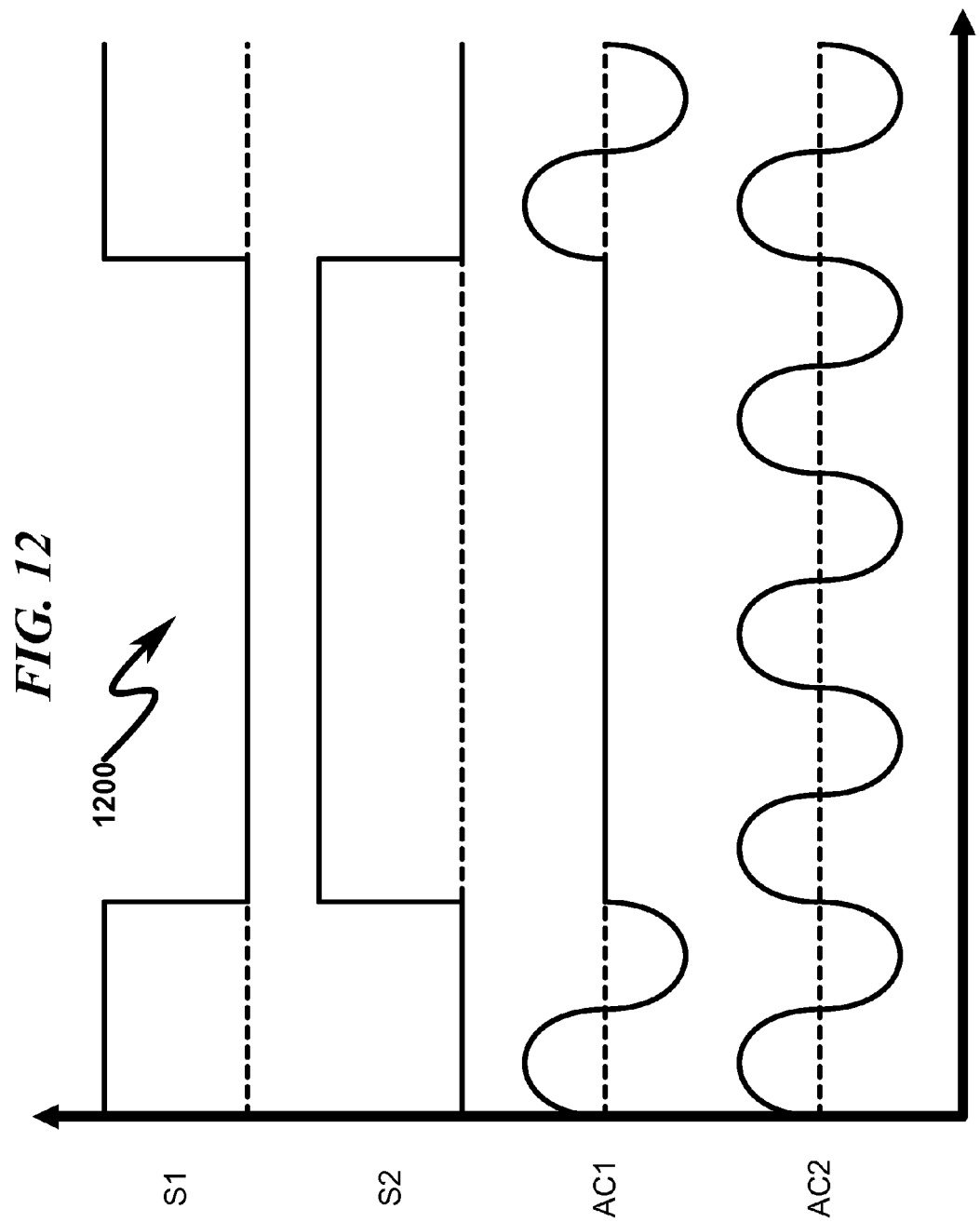
FIG. 12 illustrates exemplary power condition sensing and control waveforms associated with the schematic of FIG. 11.

FIG. 11 (1100)-FIG. 12 (1200) depict a power supply output configuration backup mechanism with two AC sources (1111, 1112) that supply power to four PSUs (1141, 1142, 1143, 1144) with full source protection to two PSUs (1141, 1142) and no source protection for the remaining two PSUs (1143, 1144). The power condition sense and digital switch network (DSN) (1120) functionality is depicted in FIG. 12 (1200) and ensures that some PSUs (1141, 1142) are source protected and other PSUs (1143, 1144) are not protected and that selection of the AC source (1111, 1112) is realized through on/off control of complementary switches S1 (1131) and S2 (1132).

Dual AC Input System—Manual Bypass (1300)-(1400)

Figure 13:
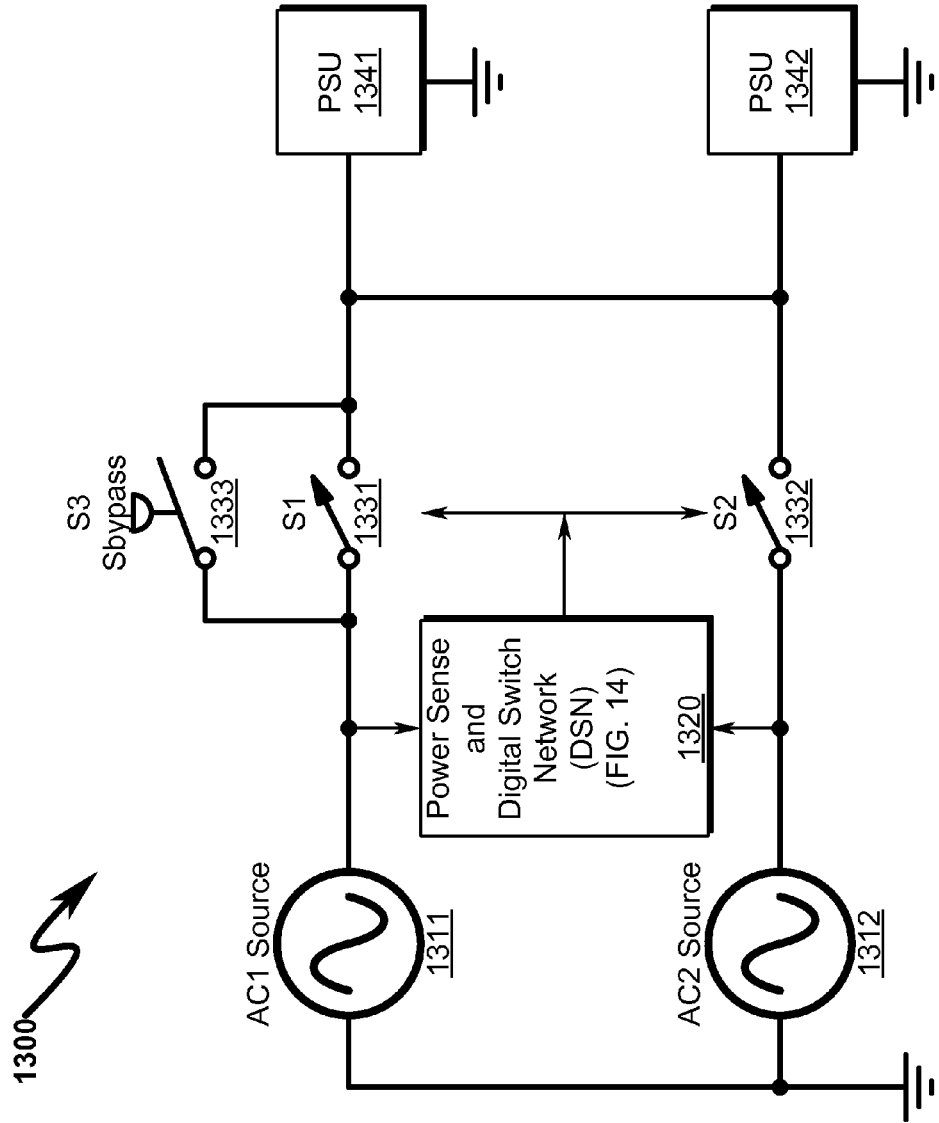
FIG. 13 illustrates an exemplary schematic diagram depicting a preferred system embodiment implementing a Dual AC Input System with Manual Bypass.
Figure 14:
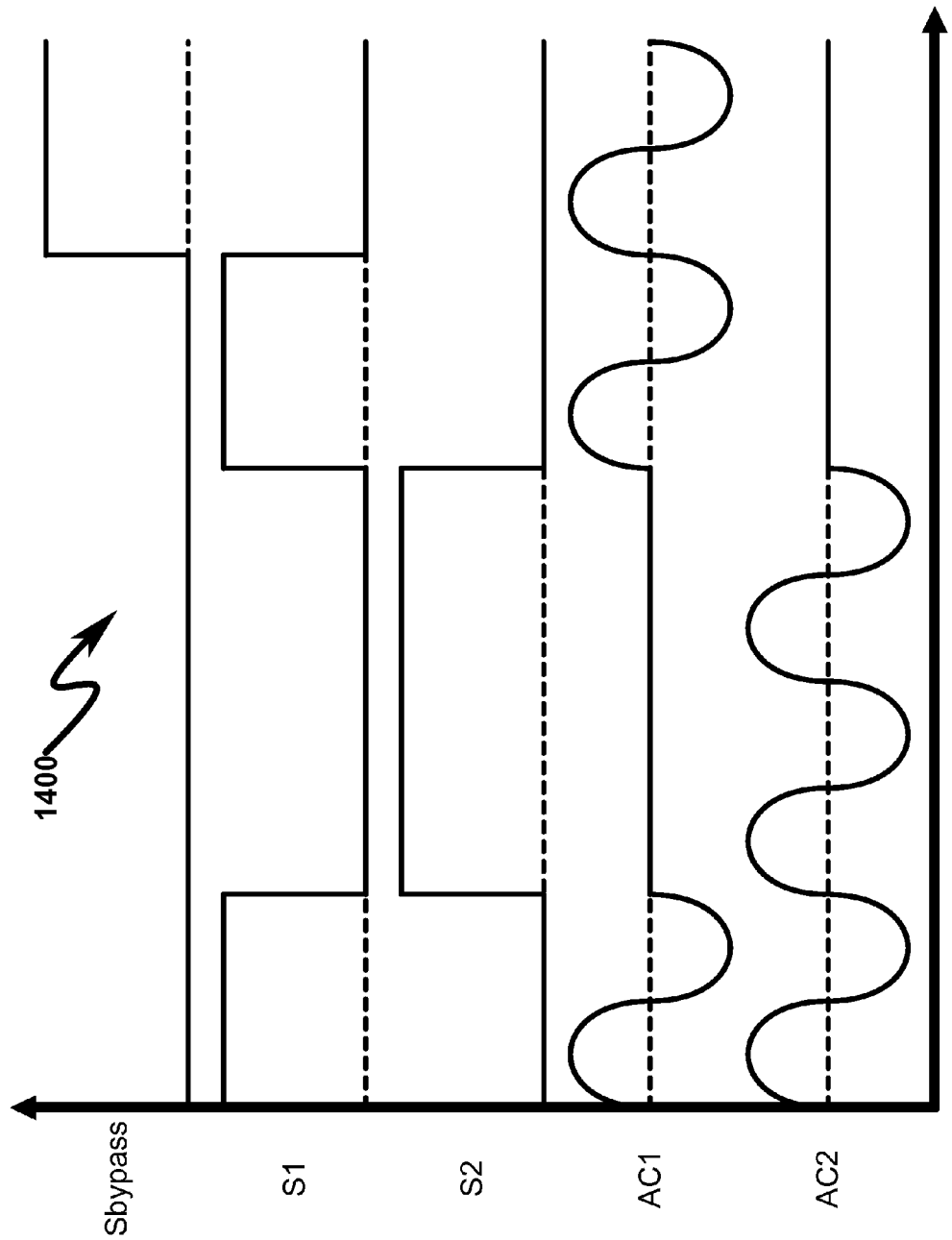
FIG. 14 illustrates exemplary power condition sensing and control waveforms associated with the schematic of FIG. 13.

FIG. 13 (1300)-FIG. 14 (1400) depict a power supply output configuration backup mechanism with two AC sources (1311, 1312) that supply power to two PSUs (1341, 1342) with full source protection and include the addition of a manual bypass switch (1333). The power condition sense and digital switch network (DSN) (1320) functionality is depicted in FIG. 14 (1400) and ensures that all PSUs (1341, 1342) are source protected and that selection of the AC source (1311, 1312) is realized through on/off control of complementary switches S1 (1331) and S2 (1332). Manual bypass switch (1333) allows maintenance functions to be engaged for the complementary switches S1 (1331) and S2 (1332) by manual selection of AC1 source (1311) without loss of power to the PSUs (1311, 1312). Equivalent configurations (not shown) may utilize AC2 source (1312) as the PSS during the bypass operation.

Dual AC Input System—Automatic Bypass (1500)-(1600)

Figure 15:
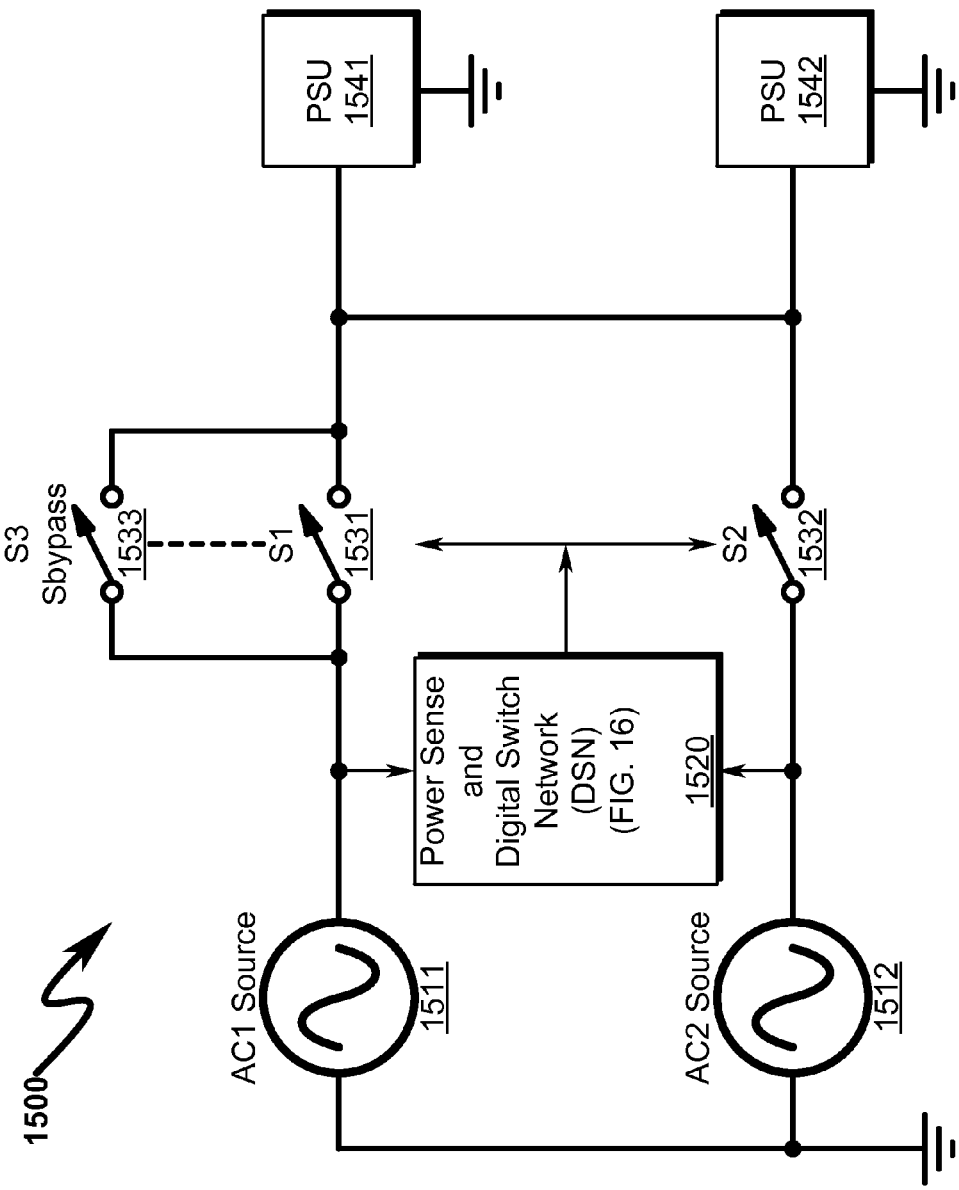
FIG. 15 illustrates an exemplary schematic diagram depicting a preferred system embodiment implementing a Dual AC Input System with Automatic Bypass.
Figure 16:
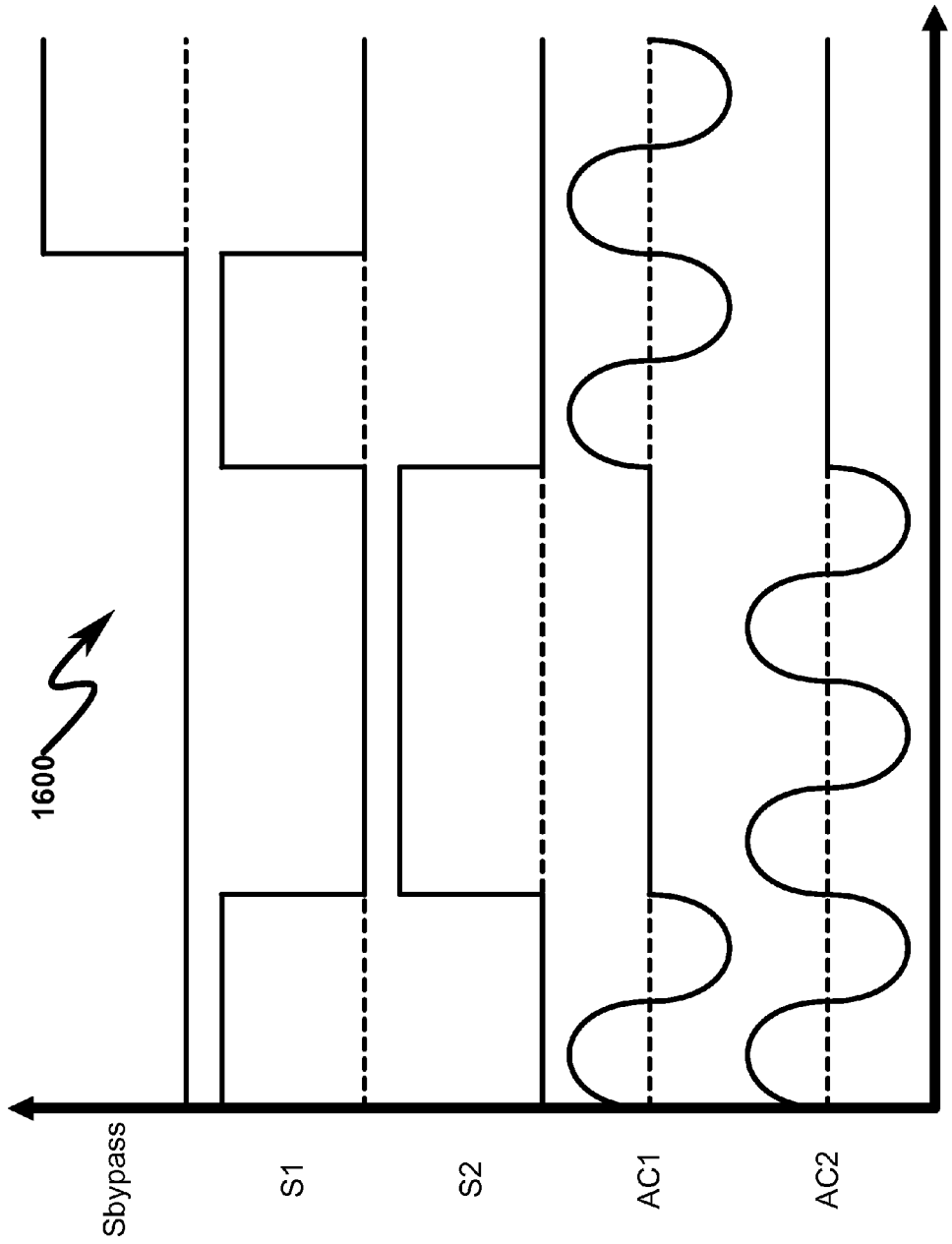
FIG. 16 illustrates exemplary power condition sensing and control waveforms associated with the schematic of FIG. 15.

FIG. 15 (1500)-FIG. 16 (1600) depict a power supply output configuration backup mechanism with two AC sources (1511, 1512) that supply power to two PSUs (1541, 1542) with full source protection and include the addition of an automatic bypass switch (1533). The power condition sense and digital switch network (DSN) (1520) functionality is depicted in FIG. 16 (1600) and ensures that all PSUs (1541, 1542) are source protected and that selection of the AC source (1511, 1512) is realized through on/off control of complementary switches S1 (1531) and S2 (1532). Auto bypass switch (1533) allows maintenance functions to be engaged for the complementary switches S1 (1531) and S2 (1532) by automatic selection of AC1 source (1511) without loss of power to the PSUs (1511, 1512). Equivalent configurations (not shown) may utilize AC2 source (1512) as the PSS during the bypass operation.

Dual AC Input System—Switch Redundancy (1700)-(1800)

Figure 17:
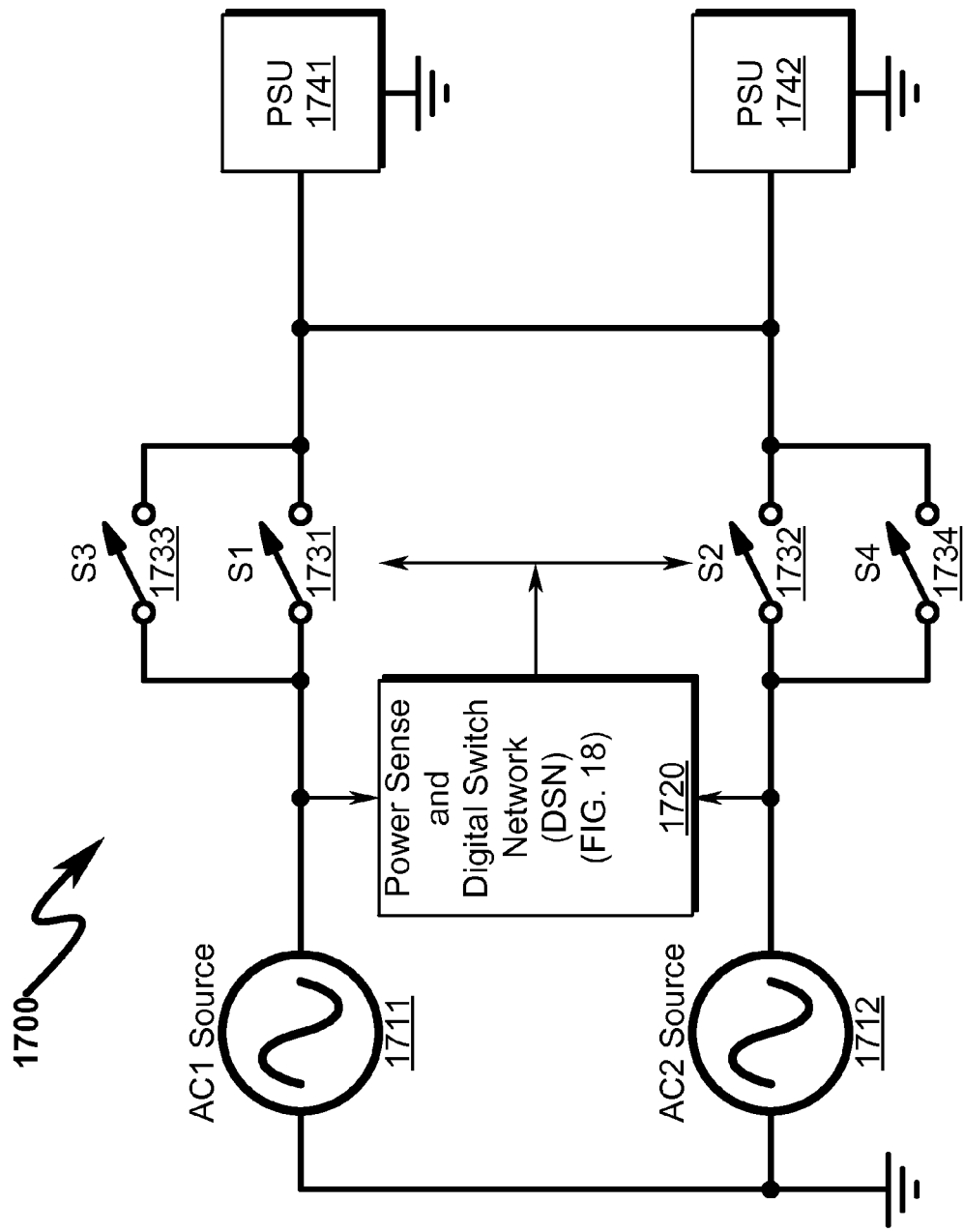
FIG. 17 illustrates an exemplary schematic diagram depicting a preferred system embodiment implementing a Dual AC Input System with Switch Redundancy.
Figure 18:
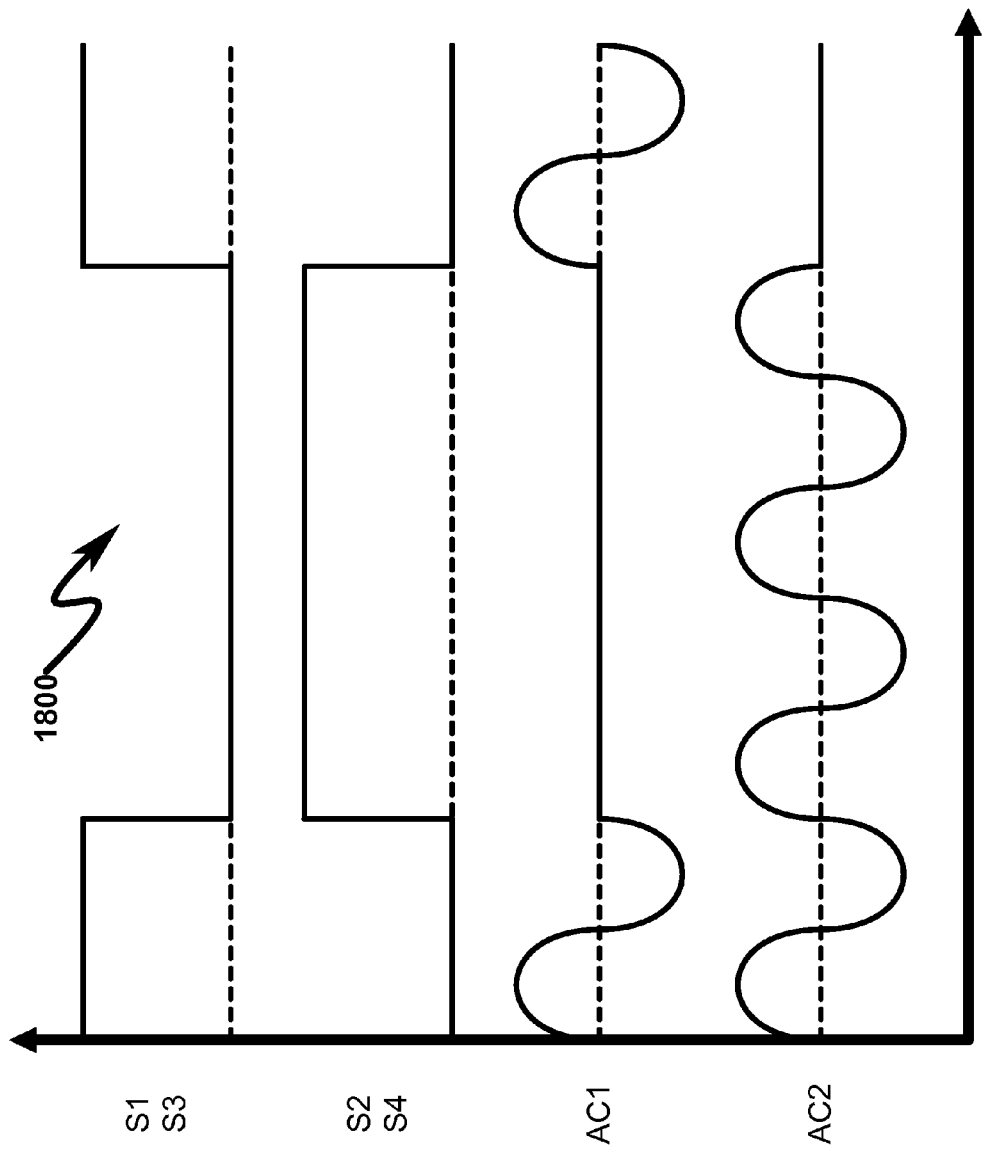
FIG. 18 illustrates exemplary power condition sensing and control waveforms associated with the schematic of FIG. 17.

FIG. 17 (1700)-FIG. 18 (1800) depict a power supply output configuration backup mechanism with two AC sources (1711, 1712) that supply power to two PSUs (1741, 1742) with full source protection and include redundant bypass switches (1733, 1734). The power condition sense and digital switch network (DSN) (1720) functionality is depicted in FIG. 18 (1800) and ensures that all PSUs (1741, 1742) are source protected and that selection of the AC source (1711, 1712) is realized through on/off control of complementary switches S1/S3 (1731, 1733) and S2/S4 (1732, 1734). The addition of redundant complementary switches S3 (1733) and S4 (1734) provides for higher reliability of the switching matrix controlled by the (DSN) (1720).

Dual Input System—DC Backup (1900)-(2000)

Figure 19:
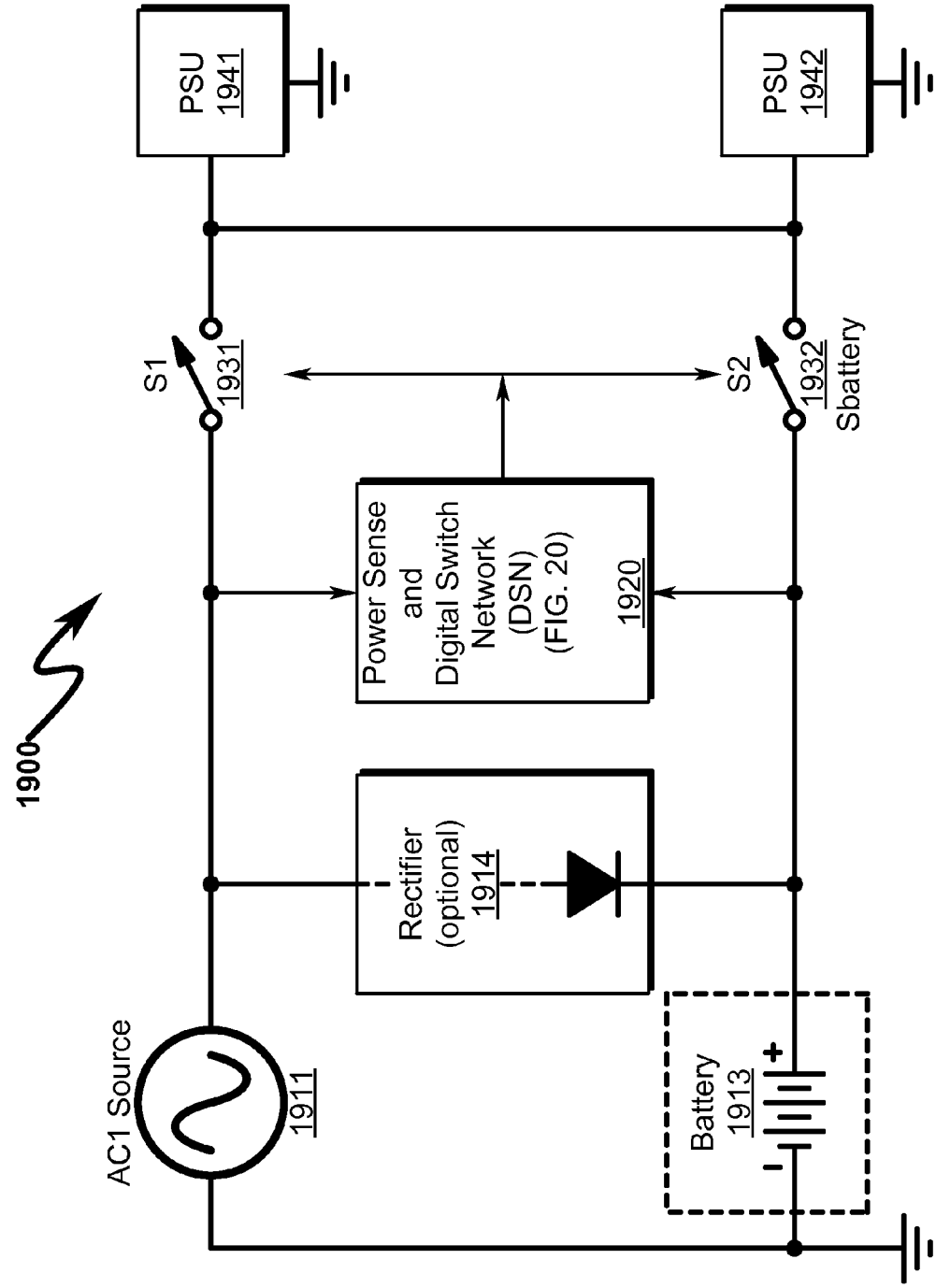
FIG. 19 illustrates an exemplary schematic diagram depicting a preferred system embodiment implementing a Dual Input System with DC Backup.
Figure 20:
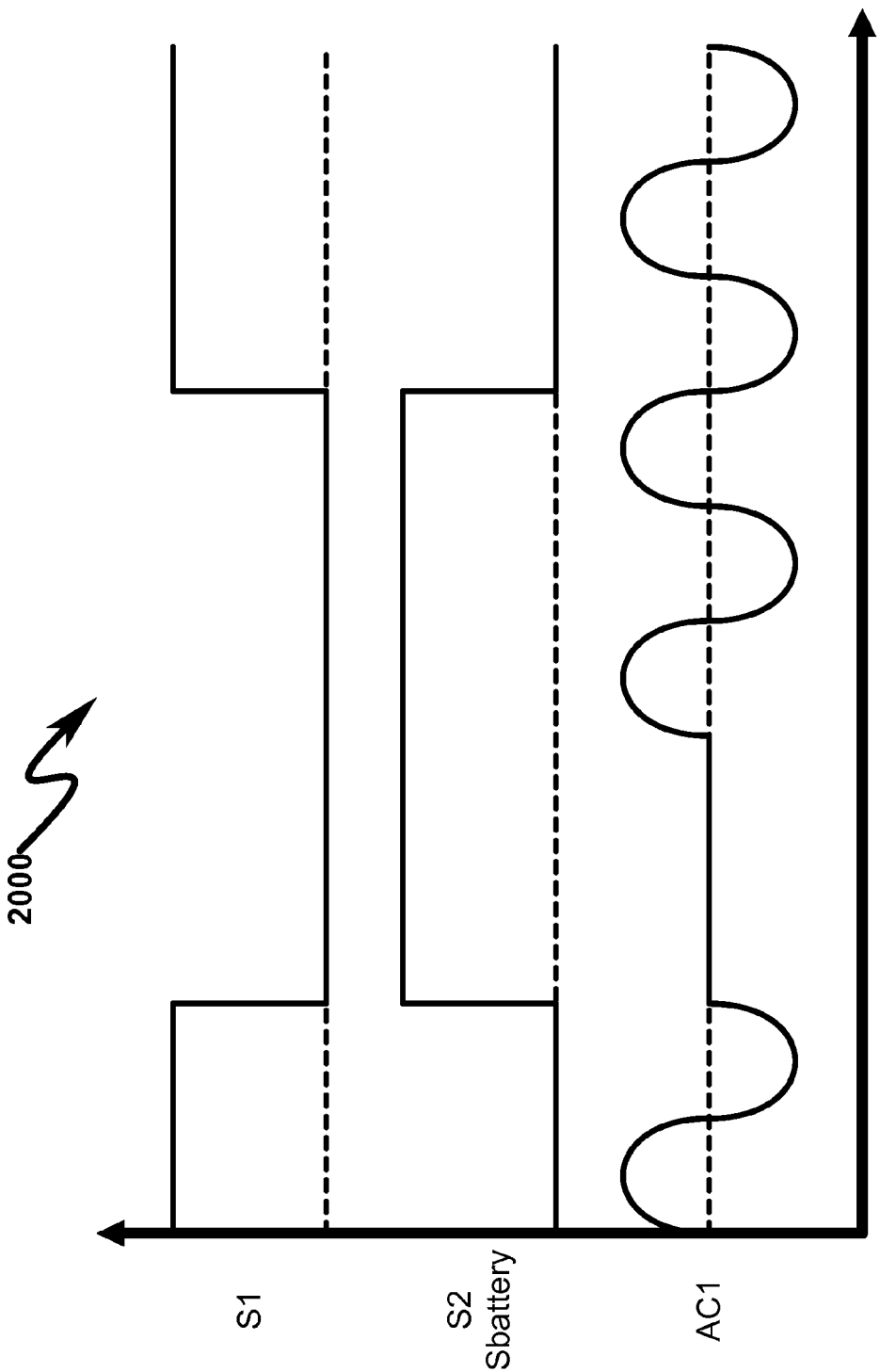
FIG. 20 illustrates exemplary power condition sensing and control waveforms associated with the schematic of FIG. 19.

FIG. 19 (1900)-FIG. 20 (2000) depict a power supply output configuration backup mechanism with one AC source (1911) and one DC battery source (1913) that supply power to two PSUs (1941, 1942) with full source protection and includes AC rectification (1914) to charge the DC battery source (1913). The power condition sense and digital switch network (DSN) (1920) functionality is depicted in FIG. 20 (2000) and ensures that all PSUs (1941, 1942) are source protected and that selection of the AC source (1911) or DC source (1913) is realized through on/off control of complementary switches S1 (1931) and S2 (1932).

The switching configuration of complementary switches S1 (1931) and S2 (1932) is configured to connect AC source (1911) to the PSUs (1941, 1942) unless the AC source (1911) fails, in which case the DC battery source (1913) provides power to the PSUs (1941, 1942). The PSUs (1941, 1942) depicted may operate in this context because of their AC+DC power supply output configuration that provides for universal power input.

The AC rectification (1914) used to charge the DC battery source (1913) may in some implementations be eliminated if the DC battery source (1913) is standalone or configured to be maintained by an alternate charging mechanism. As depicted in FIG. 20 (2000), the power condition sense and digital switch network (DSN) (1920) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (1920) functions described herein.

Dual AC Input System with DC Backup (2100)-(2200)

Figure 21:
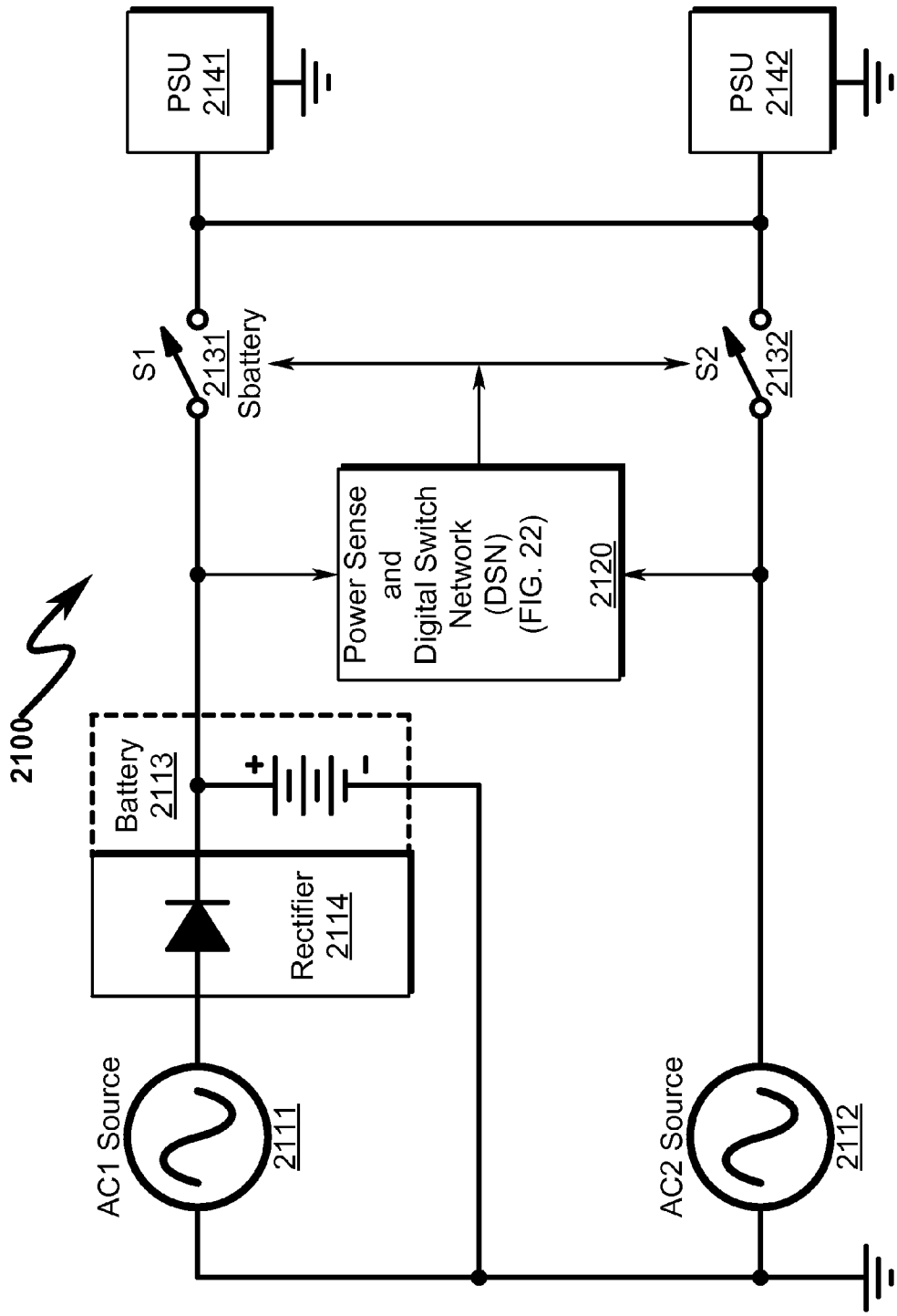
FIG. 21 illustrates an exemplary schematic diagram depicting a preferred system embodiment implementing a Dual AC Input System with DC Backup.
Figure 22:
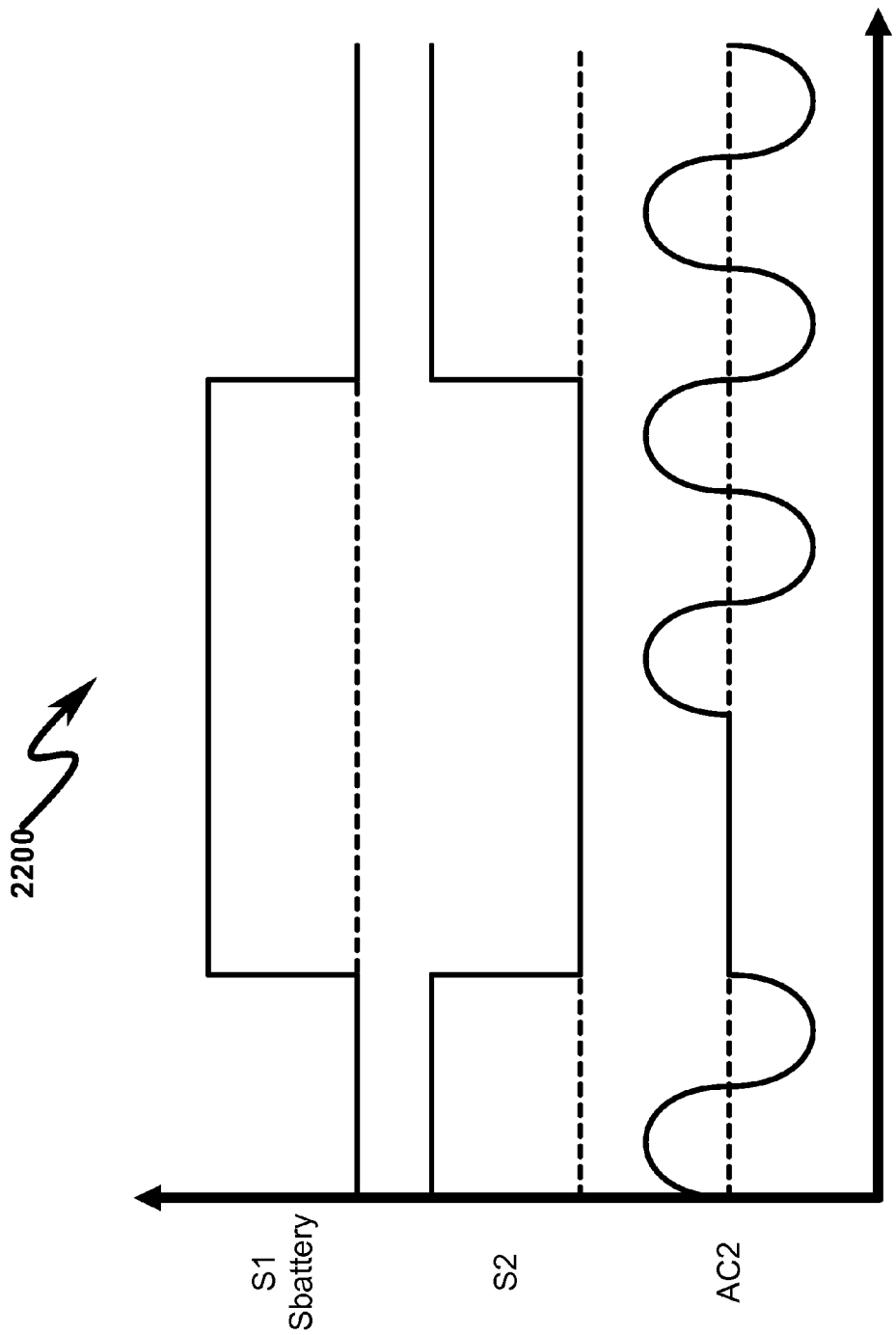
FIG. 22 illustrates exemplary power condition sensing and control waveforms associated with the schematic of FIG. 21.

FIG. 21 (2100)-FIG. 22 (2200) depict a power supply output configuration backup mechanism with two AC sources (2111, 2112) and one DC battery source (2113) that supply power to two PSUs (2141, 2142) with full source protection and includes AC rectification (2114) to charge the DC battery source (2113). The power condition sense and digital switch network (DSN) (2120) functionality is depicted in FIG. 22 (2200) and ensures that all PSUs (2141, 2142) are source protected and that selection of the AC source (2112) or DC source (2113) is realized through on/off control of complementary switches S1 (2131) and S2 (2132).

The switching configuration of complementary switches S1 (2131) and S2 (2132) is configured to connect AC source (2112) to the PSUs (2141, 2142) unless the AC source (2112) fails, in which case the DC battery (2113) provides power to the PSUs (2141, 2142) using AC source (2111) as a charging source. The PSUs (2141, 2142) depicted may operate in this context because of their AC+DC power supply output configuration that provides for universal power input.

The AC rectification (2114) used to charge the DC battery source (2113) may in some implementations be eliminated if the DC battery source (2113) is standalone or configured to be maintained by an alternate charging mechanism. As depicted in FIG. 22 (2200), the power condition sense and digital switch network (DSN) (2120) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (2120) functions described herein.

Dual AC Input System with DC Backup—4 PSU (2300)-(2400)

Figure 23:
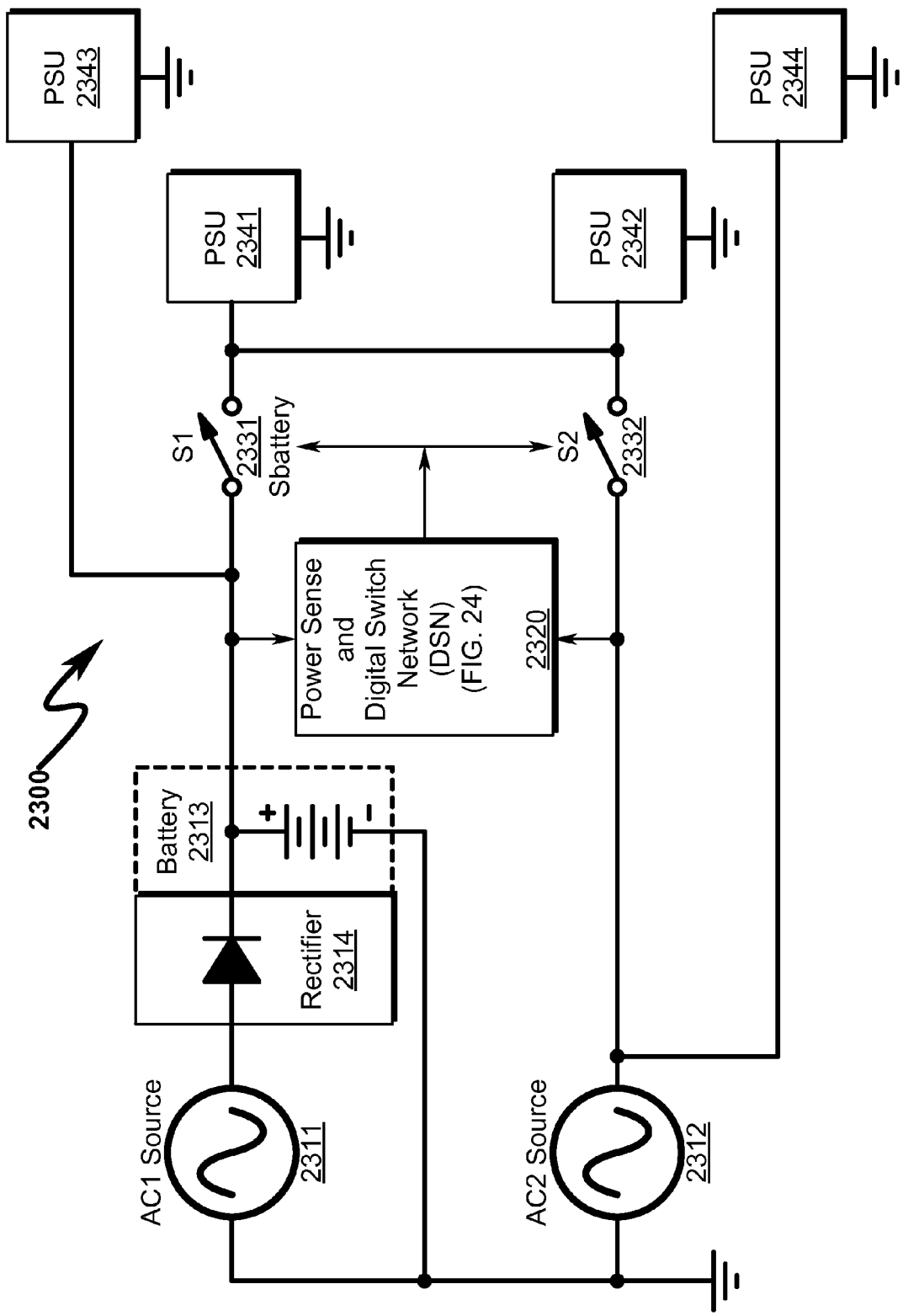
FIG. 23 illustrates an exemplary schematic diagram depicting a preferred system embodiment implementing a Dual AC Input System with DC Backup and 4 PSU.
Figure 24:
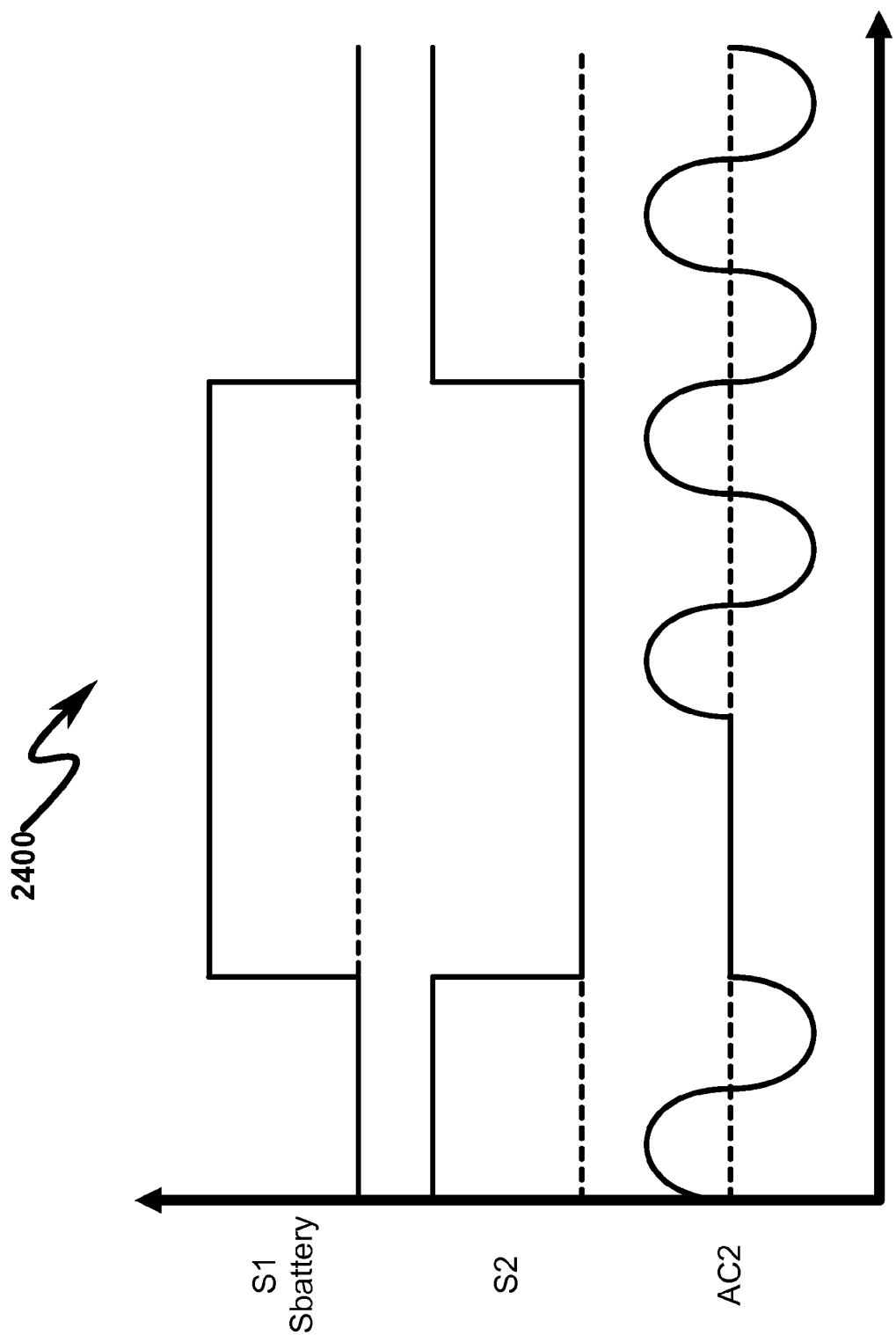
FIG. 24 illustrates exemplary power condition sensing and control waveforms associated with the schematic of FIG. 23.

FIG. 23 (2300)-FIG. 24 (2400) depict a power supply output configuration backup mechanism with two AC sources (2311, 2312) and one DC battery source (2313) that supply power to four PSUs (2341, 2342, 2343, 2344) with full source protection for two PSUs (2341, 2342) and no input protection for the remaining two PSUs (2343, 2344) and includes AC rectifications (2314) to charge the DC battery source (2313). The power condition sense and digital switch network (DSN) (2320) functionality is depicted in FIG. 24 (2400) and ensures that two PSUs (2341, 2342) are fully source protected and that selection of the AC source (2312) or DC source (2313) is realized through on/off control of complementary switches S1 (2331) and S2 (2332).

The switching configuration of complementary switches S1 (2331) and S2 (2332) is configured to connect AC source (2312) to the fully protected PSUs (2341, 2342) unless the AC source (2312) fails, in which case the DC battery (2313) provides power to the PSUs (2341, 2342) using AC source (2311) as a charging source. The PSUs (2341, 2342, 2343, 2344) depicted may operate in this context because of their AC+DC power supply output configuration that provides for universal power input.

The AC rectification (2314) used to charge the DC battery source (2313) may in some implementations be eliminated if the DC battery source (2313) is standalone or configured to be maintained by an alternate charging mechanism. As depicted in FIG. 24 (2400), the power condition sense and digital switch network (DSN) (2320) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (2320) functions described herein.

Dual AC Input System with DC Backup—4 PSU (2500)-(2600)

Figure 25:
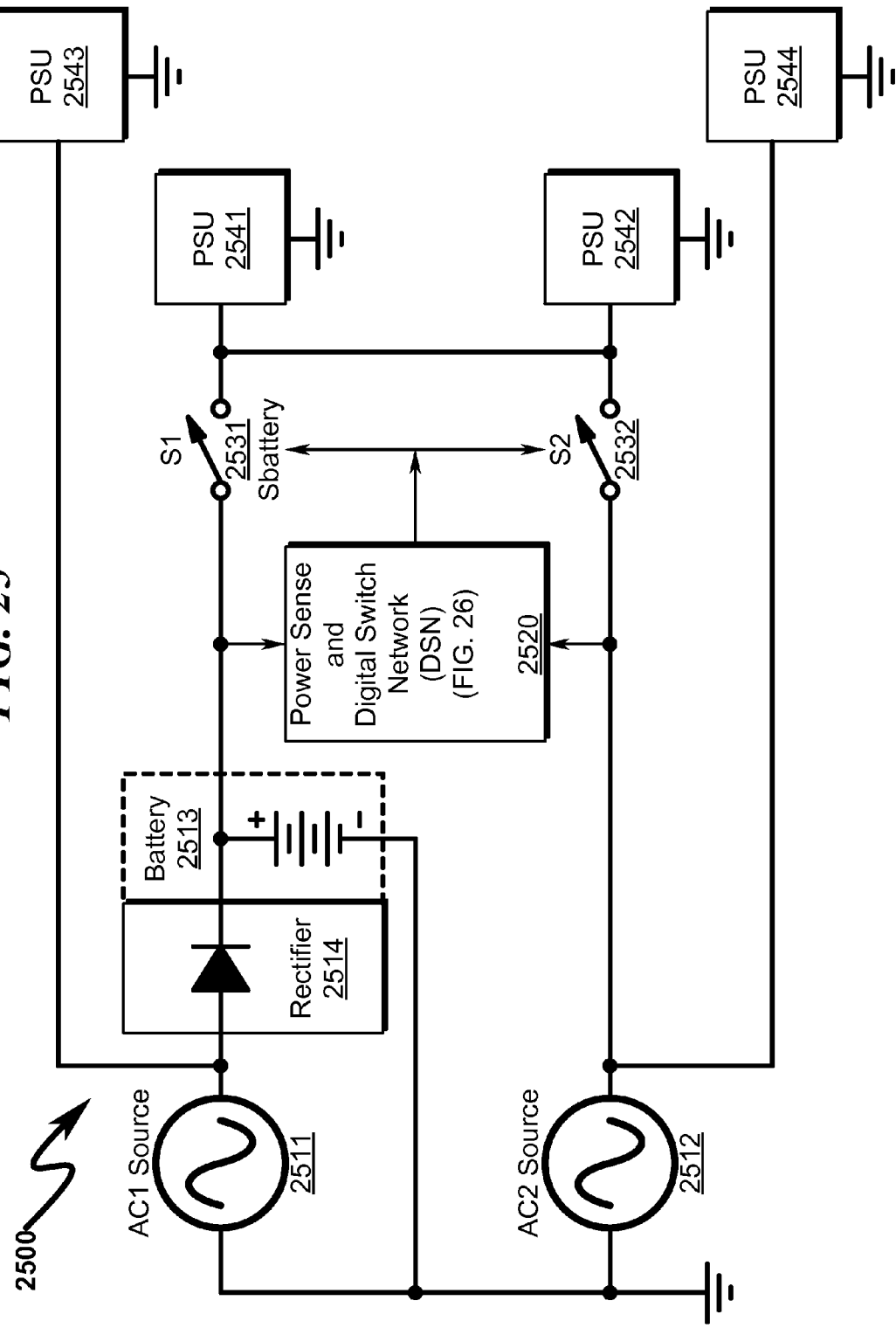
FIG. 25 illustrates an exemplary schematic diagram depicting a preferred system embodiment implementing a Dual AC Input System with DC Backup and 4 PSU.
Figure 26:
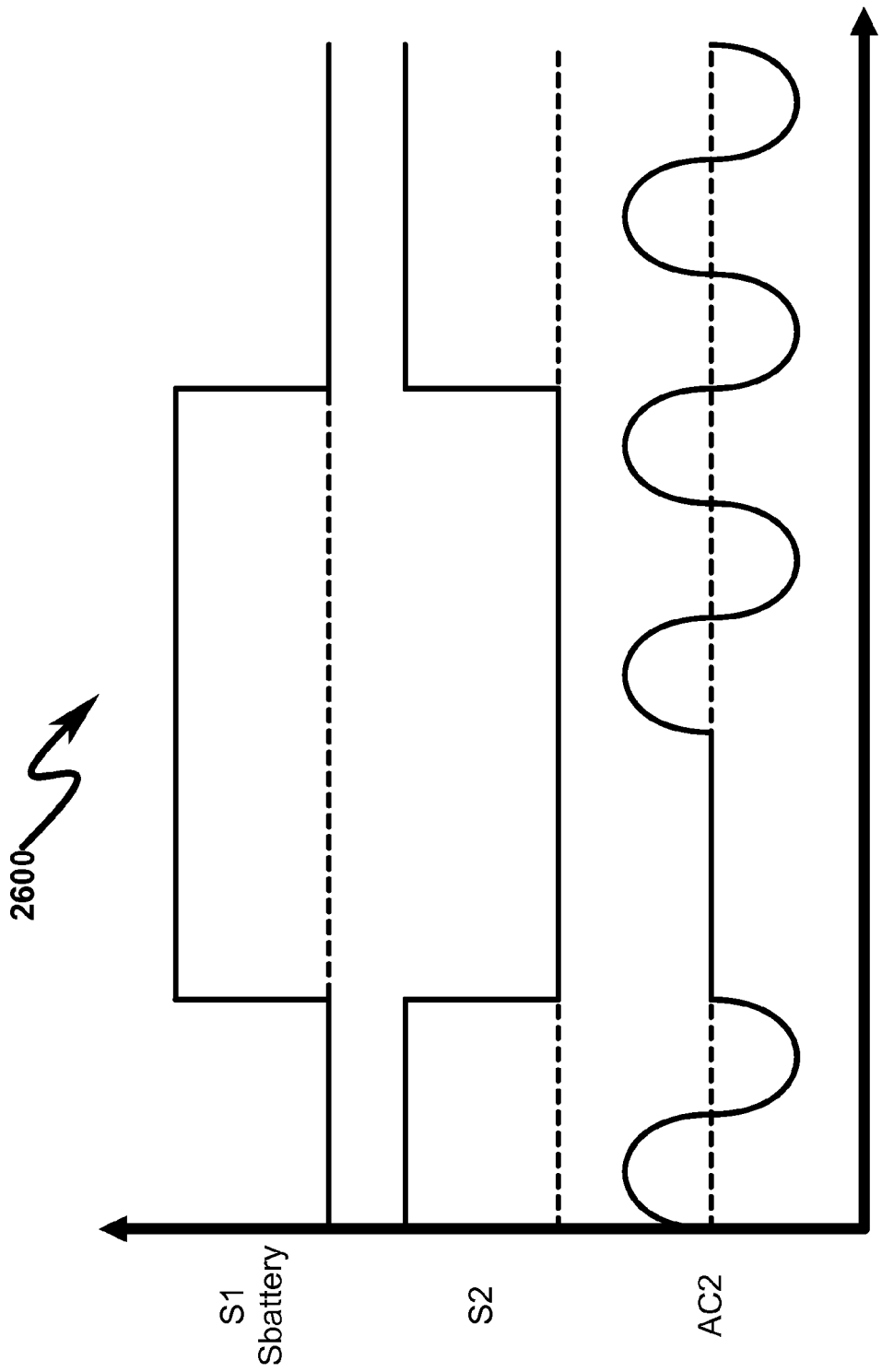
FIG. 26 illustrates exemplary power condition sensing and control waveforms associated with the schematic of FIG. 25.

FIG. 25 (2500)-FIG. 26 (2600) depict a power supply output configuration backup mechanism with two AC sources (2511, 2512) and one DC battery source (2513) that supply power to four PSUs (2541, 2542, 2543, 2544) with full source protection for two PSUs (2541, 2542) and no input protection for the remaining two PSUs (2543, 2544) and includes AC rectifications (2514) to charge the DC battery source (2513). The power condition sense and digital switch network (DSN) (2520) functionality is depicted in FIG. 26 (2600) and ensures that two PSUs (2541, 2542) are fully source protected and that selection of the AC source (2512) or DC source (2513) is realized through on/off control of complementary switches S1 (2531) and S2 (2532).

This configuration and functionality is identical to that of FIG. 23 (2300) with the exception that all unprotected PSUs (2543, 2544) are powered directly from the AC sources (2511, 2512). Note that the PSUs (2541, 2542, 2543, 2544) depicted may operate in this context because of their AC+DC power supply output configuration that provides for universal power input.

Dual AC+DC Input System (2700)-(2800)

Figure 27:
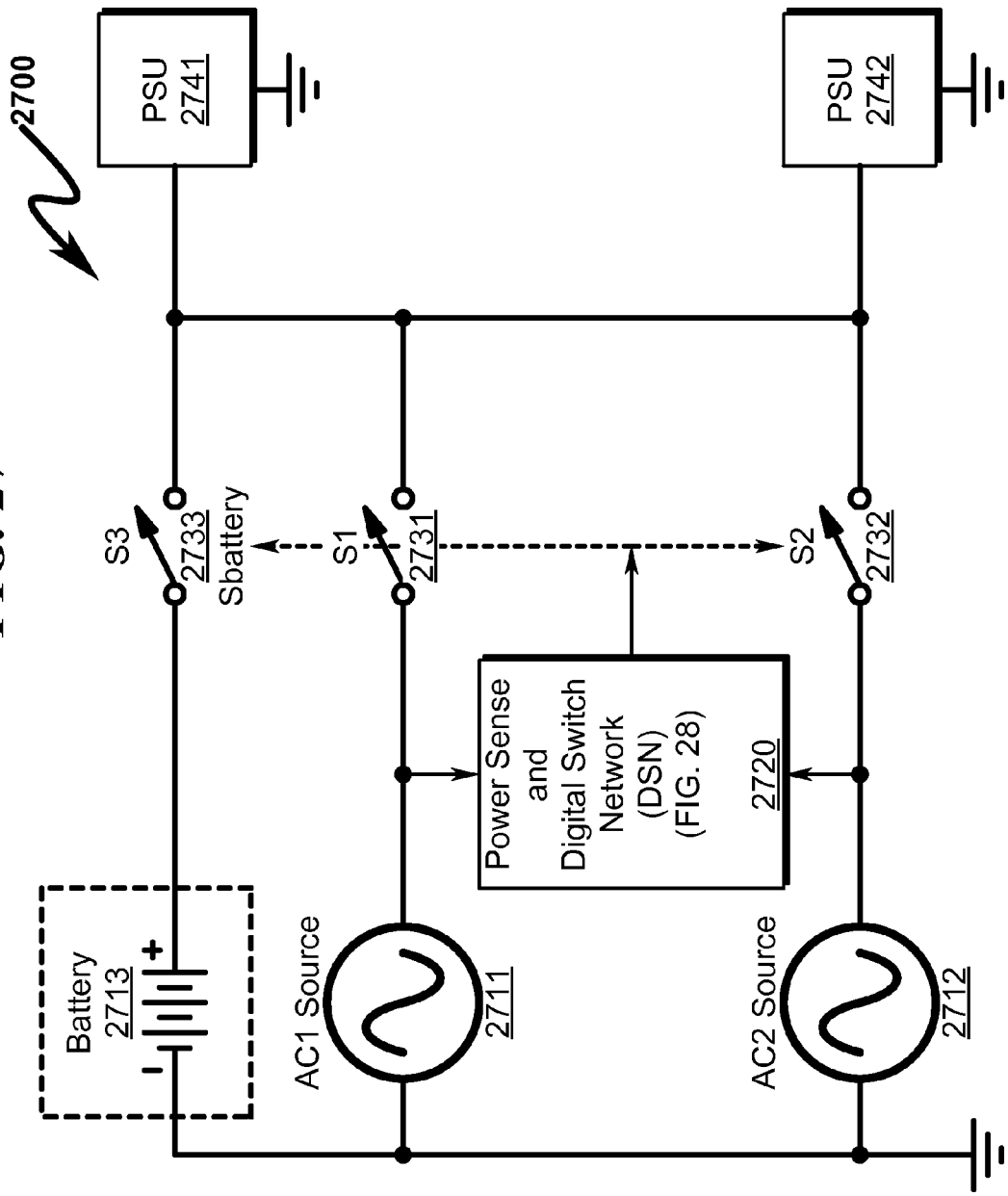
FIG. 27 illustrates an exemplary schematic diagram depicting a preferred system embodiment implementing a Dual AC+DC Input System.
Figure 28:
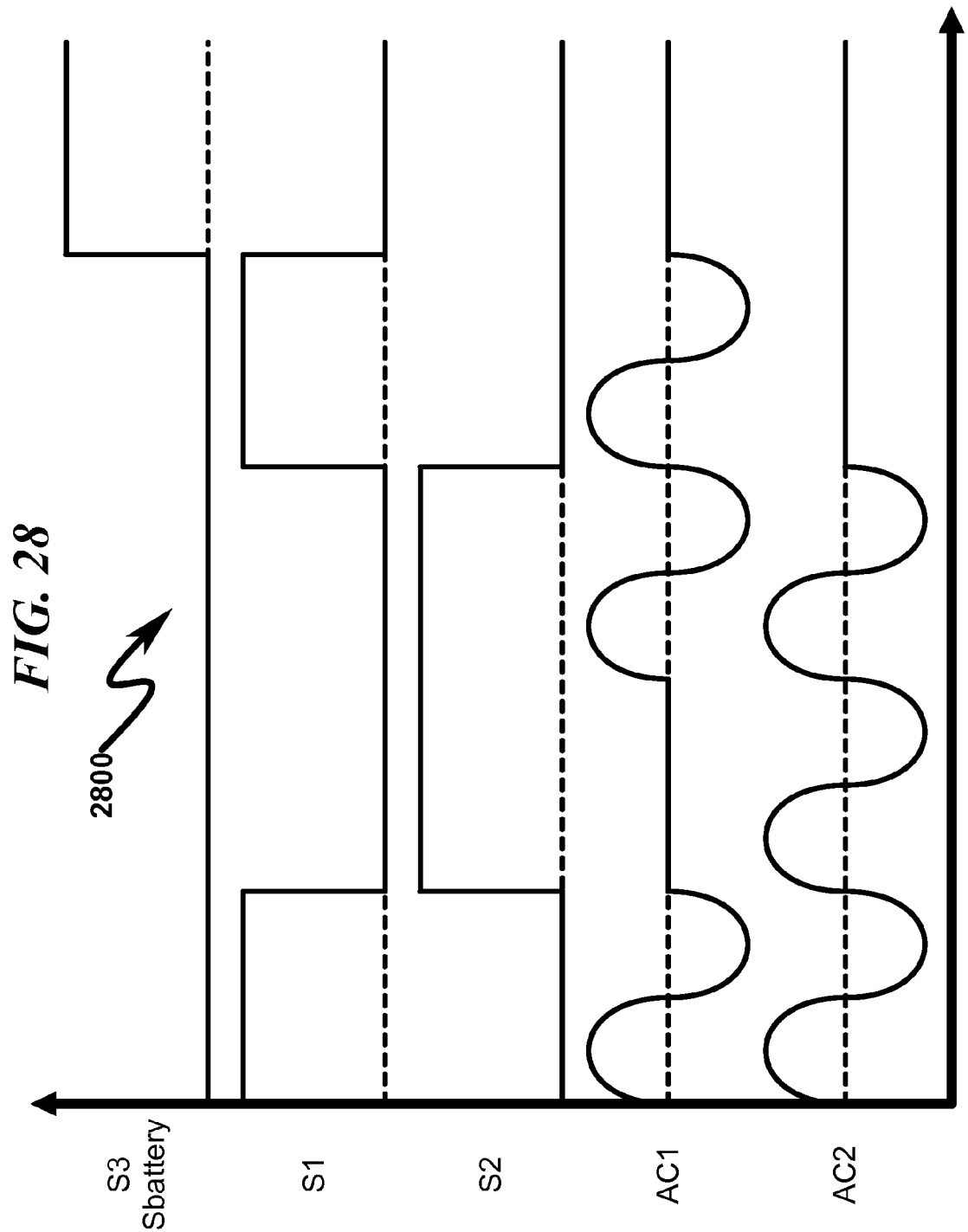
FIG. 28 illustrates exemplary power condition sensing and control waveforms associated with the schematic of FIG. 27.

FIG. 27 (2700)-FIG. 28 (2800) depict a power supply output configuration backup mechanism with two AC sources (2711, 2712) and one DC battery source (2713) that supply power to two PSUs (2741, 2742) with full source protection for the PSUs (2741, 2742) and includes a secondary DC battery source (2713). The power condition sense and digital switch network (DSN) (2720) functionality is depicted in FIG. 28 (2800) and ensures that two PSUs (2741, 2742) are fully source protected and that selection of the AC sources (2711, 2712) or DC battery source (2713) is realized through on/off control of complementary switches S1 (2731), S2 (2732), and S3 (2733).

This configuration permits mixing of AC sources (2711, 2712) and DC battery sources (2713) within the same backup switching configuration. Note that the PSUs (2741, 2742) depicted may operate in this context because of their AC+DC power supply output configuration that provides for universal power input.

Dual AC+DC Input System—4 PSU (2900)-(3000)

Figure 29:
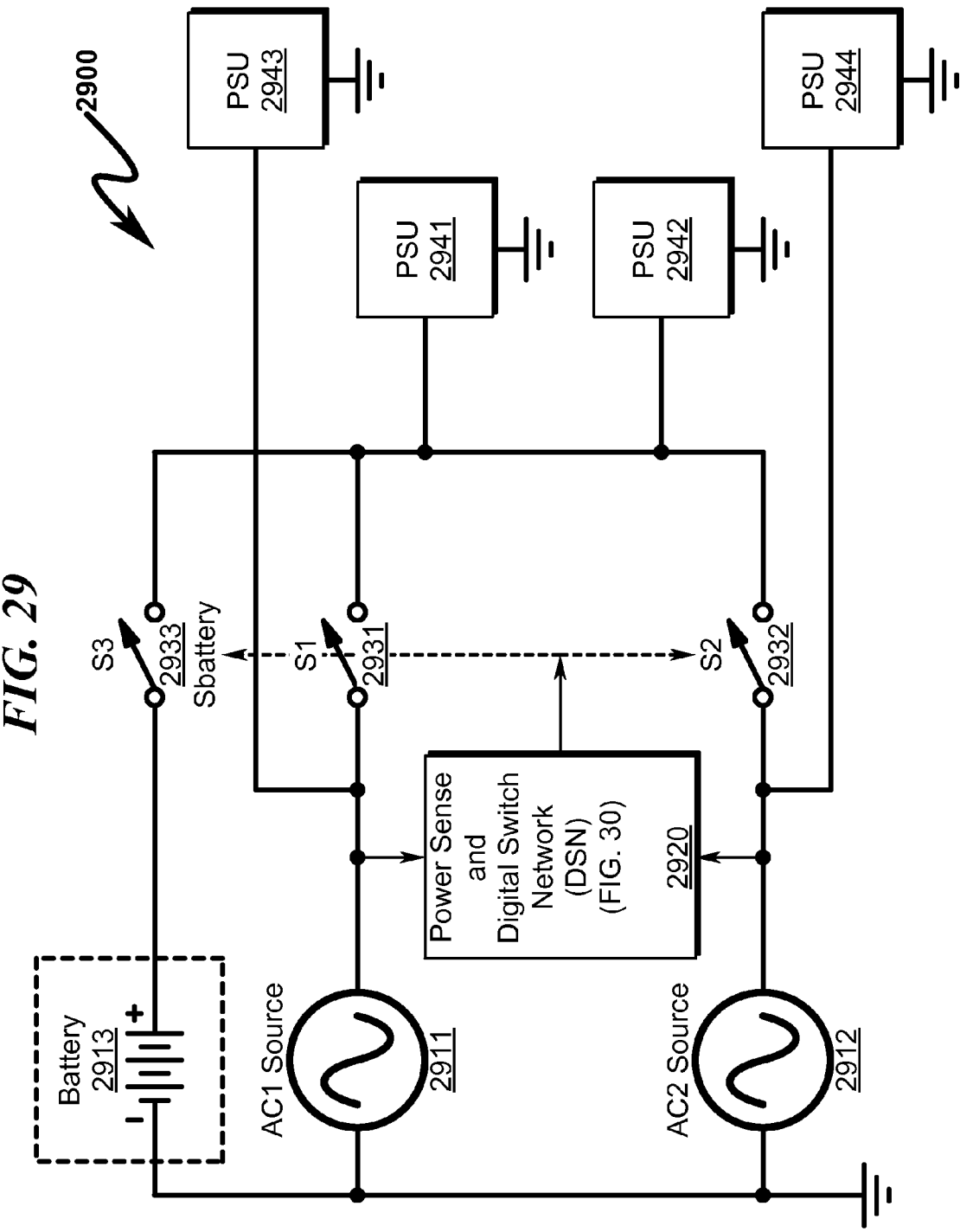
FIG. 29 illustrates an exemplary schematic diagram depicting a preferred system embodiment implementing a Dual AC+DC Input System and 4 PSU.
Figure 30:
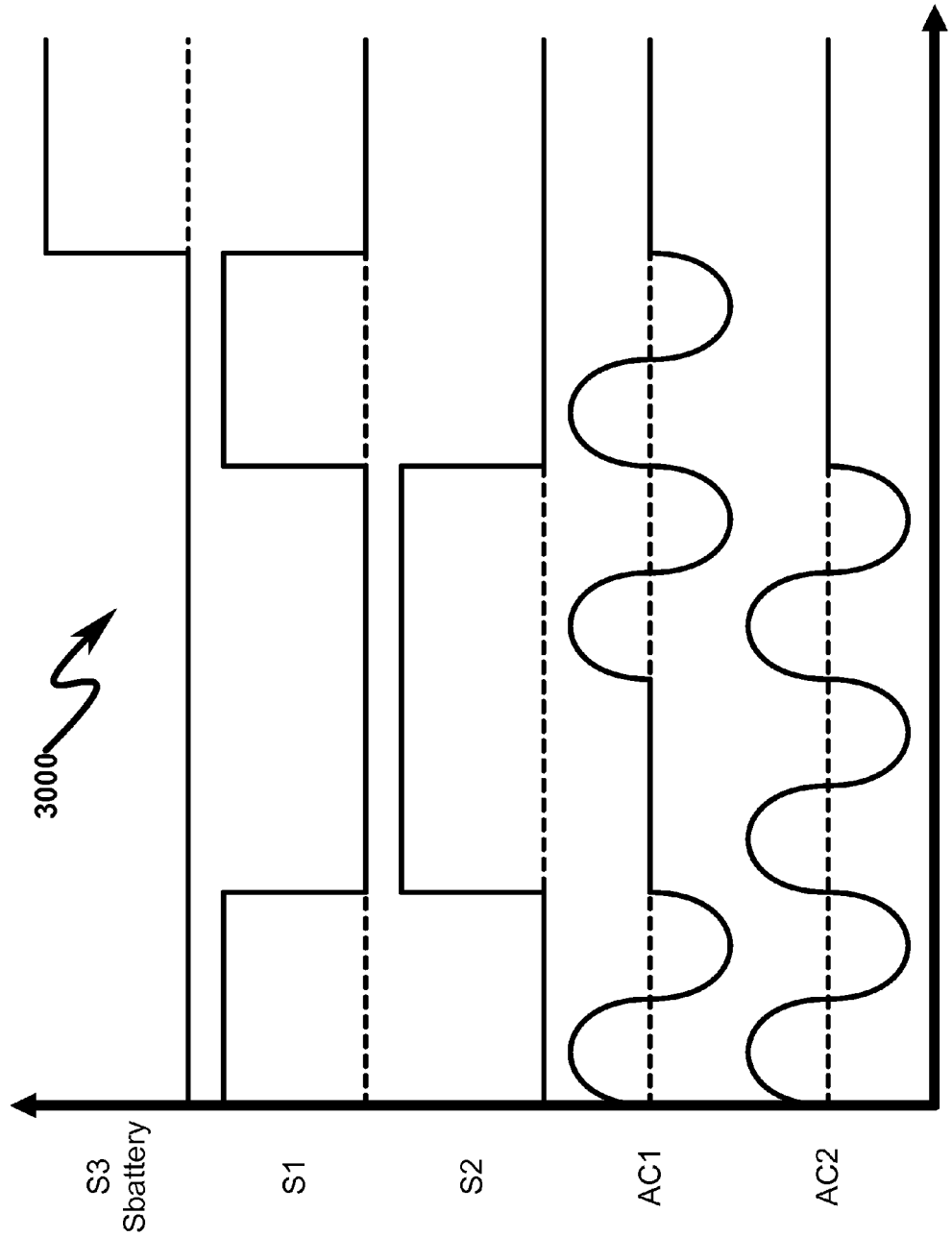
FIG. 30 illustrates exemplary power condition sensing and control waveforms associated with the schematic of FIG. 29.

FIG. 29 (2900)-FIG. 30 (3000) depict a power supply output configuration backup mechanism with two AC sources (2911, 2912) and one DC battery source (2913) that supply power to four PSUs (2941, 2942, 2943, 2944) with full source protection for two PSUs (2941, 2942) and no input protection for the two remaining PSUs (2943, 2944) and includes a secondary DC battery source (2913). The power condition sense and digital switch network (DSN) (2920) functionality is depicted in FIG. 30 (3000) and ensures that two PSUs (2941, 2942) are fully source protected with the remaining two PSUs (2943, 2944) source unprotected and that selection of the AC sources (2911, 2912) or DC battery source (2913) is realized through on/off control of complementary switches S1 (2931), S2 (2932), and S3 (2933).

This configuration permits mixing of AC sources (2911, 2912) and DC battery sources (2913) within the same backup switching configuration. This configuration and functionality is identical to that of FIG. 27 (2700) with the exception that all unprotected PSUs (2943, 2944) are powered directly from the AC sources (2911, 2912). Note that the PSUs (2941, 2942, 2943, 2944) depicted may operate in this context because of their AC+DC power supply output configuration that provides for universal power input.

Dual AC+DC+Alternate Energy Input System (3100)-(3200)

Figure 31:
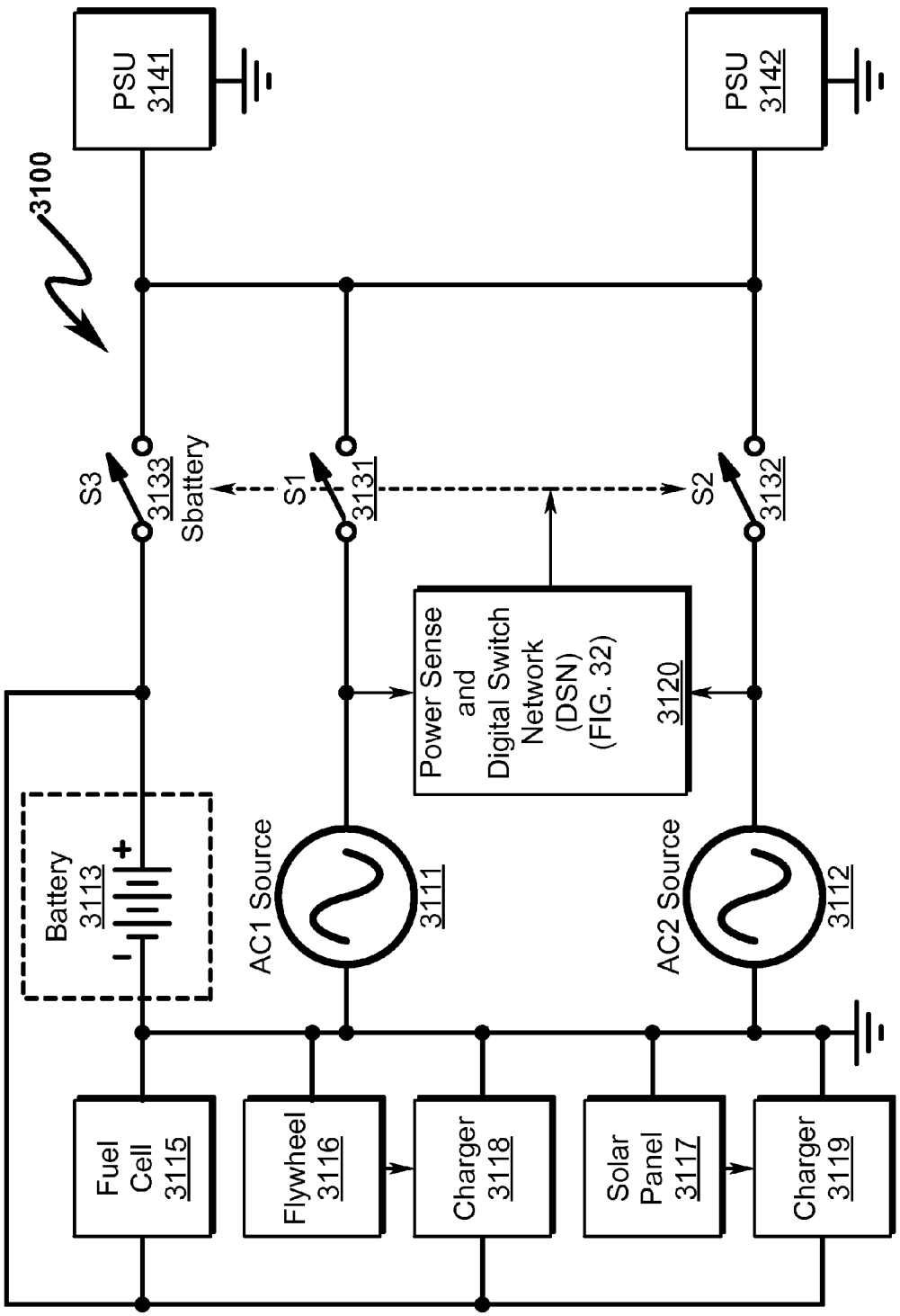
FIG. 31 illustrates an exemplary schematic diagram depicting a preferred system embodiment implementing a Dual AC+DC+Alternate Energy Input System.
Figure 32:
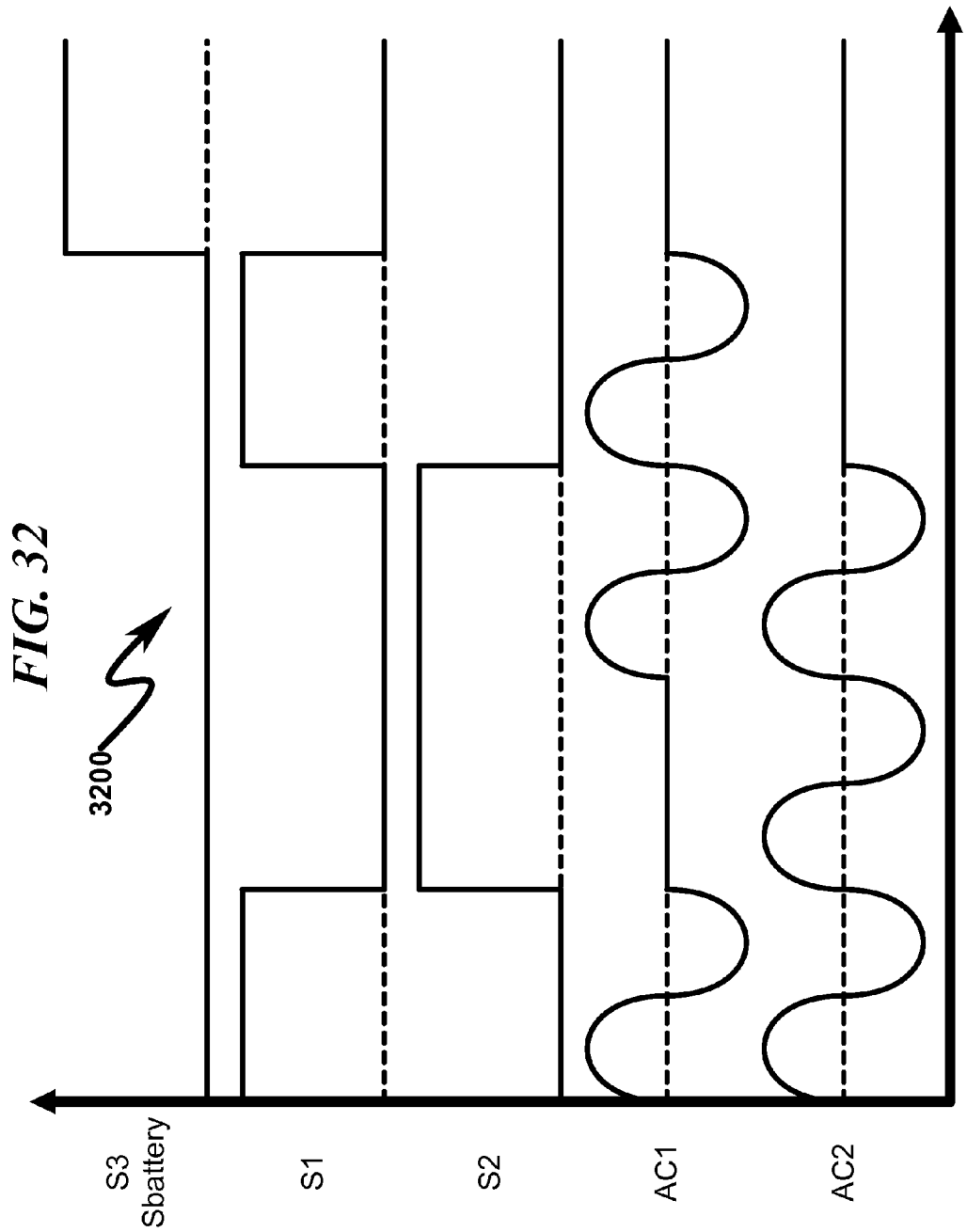
FIG. 32 illustrates exemplary power condition sensing and control waveforms associated with the schematic of FIG. 31.

FIG. 31 (3100)-FIG. 32 (3200) depict a power supply output configuration backup mechanism with two AC sources (3111, 3112) and one DC battery source (3113) that supply power to four PSUs (3141, 3142, 3143, 3144) with full source protection for two PSUs (3141, 3142) and no input protection for the two remaining PSUs (3143, 3144) and includes a secondary DC battery source (3113). The power condition sense and digital switch network (DSN) (3120) functionality is depicted in FIG. 32 (3200) and ensures that two PSUs (3141, 3142) are fully source protected with the remaining two PSUs (3143, 3144) source unprotected and that selection of the AC sources (3111, 3112) or DC battery source (3113) is realized through on/off control of complementary switches S1 (3131), S2 (3132), and S3 (3133).

This configuration permits mixing of AC sources (3111, 3112) and DC battery sources (3113) within the same backup switching configuration. This configuration and functionality is identical to that of FIG. 29 (2900) with the exception that alternate energy sources (3115, 3116, 3117) depicted (operating in conjunction with chargers (3118, 3119)) may operate to supply charging current to the DC battery source (3113). Note that the PSUs (3141, 3142, 3143, 3144) depicted may operate in this context because of their AC+DC power supply output configuration that provides for universal power input.

Dual AC Input System with DC Backup/Bypass (3300)-(3400)

Figure 33:
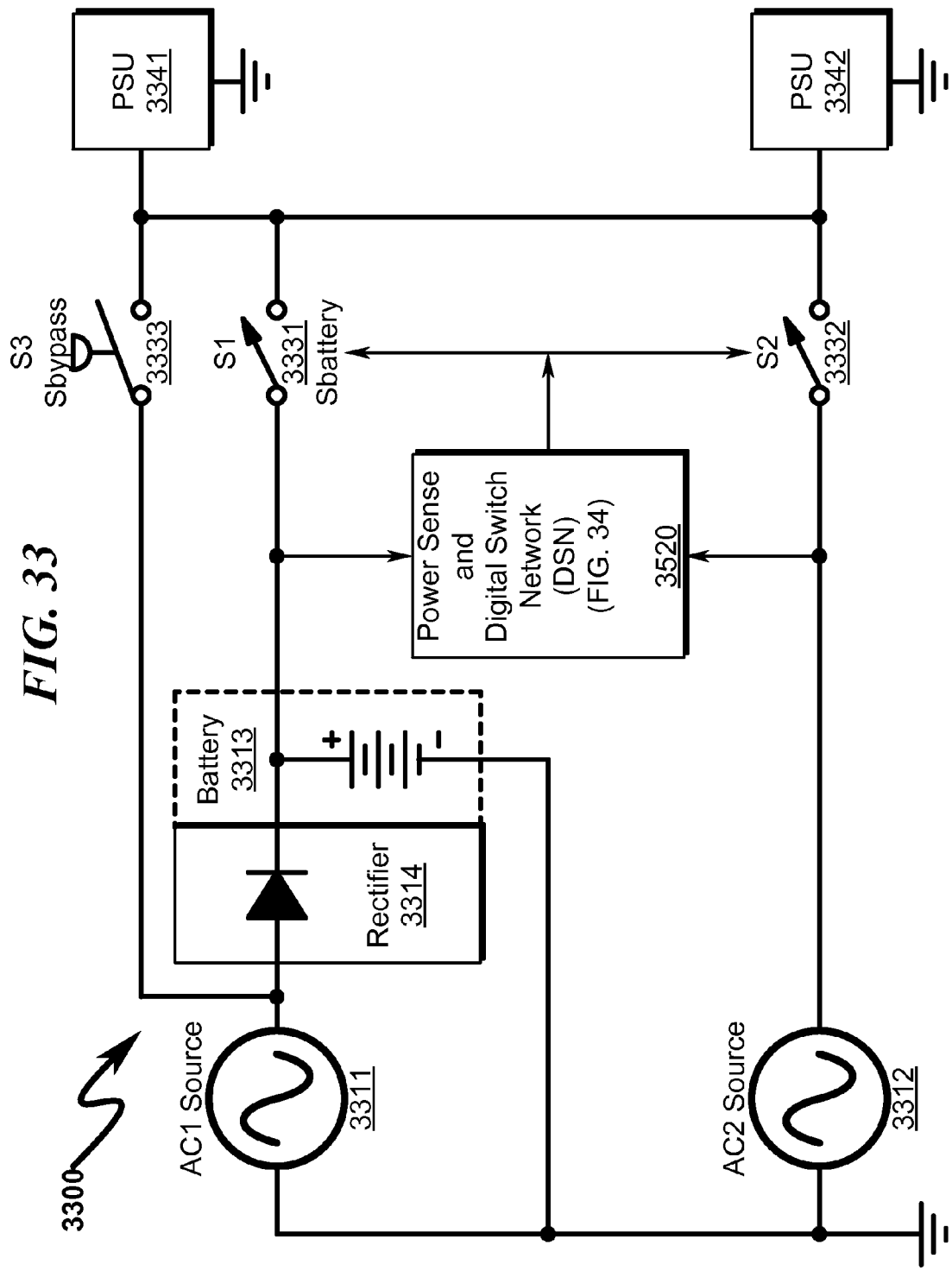
FIG. 33 illustrates an exemplary schematic diagram depicting a preferred system embodiment implementing a Dual AC Input System with DC Backup/Bypass.
Figure 34:
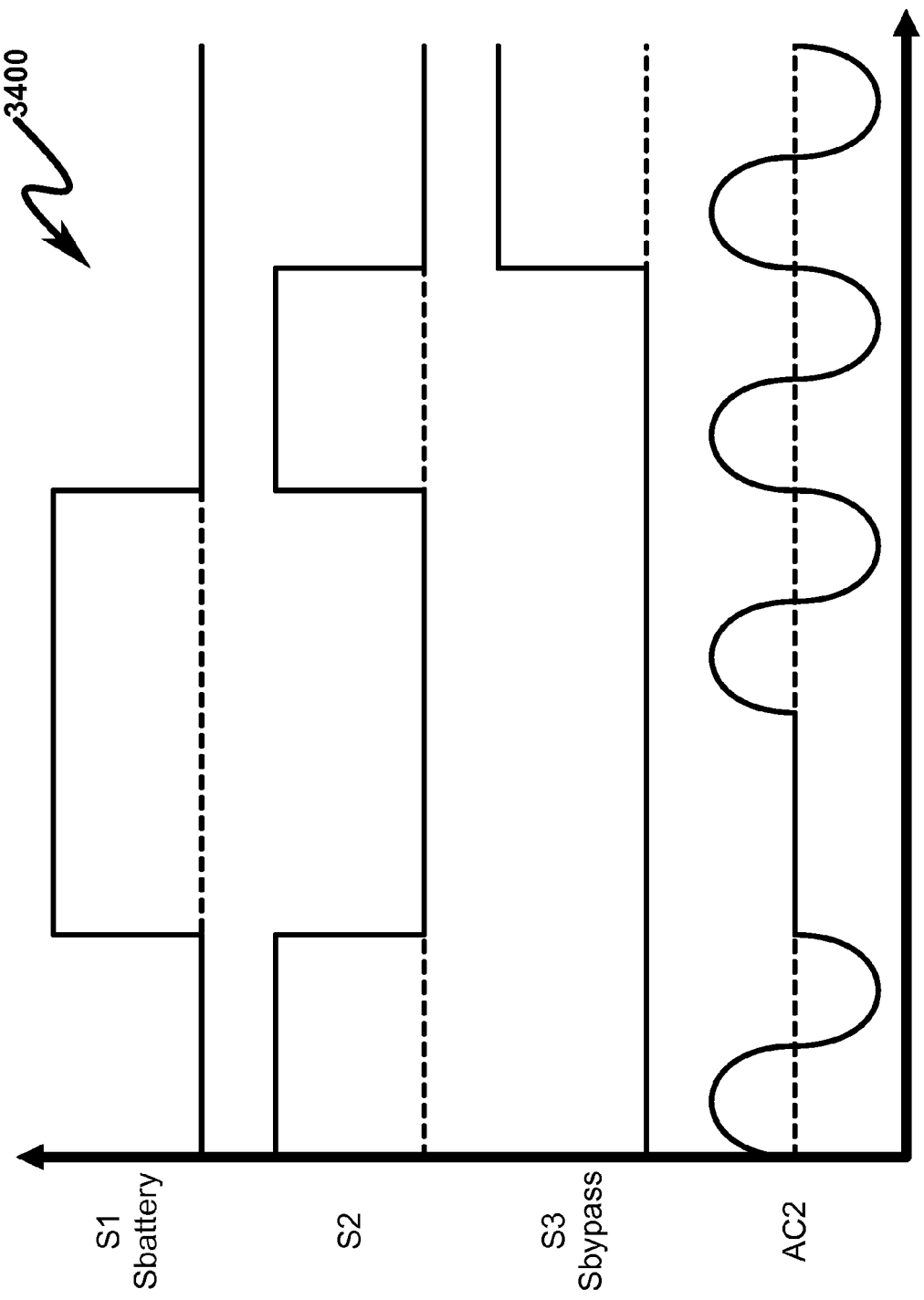
FIG. 34 illustrates exemplary power condition sensing and control waveforms associated with the schematic of FIG. 33.

FIG. 33 (3300)-FIG. 34 (3400) depict a power supply output configuration backup mechanism with two AC sources (3311, 3312) and one DC battery source (3313) that supply power to two PSUs (3341, 3342) with full source protection and includes AC rectification (3314) to charge the DC battery source (3313). The power condition sense and digital switch network (DSN) (3320) functionality is depicted in FIG. 34 (3400) and ensures that all PSUs (3341, 3342) are source protected and that selection of the AC source (3312) or DC source (3313) is realized through on/off control of complementary switches S1 (3331) and S2 (3332).

The switching configuration of complementary switches S1 (3331) and S2 (3332) is configured to connect AC source (3312) to the PSUs (3341, 3342) unless the AC source (3312) fails, in which case the DC battery (3313) provides power to the PSUs (3341, 3342) using AC source (3311) as a charging source. The PSUs (3341, 3342) depicted may operate in this context because of their AC+DC power supply output configuration that provides for universal power input.

The AC rectification (3314) used to charge the DC battery source (3313) may in some implementations be eliminated if the DC battery source (3313) is standalone or configured to be maintained by an alternate charging mechanism. As depicted in FIG. 34 (3400), the power condition sense and digital switch network (DSN) (3320) functionality may operate to ensure that a given power source is fully operational (i.e., at full voltage levels for a number of AC cycles) before switching to this power source and connecting it to the PSUs. This optional "power good" switching feature is implied in any of the power condition sense and digital switch network (DSN) (3320) functions described herein.

This configuration incorporates an automatic bypass switch (3333) to allow for maintenance of the S1 (3331) and/or S2 (3332) switches without loss of power to the PSUs (3341, 3342).

Dual AC Input System with DC Backup—4 PSU (3500)-(3600)

Figure 35:
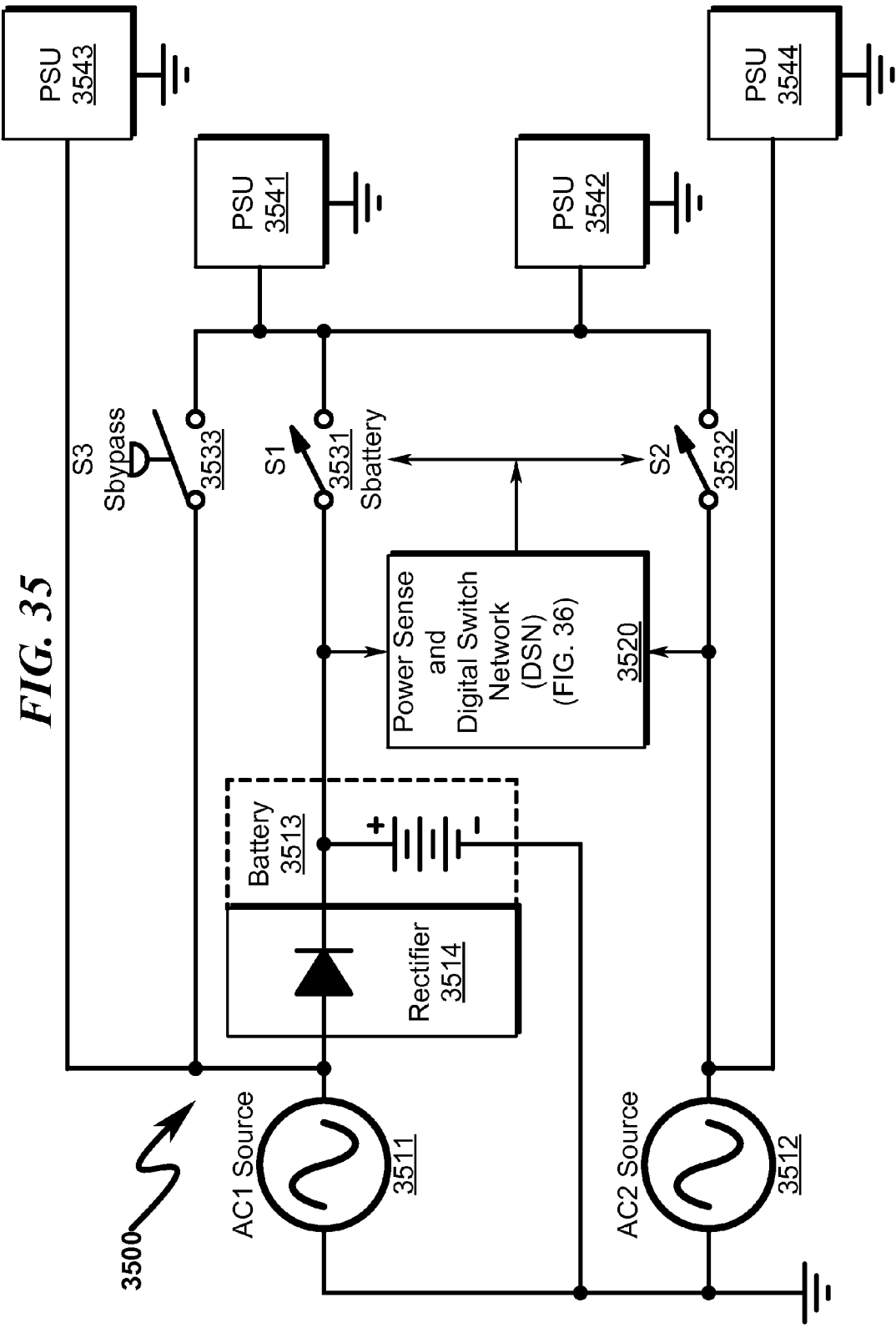
FIG. 35 illustrates an exemplary schematic diagram depicting a preferred system embodiment implementing a Dual AC Input System with DC Backup and 4 PSU.
Figure 36:
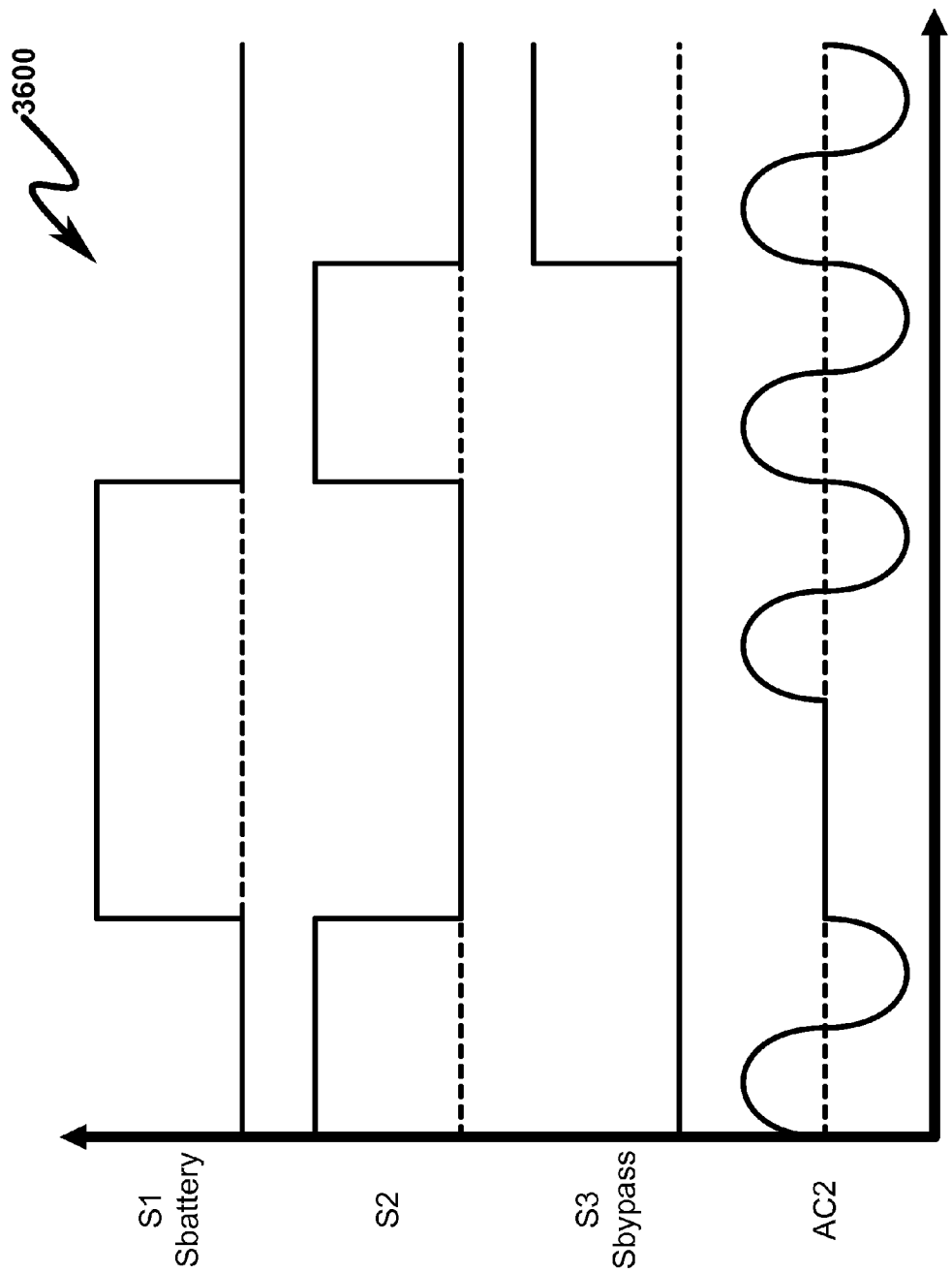
FIG. 36 illustrates exemplary power condition sensing and control waveforms associated with the schematic of FIG. 35.

FIG. 35 (3500)-FIG. 36 (3600) depict a power supply output configuration backup mechanism with two AC sources (3511, 3512) and one DC battery source (3513) that supply power to four PSUs (3541, 3542, 3543, 3544) with full source protection for two PSUs (3541, 3542) and no input protection for the remaining two PSUs (3543, 3544) and includes AC rectifications (3514) to charge the DC battery source (3513). The power condition sense and digital switch network (DSN) (3520) functionality is depicted in FIG. 36 (3600) and ensures that two PSUs (3541, 3542) are fully source protected and that selection of the AC source (3512) or DC source (3513) is realized through on/off control of complementary switches S1 (3531) and S2 (3532).

This configuration and functionality is identical to that of FIG. 33 (3300) with the exception that all unprotected PSUs (3543, 3544) are powered directly from the AC sources (3511, 3512). Note that the PSUs (3541, 3542, 3543, 3544) depicted may operate in this context because of their AC+DC power supply output configuration that provides for universal power input.

This configuration incorporates an automatic bypass switch (3533) to allow for maintenance of the S1 (3531) and/or S2 (3532) switches without loss of power to the PSUs (3541, 3542).

Dual 3-Phase AC Input System (3700)-(3800)

Figure 37:
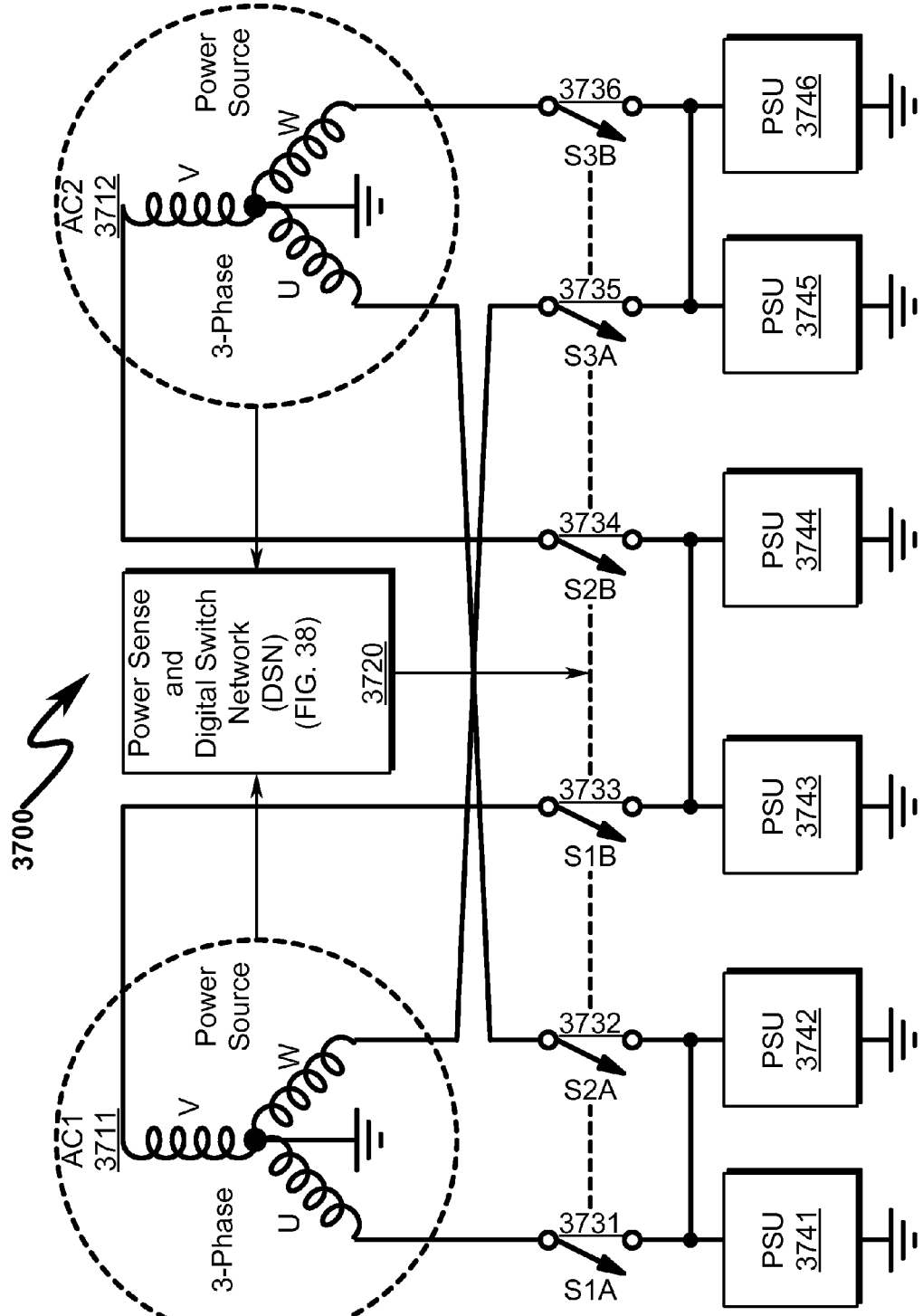
FIG. 37 illustrates an exemplary schematic diagram depicting a preferred system embodiment implementing a Dual 3-Phase AC Input System.
Figure 38:
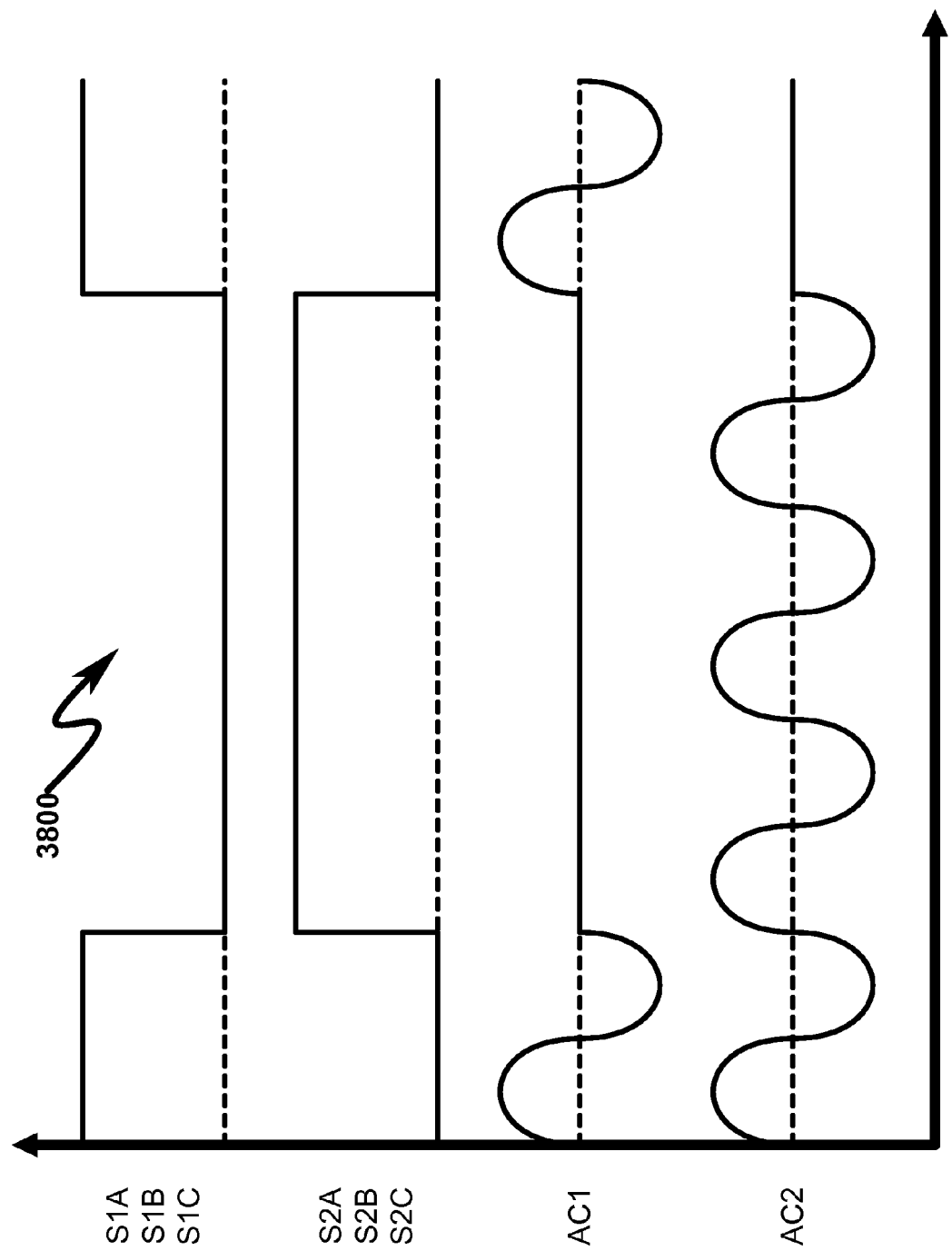
FIG. 38 illustrates exemplary power condition sensing and control waveforms associated with the schematic of FIG. 37.

FIG. 37 (3700)-FIG. 38 (3800) depict a power supply output configuration backup mechanism with two 3-phase AC sources (3711, 3712) that supply power to six PSUs (3741, 3742, 3743, 3744, 3745, 3746) with full source protection for the PSUs (3741, 3742, 3743, 3744, 3745, 3746). The power condition sense and digital switch network (DSN) (3720) functionality is depicted in FIG. 38 (3800) and ensures that the PSUs (3741, 3742, 3743, 3744, 3745, 3746) are fully source protected and that selection of the AC source (3711, 3712) is realized through on/off control of complementary 3-phase switches S1 (3731, 3733, 3735) and S2 (3732, 3734, 3736).

3-Phase AC+Battery Input System (3900)-(4000)

Figure 39:
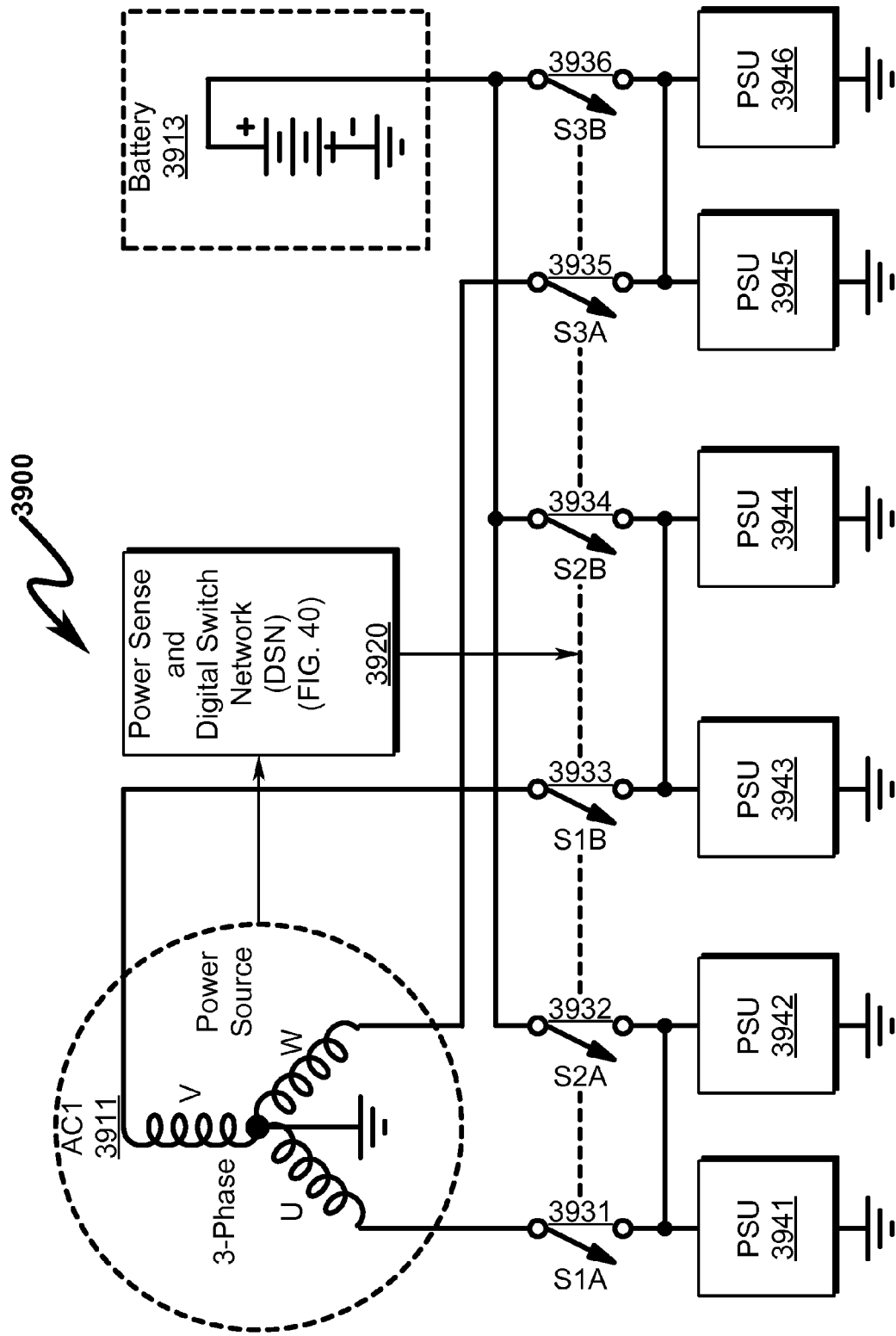
FIG. 39 illustrates an exemplary schematic diagram depicting a preferred system embodiment implementing a 3-Phase AC+Battery Input System.
Figure 40:
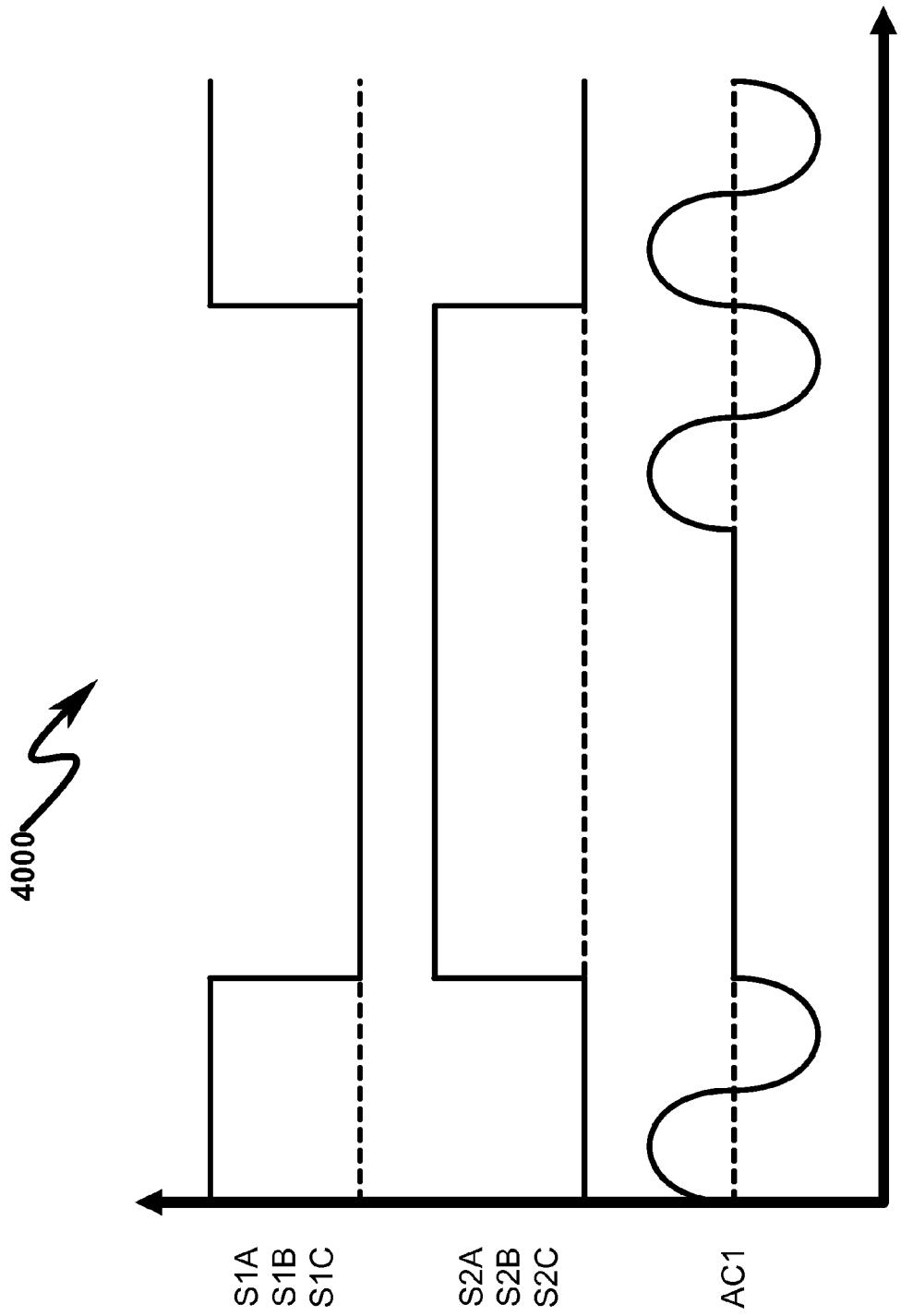
FIG. 40 illustrates exemplary power condition sensing and control waveforms associated with the schematic of FIG. 39.

FIG. 39 (3900)-FIG. 40 (4000) depict a power supply output configuration backup mechanism with a 3-phase AC source (3911) and an auxiliary battery (3913) that supply power to six PSUs (3941, 3942, 3943, 3944, 3945, 3946) with full source protection for the PSUs (3941, 3942, 3943, 3944, 3945, 3946). The power condition sense and digital switch network (DSN) (3920) functionality is depicted in FIG. 40 (4000) and ensures that the PSUs (3941, 3942, 3943, 3944, 3945, 3946) are fully source protected and that selection of the AC source (3911) or DC battery source (3913) is realized through on/off control of complementary 3-phase switches S1 (3931, 3933, 3935) and S2 (3932, 3934, 3936).

3-Phase AC+Battery+Rectifier Input System (4100)-(4200)

Figure 41:
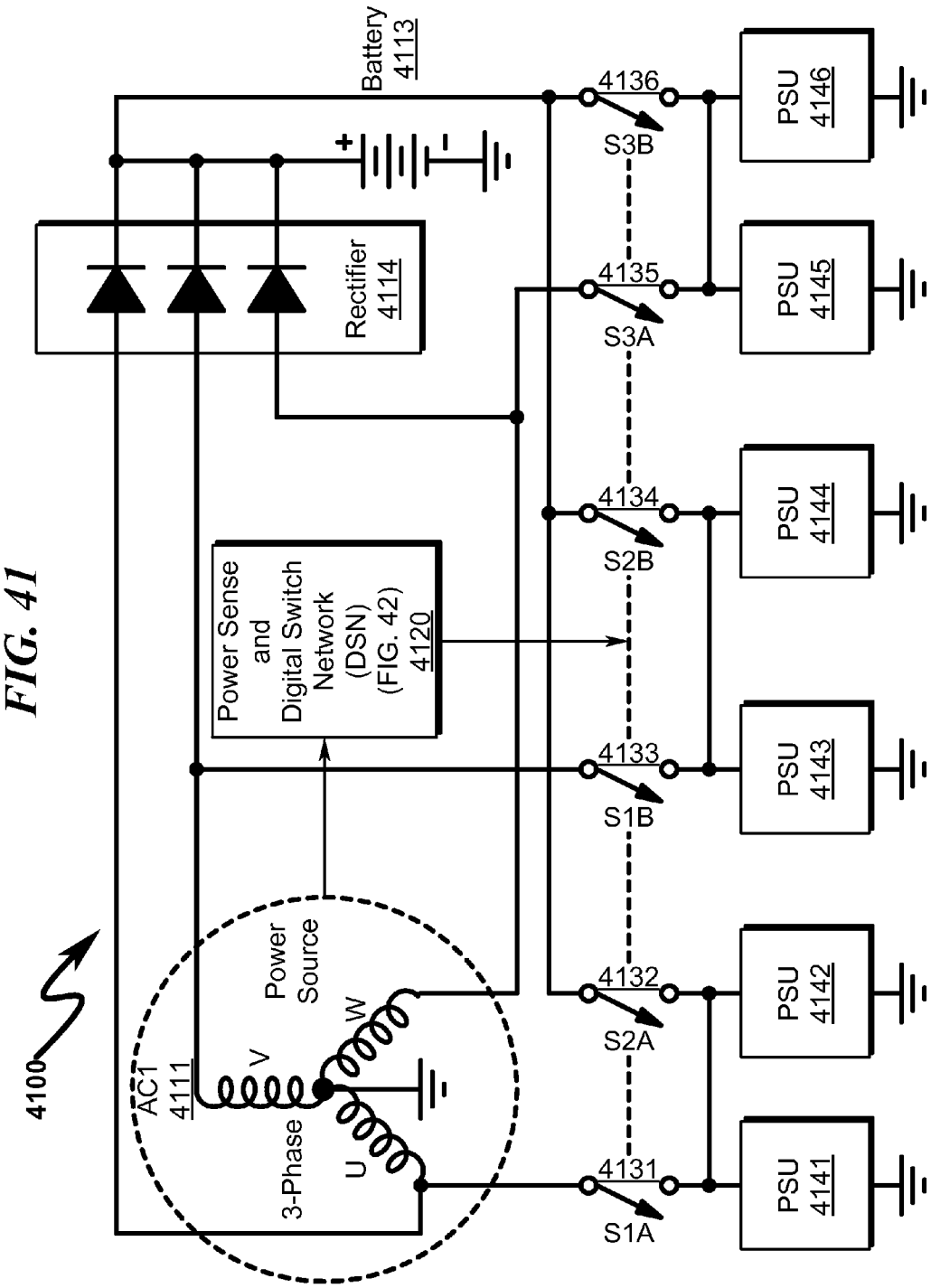
FIG. 41 illustrates an exemplary schematic diagram depicting a preferred system embodiment implementing a 3-Phase AC+Battery+Rectifier Input System.
Figure 42:
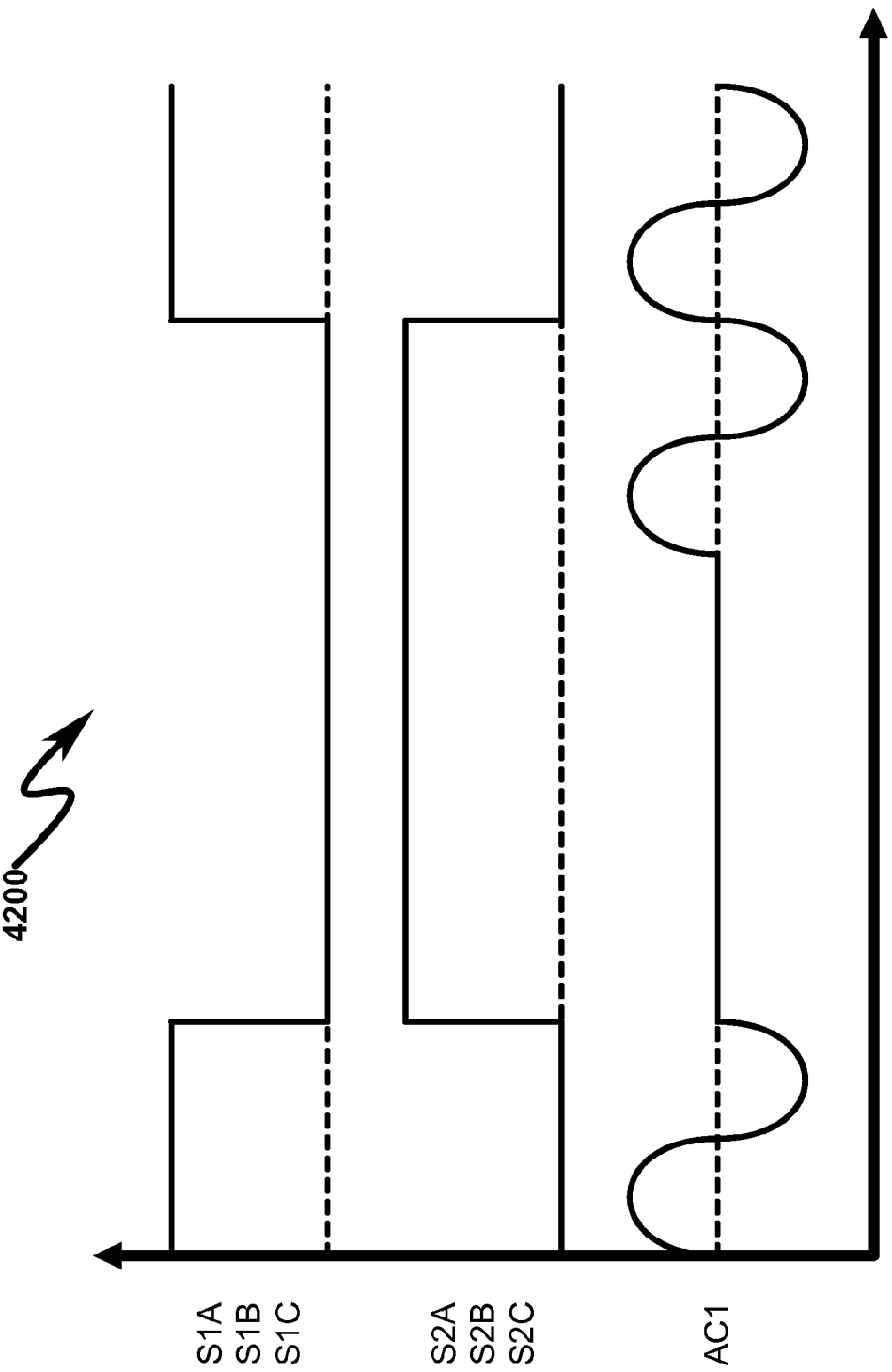
FIG. 42 illustrates exemplary power condition sensing and control waveforms associated with the schematic of FIG. 41.

FIG. 41 (4100)-FIG. 42 (4200) depict a power supply output configuration backup mechanism with a 3-phase AC source (4111) and an auxiliary battery (4113) that supply power to six PSUs (4141, 4142, 4143, 4144, 4145, 4146) with full source protection for the PSUs (4141, 4142, 4143, 4144, 4145, 4146). The power condition sense and digital switch network (DSN) (4120) functionality is depicted in FIG. 42 (4200) and ensures that the PSUs (4141, 4142, 4143, 4144, 4145, 4146) are fully source protected and that selection of the AC source (4111) or DC battery source (4113) is realized through on/off control of complementary 3-phase switches S1 (4131, 4133, 4135) and S2 (4132, 4134, 4136). In this configuration a rectifier (4114) is used to keep the DC battery (4113) fully charged using the 3-phase AC source (4111).

3-Phase AC+Battery+Rectifier Input System (4300)-(4400)

Figure 43:
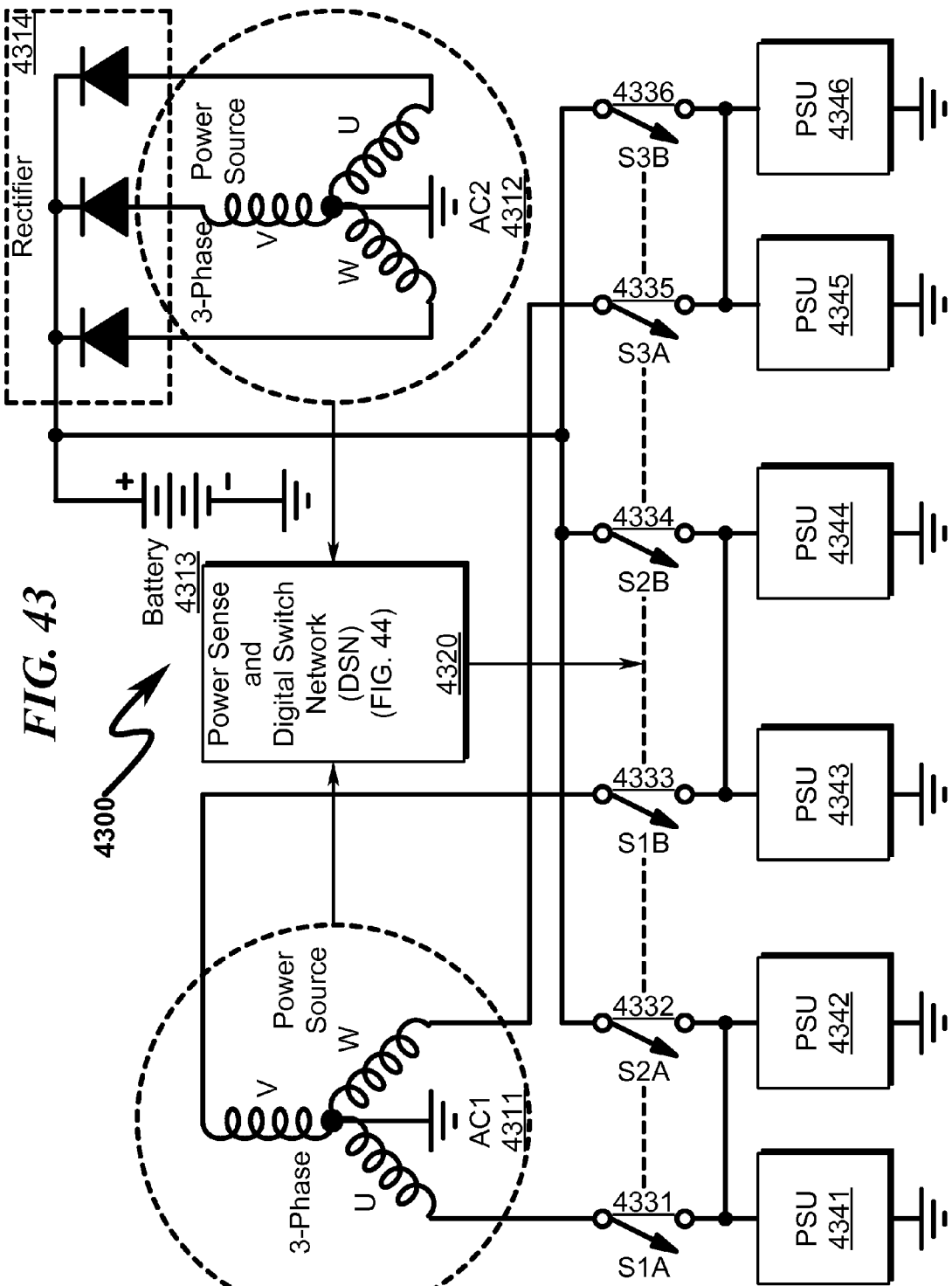
FIG. 43 illustrates an exemplary schematic diagram depicting a preferred system embodiment implementing a 3-Phase AC+Battery+Rectifier Input System.
Figure 44:
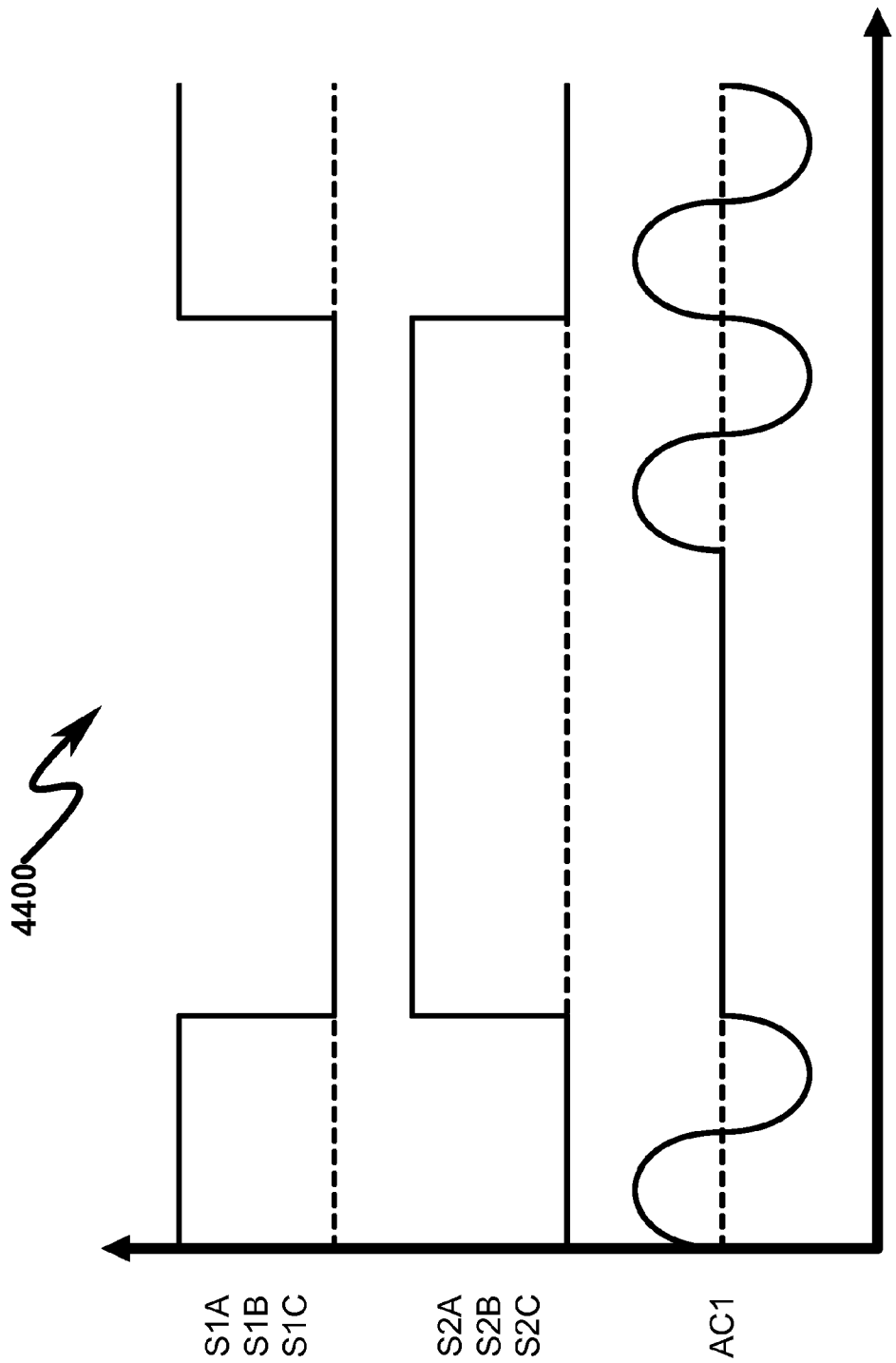
FIG. 44 illustrates exemplary power condition sensing and control waveforms associated with the schematic of FIG. 43.

FIG. 43 (4300)-FIG. 44 (4400) depict a power supply output configuration backup mechanism with a 3-phase AC source (4311) and an auxiliary battery (4313) that supply power to six PSUs (4341, 4342, 4343, 4344, 4345, 4346) with full source protection for the PSUs (4341, 4342, 4343, 4344, 4345, 4346). The power condition sense and digital switch network (DSN) (4320) functionality is depicted in FIG. 44 (4400) and ensures that the PSUs (4341, 4342, 4343, 4344, 4345, 4346) are fully source protected and that selection of the AC source (4311) or DC battery source (4313) is realized through on/off control of complementary 3-phase switches S1 (4331, 4333, 4335) and S2 (4332, 4334, 4336). In this configuration a rectifier (4314) is used to keep the DC battery (4313) fully charged using an alternate 3-phase AC source (4312).

3-Phase AC+Battery+Rectifier Input System (4500)-(4600)

Figure 45:
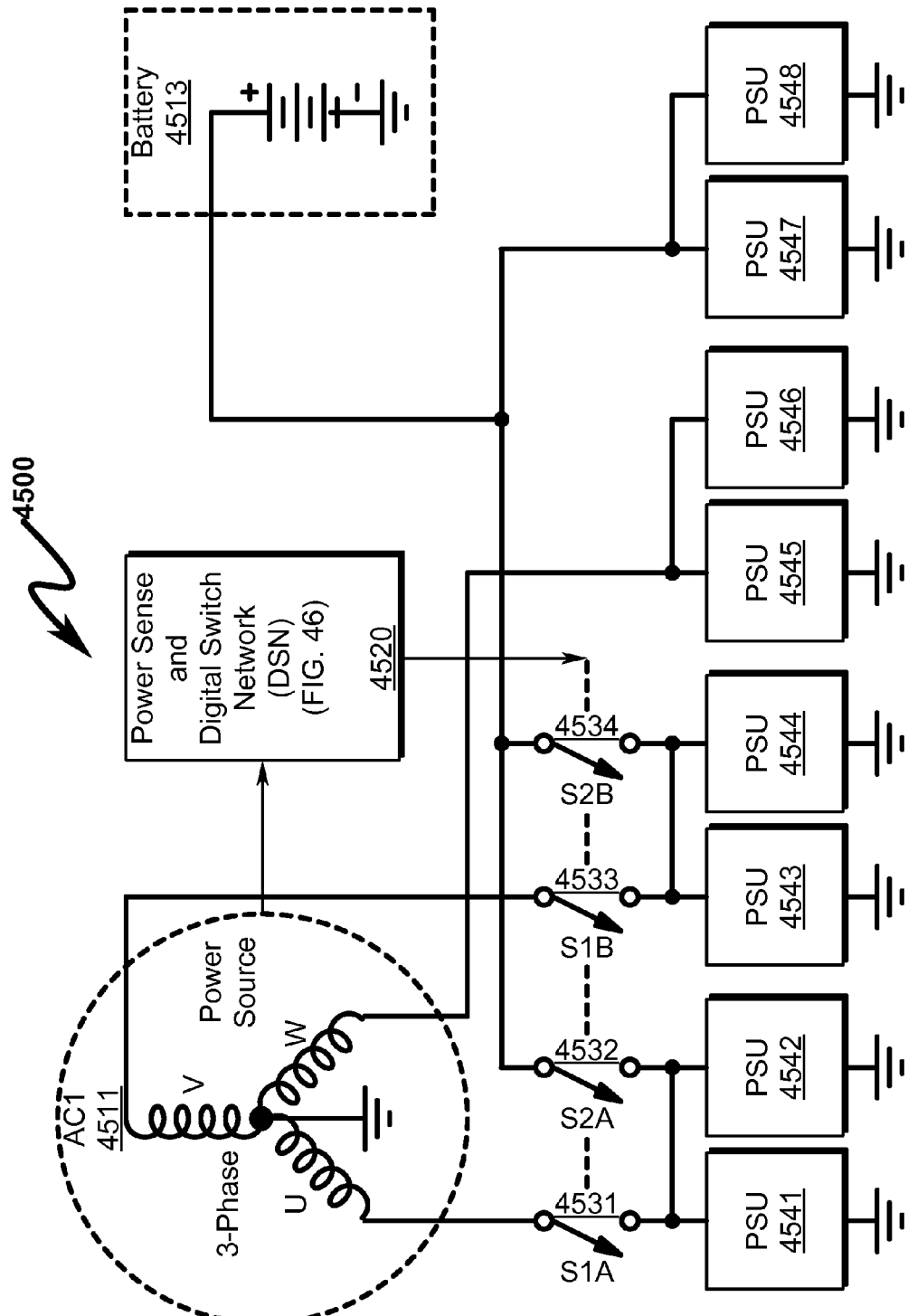
FIG. 45 illustrates an exemplary schematic diagram depicting a preferred system embodiment implementing a 3-Phase AC+Battery+Rectifier Input System.
Figure 46:
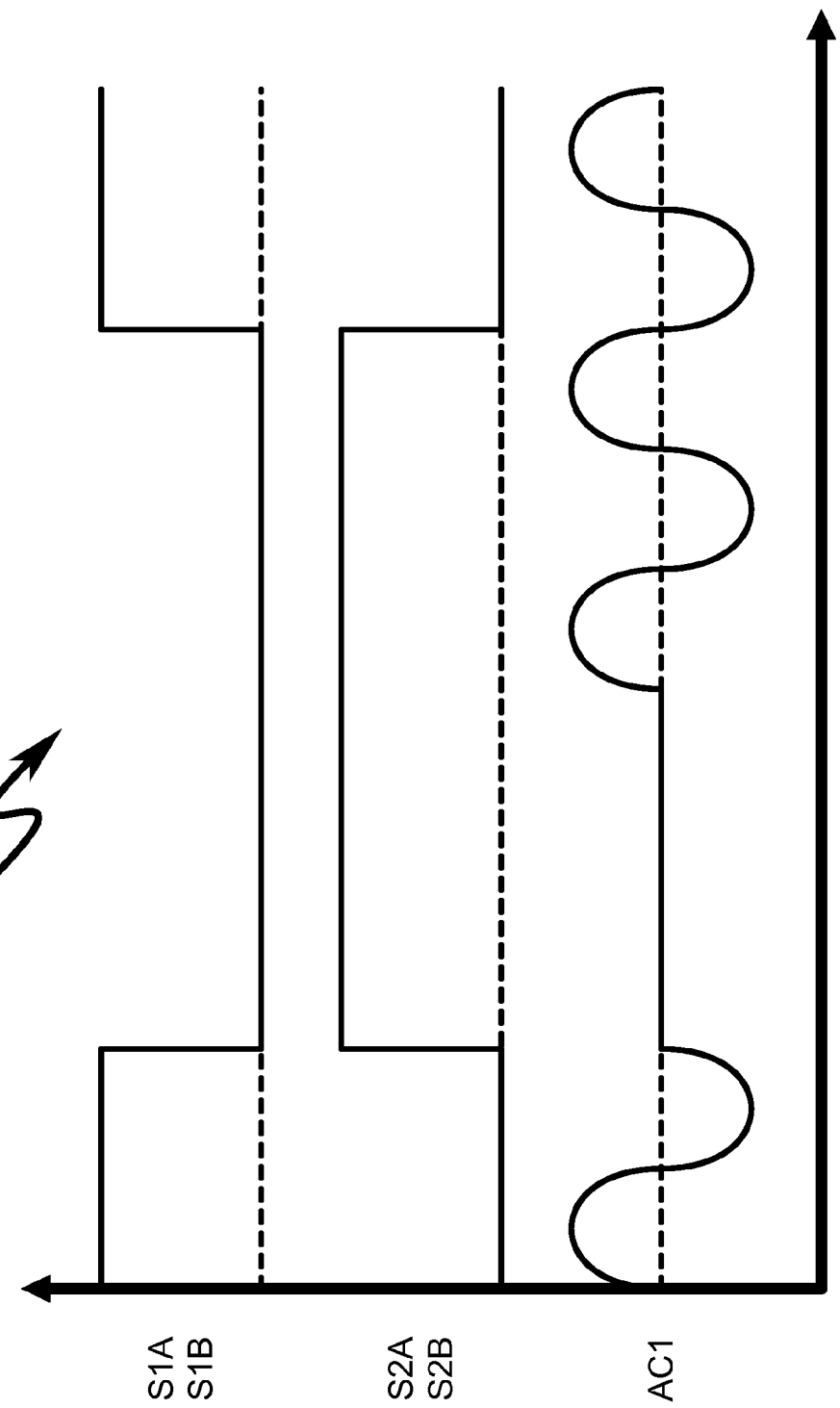
FIG. 46 illustrates exemplary power condition sensing and control waveforms associated with the schematic of FIG. 45.

FIG. 45 (4500)-FIG. 46 (4600) depict a power supply output configuration backup mechanism with a 3-phase AC source (4511) and an auxiliary battery (4513) that supply power to eight PSUs (4541, 4542, 4543, 4544, 4545, 4546, 4547, 4548) with full source protection for four PSUs (4541, 4542, 4543, 4544) and no input protection for the remaining four PSUs (4545, 4546, 4547, 4548). The power condition sense and digital switch network (DSN) (4520) functionality is depicted in FIG. 46 (4600) and ensures that four PSUs (4541, 4542, 4543, 4544) are fully source protected and that selection of the AC source (4511) or DC battery source (4513) is realized through on/off control of complementary 3-phase switches S1 (4531, 4533) and S2 (4532, 4534). In this configuration the DC battery (4513) is maintained using an external charging source.

3-Phase AC+Battery+Rectifier Input System (4700)-(4800)

Figure 47:
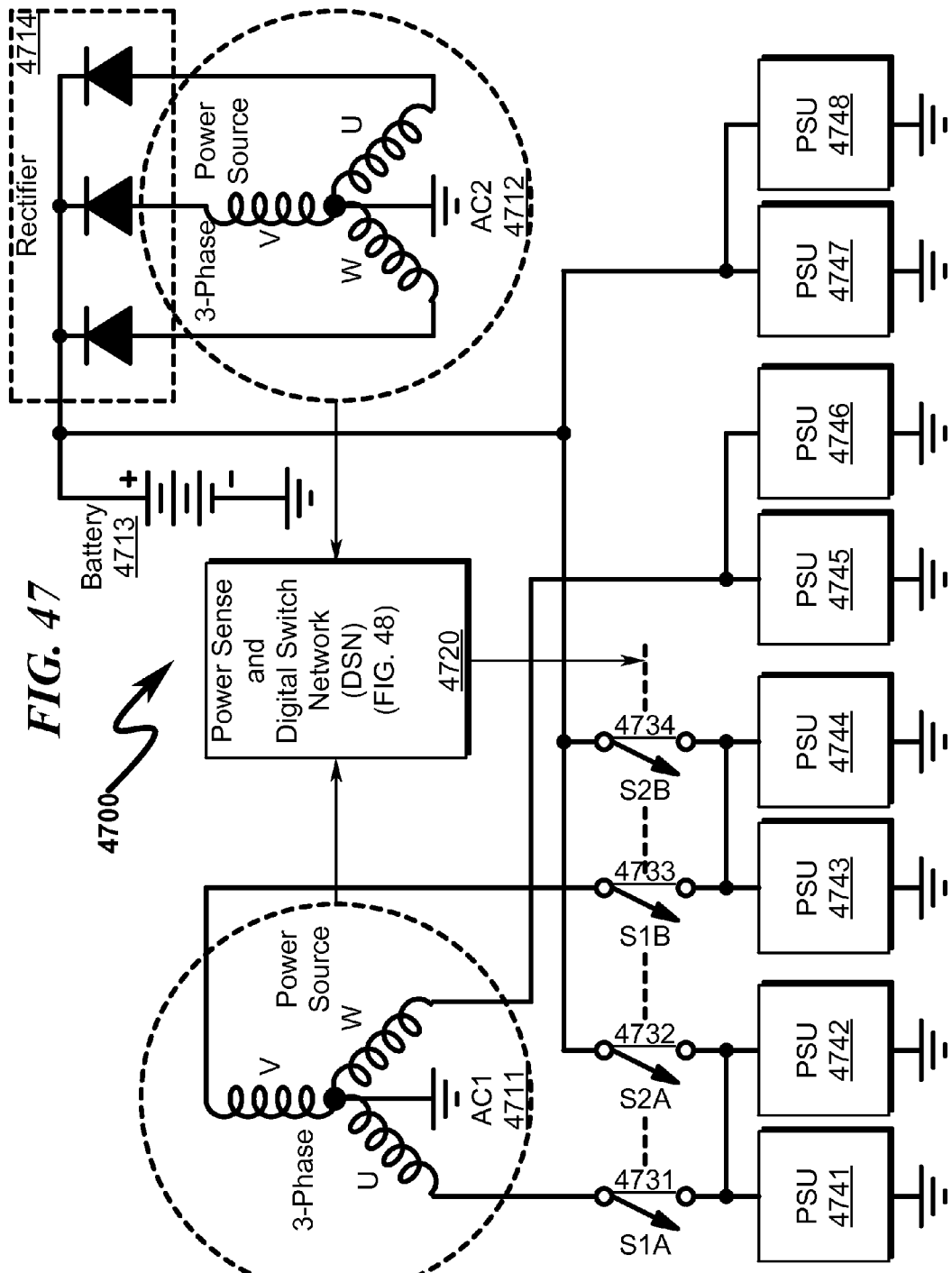
FIG. 47 illustrates an exemplary schematic diagram depicting a preferred system embodiment implementing a 3-Phase AC+Battery+Rectifier Input System.
Figure 48:
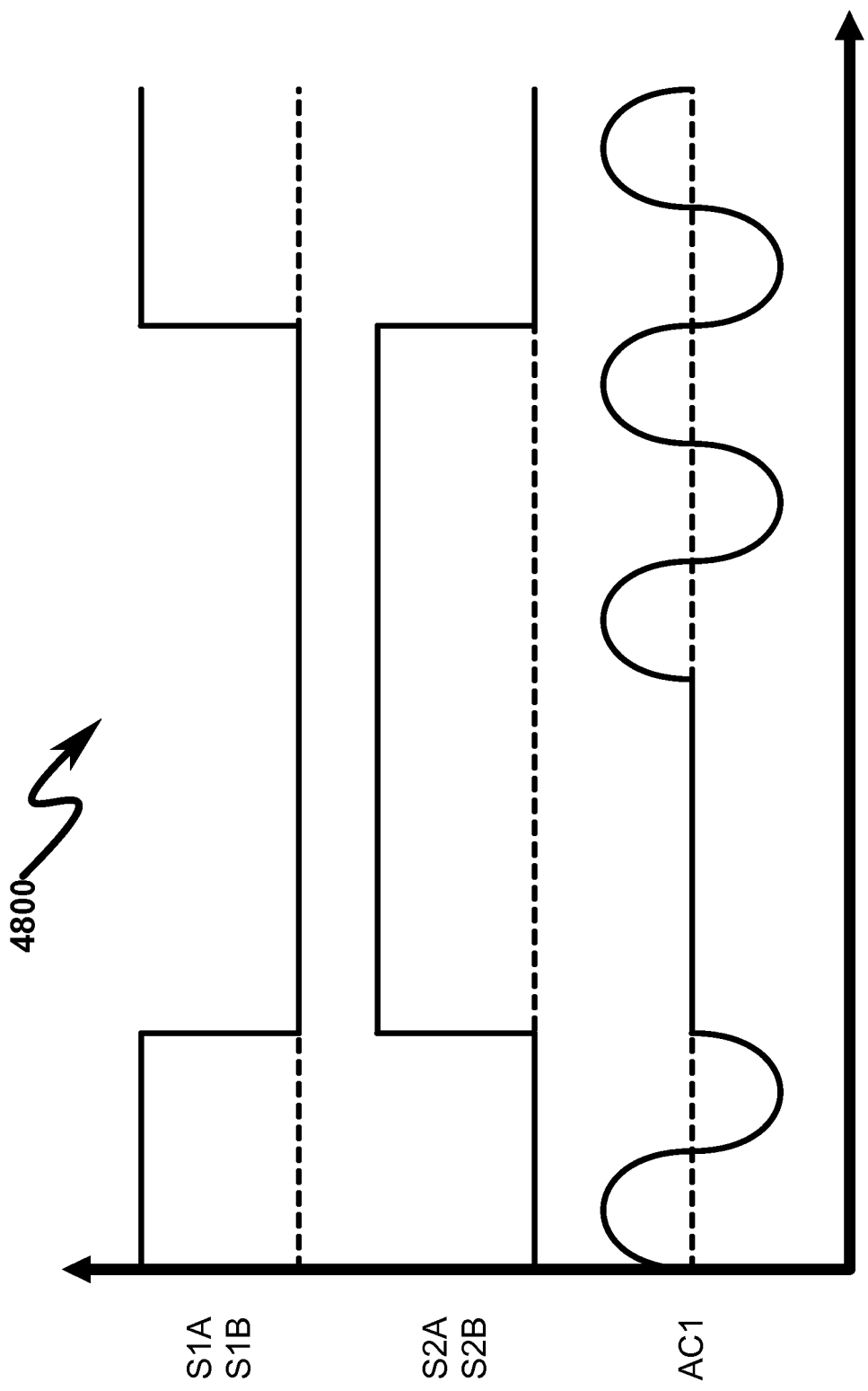
FIG. 48 illustrates exemplary power condition sensing and control waveforms associated with the schematic of FIG. 47.

FIG. 47 (4700)-FIG. 48 (4800) depict a power supply output configuration backup mechanism with two 3-phase AC sources (4711, 4712) and an auxiliary battery (4713) that supply power to eight PSUs (4741, 4742, 4743, 4744, 4745, 4746, 4747, 4748) with full source protection for six PSUs (4741, 4742, 4743, 4744, 4747, 4748) and no input protection for the remaining two PSUs (4745, 4746). The power condition sense and digital switch network (DSN) (4720) functionality is depicted in FIG. 48 (4800) and ensures that six PSUs (4741, 4742, 4743, 4744, 4747, 4748) are fully source protected and that selection of the AC source (4711) or DC battery source (4713) is realized through on/off control of complementary 3-phase switches S1 (4731, 4733) and S2 (4732, 4734). In this configuration the DC battery (4713) is maintained using a separate 3-phase AC source (4712).

Single AC Source with DC Battery Backup (4900)-(5100)

Figure 49:
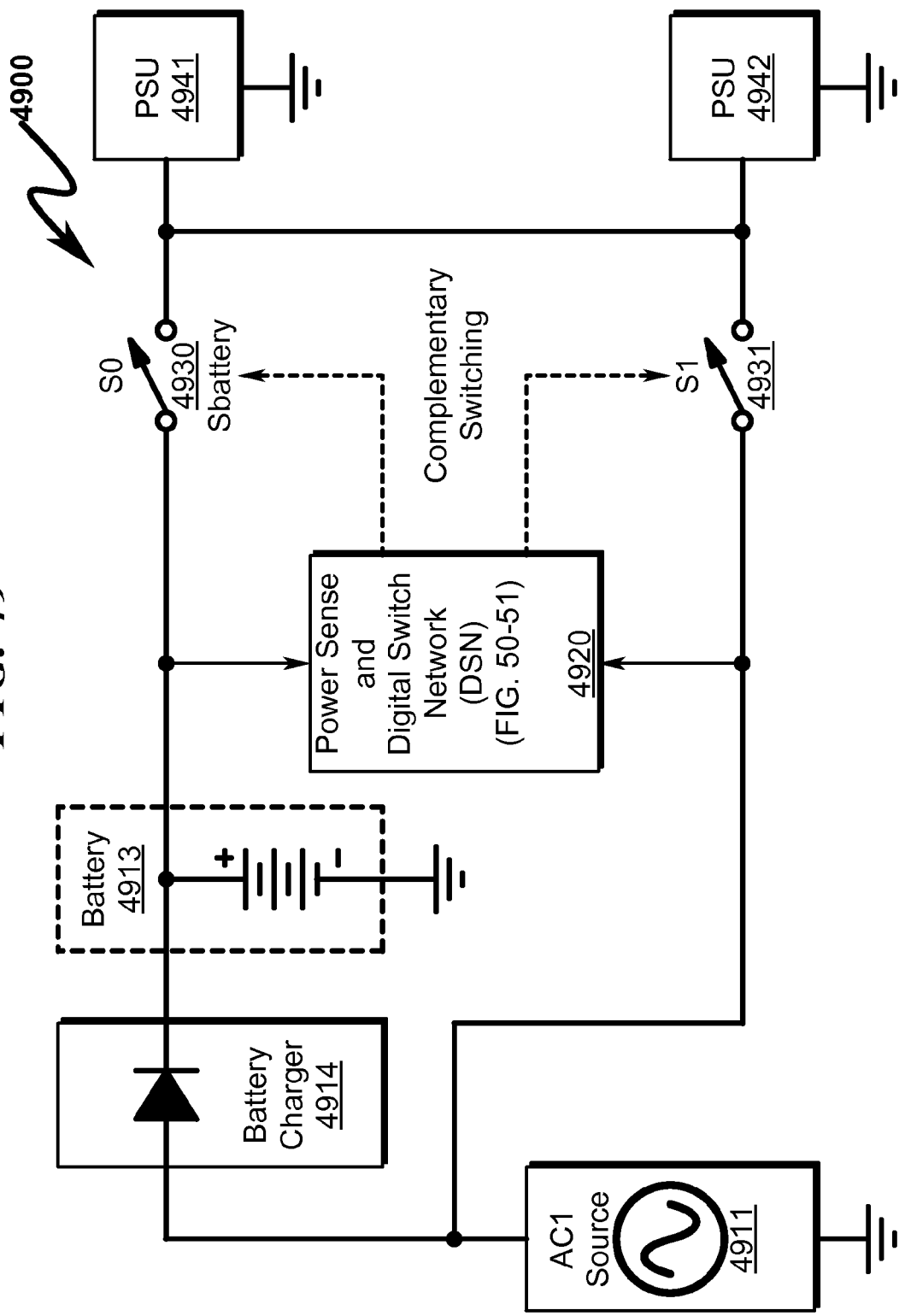
FIG. 49 illustrates a block diagram depicting a preferred exemplary invention system embodiment implementing a single AC source with DC battery backup.
Figure 50:
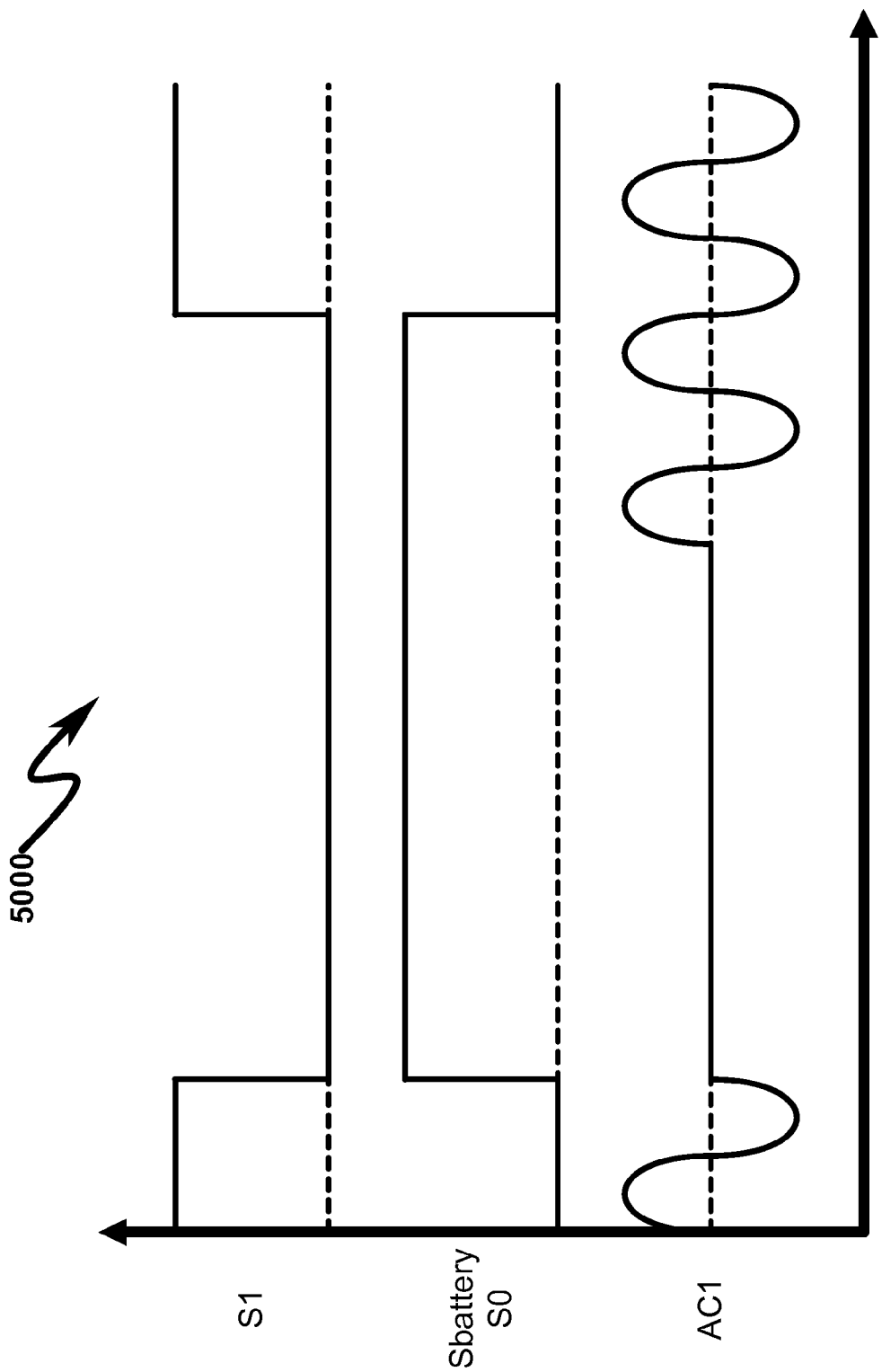
FIG. 50 illustrates a timing diagram depicting a preferred exemplary invention embodiment implementing a single AC source with DC battery backup.
Figure 51:
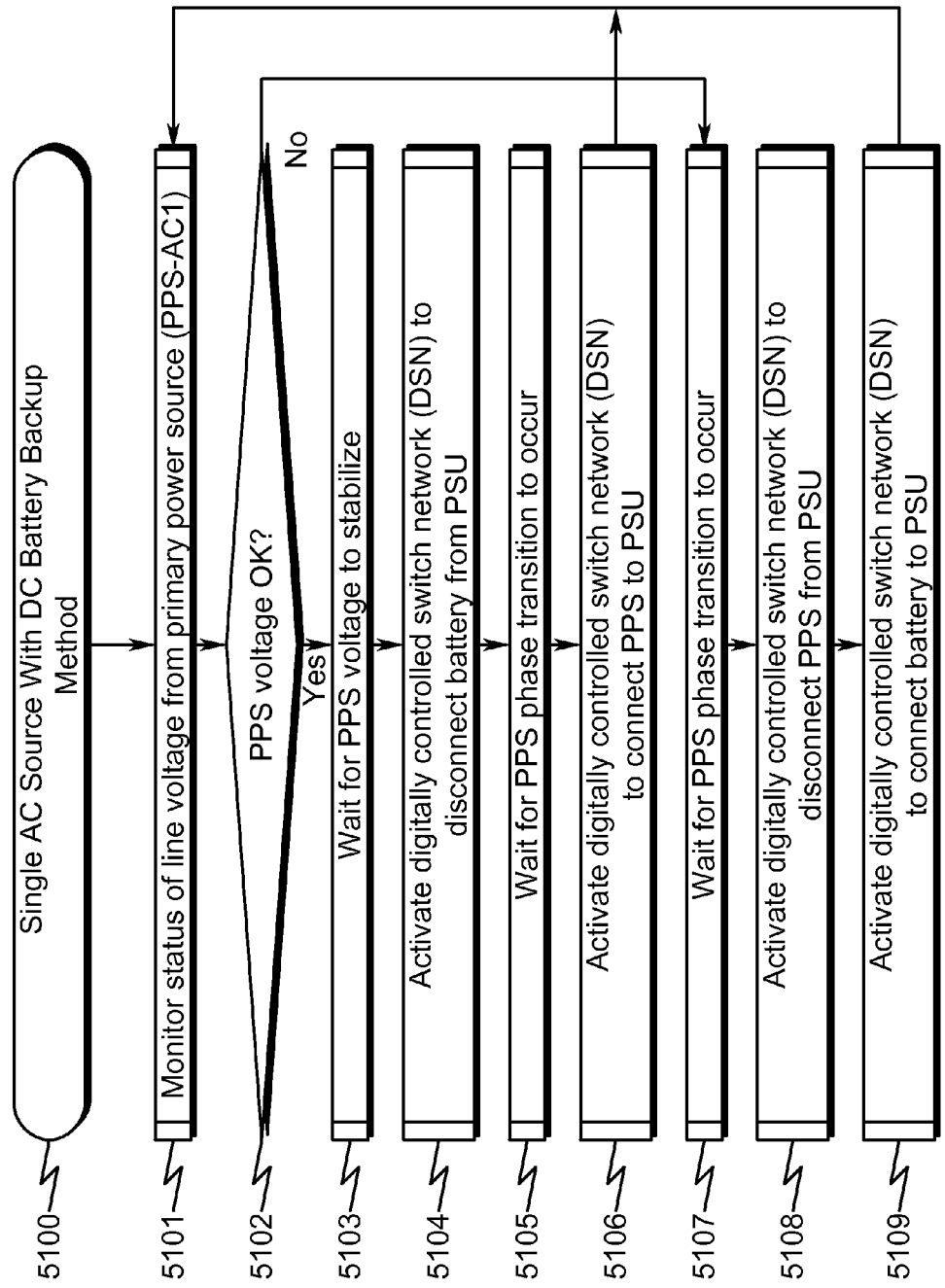
FIG. 51 illustrates a flowchart depicting a preferred exemplary invention method embodiment implementing a single AC source with DC battery backup.

As generally depicted in FIG. 49 (4900)-FIG. 51 (5100), the present invention may be embodied in a system wherein a single AC source (4911) supplying power to two AC/DC PSUs (4941, 4942) via complementary switches S0 (4930) and S1 (4931). S0 (4930) operates to support the AC/DC PSUs (4941, 4942) via a battery (4913) that is maintained with a battery charger (4914) from the AC source (4911). The power sense and digital switching network (DSN) (4920) is responsible for sensing the AC source (4911) voltage and actuating the complementary switches S0 (4930) and S1 (4931) as indicated in the timing diagram of FIG. 50 (5000) and method flowchart of FIG. 51 (5100). The ability of the AC/DC PSUs (4941, 4942) to accept AC or DC input provides for the use of complementary DC (4930) and AC (4931) switching in this embodiment.

Contrast with Traditional Offline UPS (5200)-(5400)

Figure 52:
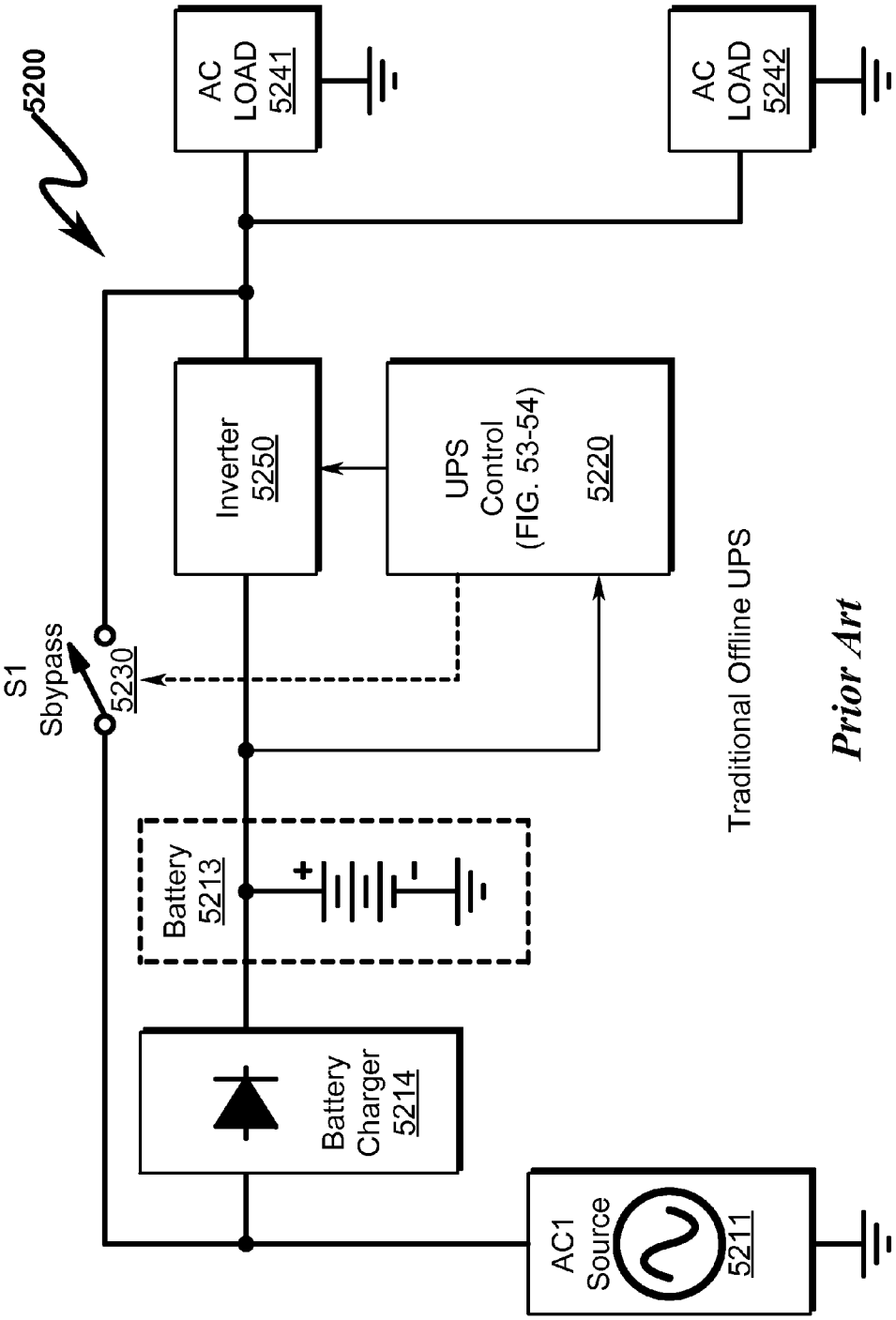
FIG. 52 illustrates a block diagram describing a prior art traditional offline UPS.
Figure 53:
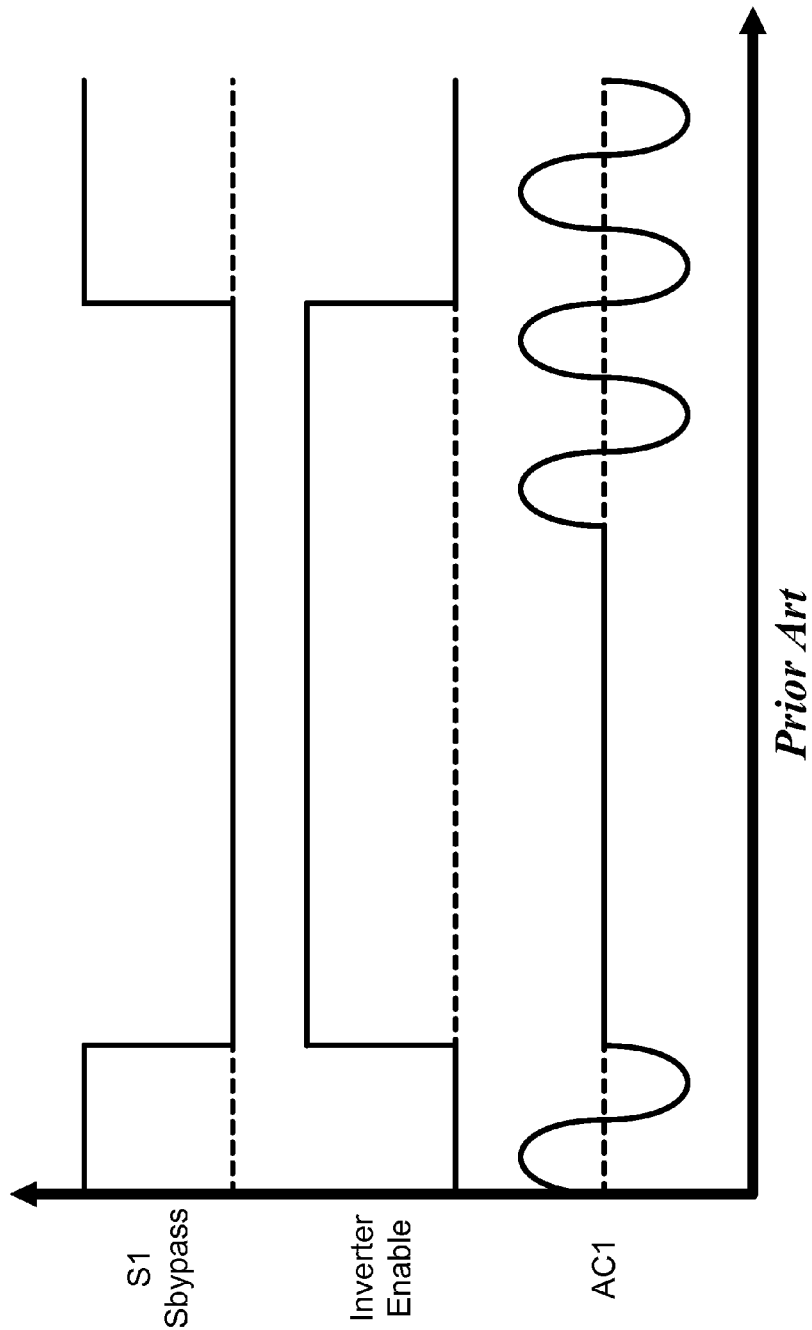
FIG. 53 illustrates a timing diagram describing a prior art traditional offline UPS.
Figure 54:
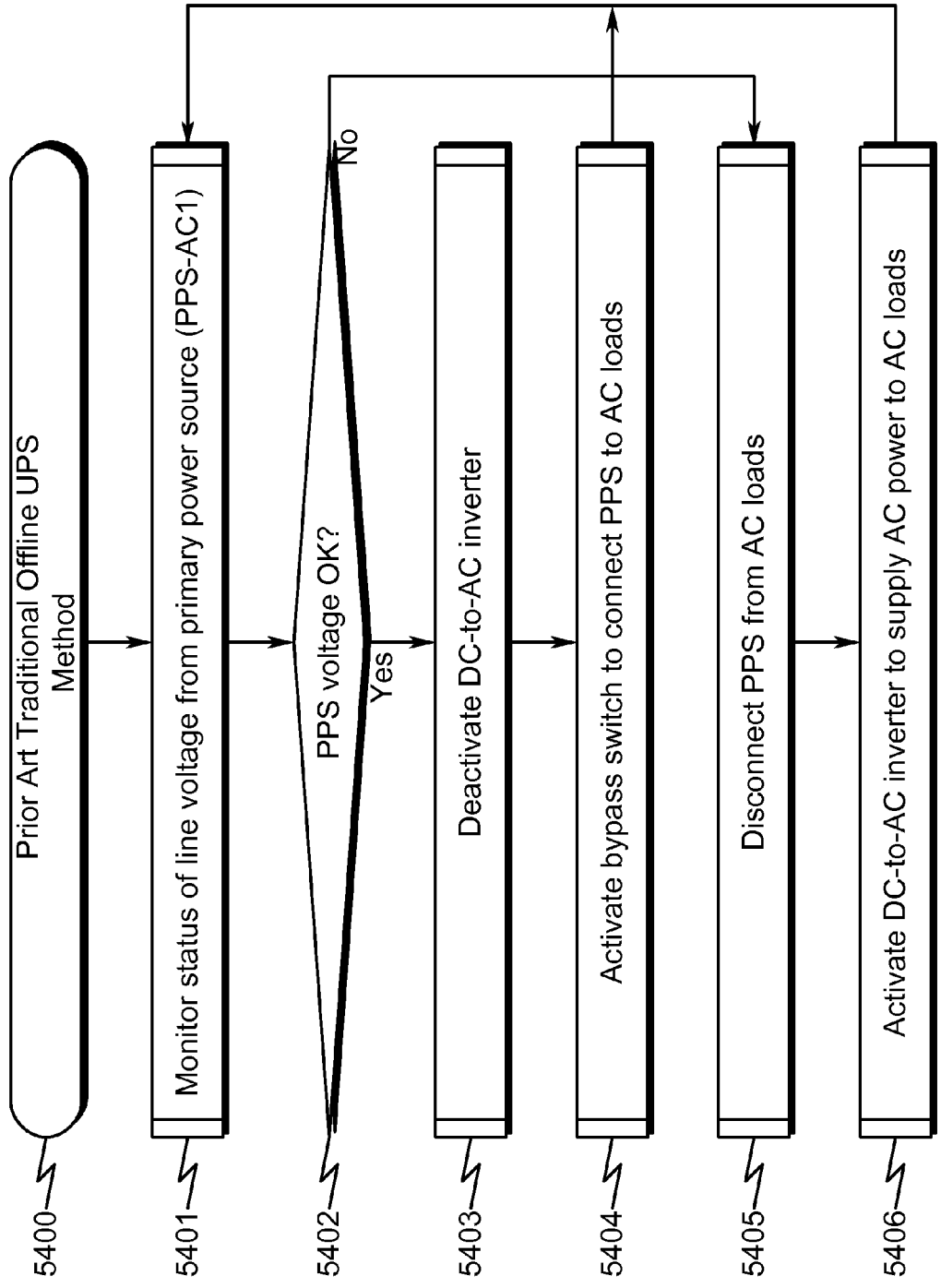
FIG. 54 illustrates a flowchart describing a prior art traditional offline UPS.

The configuration depicted in FIG. 49 (4900)-FIG. 51 (5100) may be contrasted with traditional prior art offline UPS configurations as generally depicted in FIG. 52 (5200)-FIG. 54 (5400), wherein the use of a single AC source (5211) requires the use of an inverter (5250) as an interface between the battery backup (5213) and the loads (5241, 5242) which are restricted to AC-only variants. Control functions as depicted in the timing diagram of FIG. 53 (5300) and method flowchart of FIG. 54 (5400) illustrate that the operation of bypass switch S1 (5230) and the inverter (5250) are mutually exclusive in this prior art power supply topology. This configuration represents a significant cost penalty compared to the present invention embodiment depicted in FIG. 49 (4900) and FIG. 50 (5000) because the addition of the inverter stage (5250) increases cost and reduces overall system efficiency during failure of the AC source (5211). This reduced efficiency results in a shorter backup time for a given battery (5213) and also requires a more robust battery charger (5214) for the maintenance of the battery (5213).

AC Source+DC Battery Backup for Hybrid Load (5500)-(5700)

Figure 55:
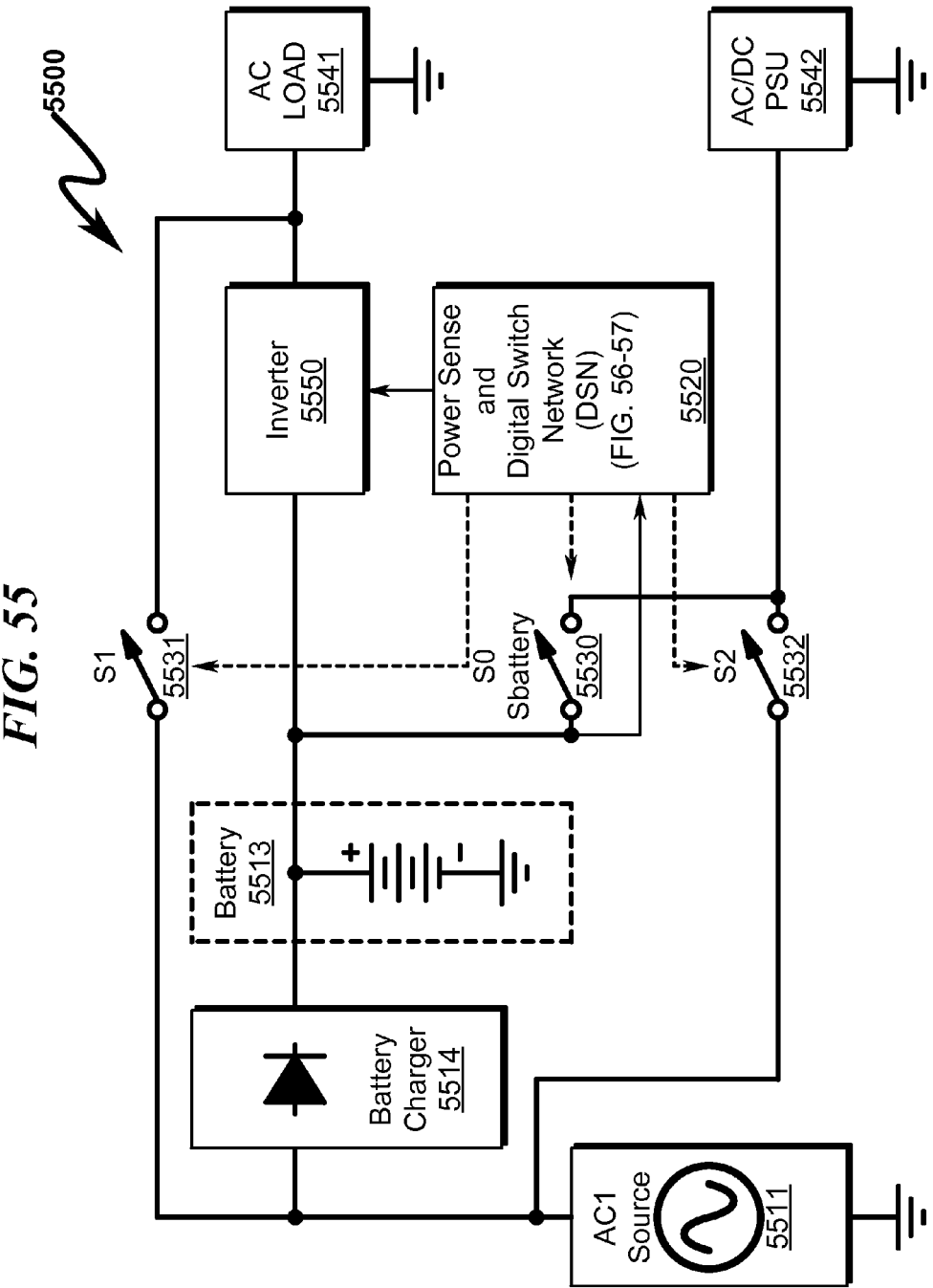
FIG. 55 illustrates a block diagram depicting a preferred exemplary invention system embodiment implementing an AC source+DC battery backup for hybrid load.
Figure 56:
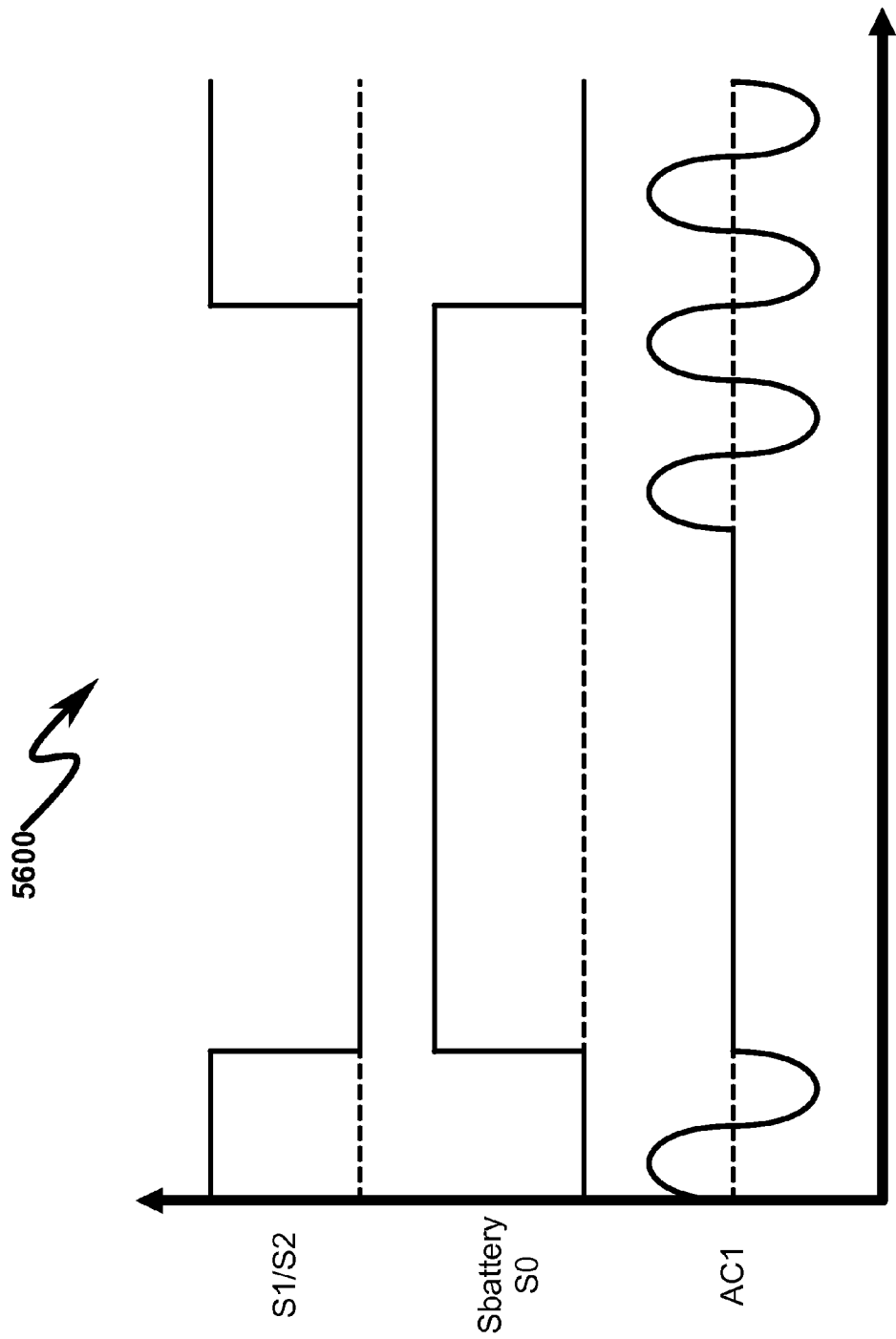
FIG. 56 illustrates a timing diagram depicting a preferred exemplary invention embodiment implementing an AC source+DC battery backup for hybrid load.
Figure 57:
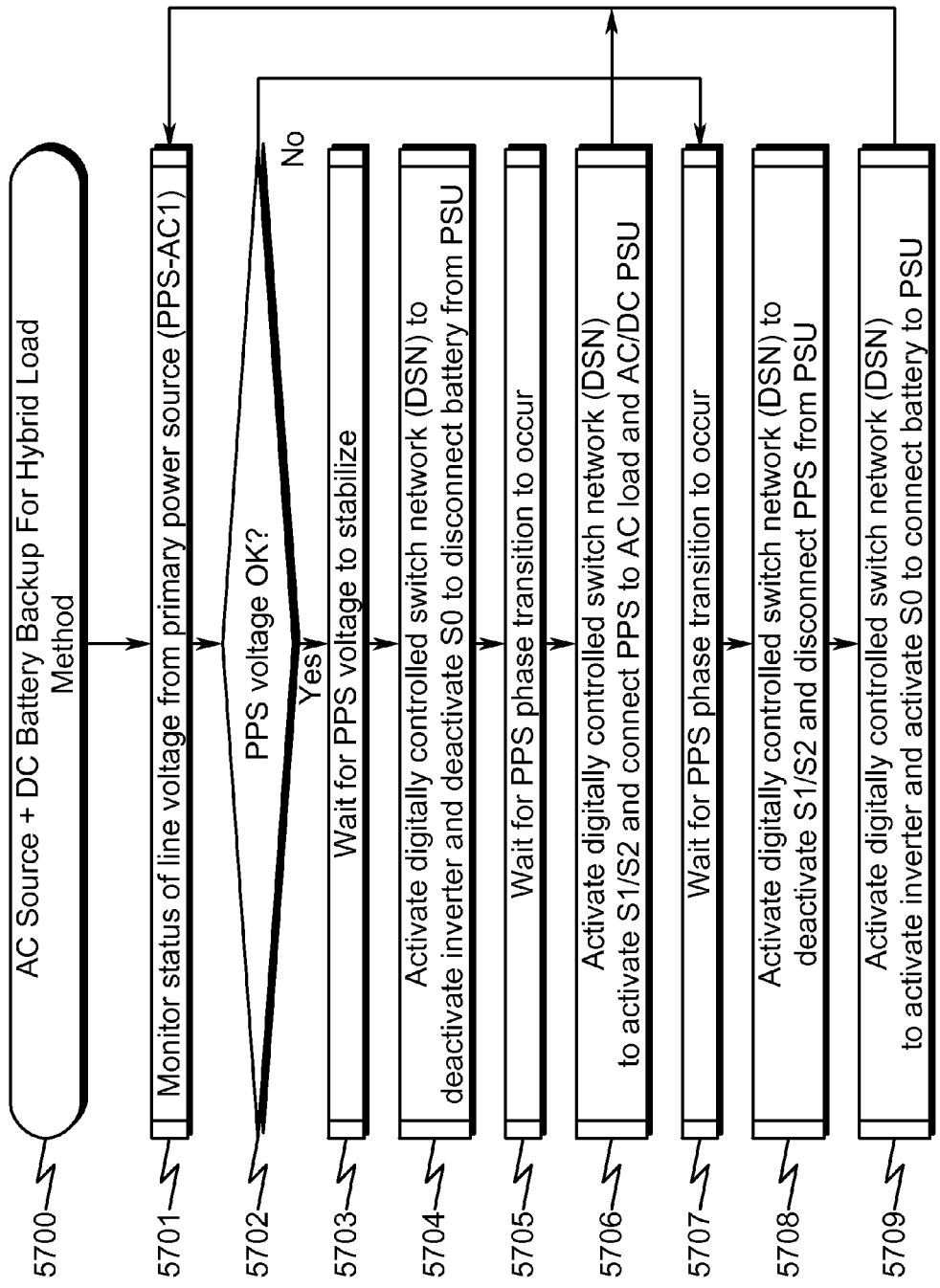
FIG. 57 illustrates a flowchart depicting a preferred exemplary invention method embodiment implementing an AC source+DC battery backup for hybrid load.

The configuration depicted in FIG. 49 (4900)-FIG. 51 (5100) may be combined with the traditional prior art offline UPS configuration as generally depicted in FIG. 52 (5200) and FIG. 54 (5400) to form a hybrid load configuration as generally depicted in FIG. 55 (5500)-FIG. 57 (5700). Here an AC-only load (5541) and an AC/DC load (5542) are supported by a single AC source (5511). As with the traditional UPS system, the AC-only load (5541) may be serviced by an inverter (5550) during a failure of the AC source (5511), but the AC/DC PSU (5542) can be operated directly from the battery (5513) with an AC source (5511) via operation of the S0 Sbattery (5530) switch by the DSN (5520). These control functions are depicted in the timing diagram of FIG. 56 (5600) and method flowchart of FIG. 57 (5700). This configuration permits longer operation of the system on battery backup because the conversion inefficiencies associated with the inverter (5550) are isolated to only half of the system loads (the AC-only load (5541). The remaining AC/DC PSU (5542) can operate directly from battery power (5513) at higher conversion efficiency, thus increasing overall uptime on reserve battery power.

2 AC Source+DC Battery Backup for Hybrid Load (5800)-(6000)

Figure 58:
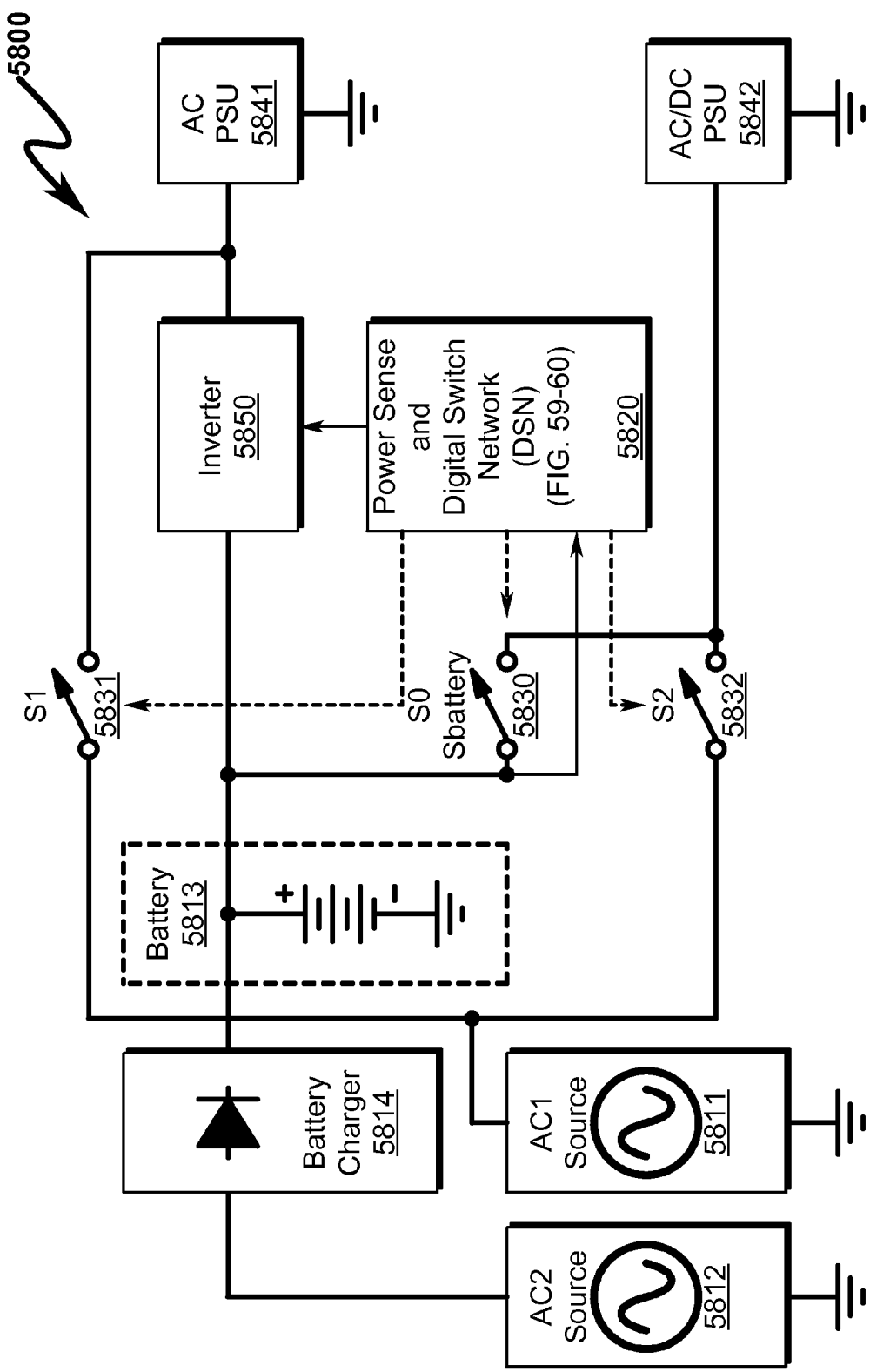
FIG. 58 illustrates a block diagram depicting a preferred exemplary invention system embodiment implementing 2 AC source+DC battery backup for hybrid load.
Figure 59:
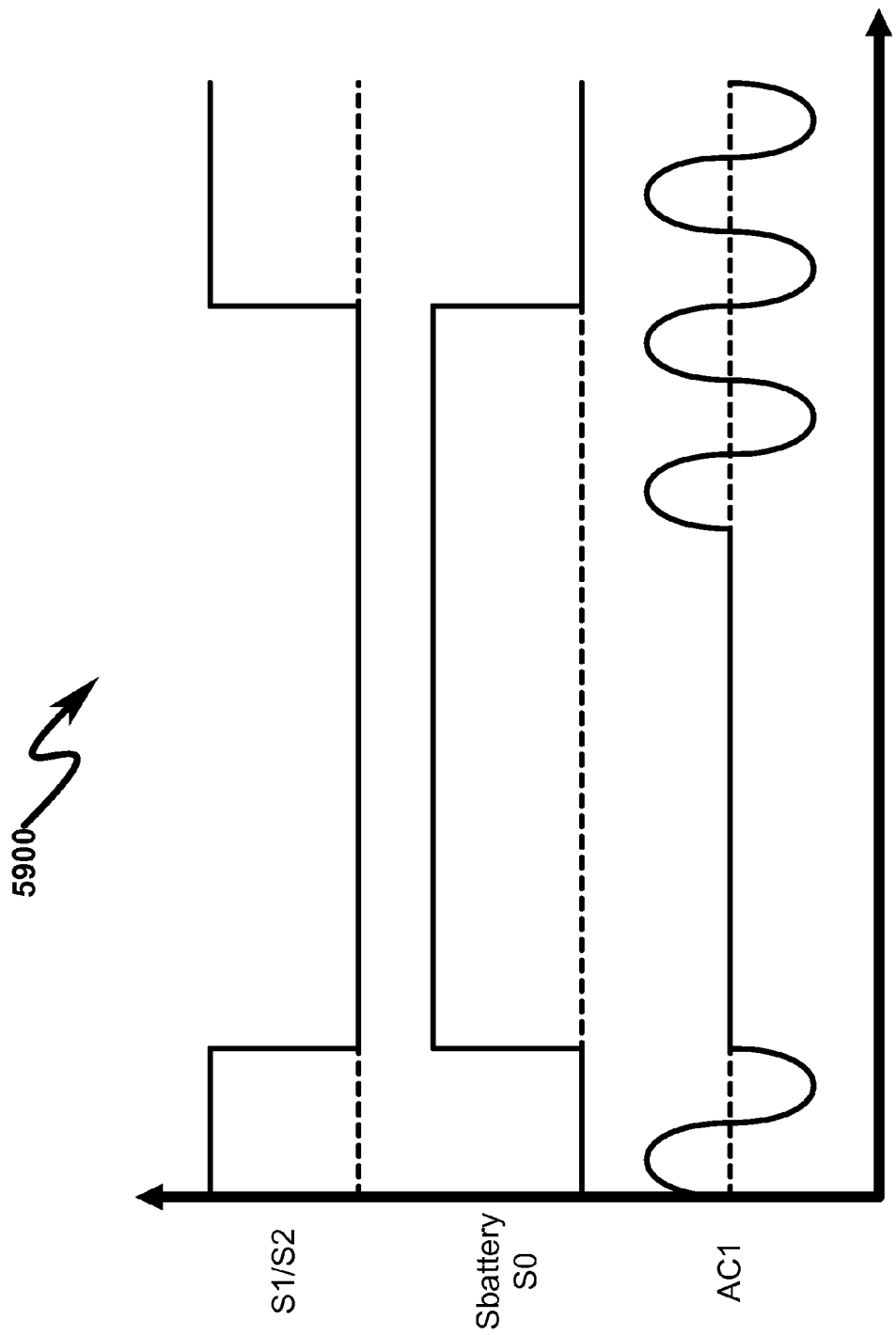
FIG. 59 illustrates a timing diagram depicting a preferred exemplary invention embodiment implementing 2 AC source+DC battery backup for hybrid load.
Figure 60:
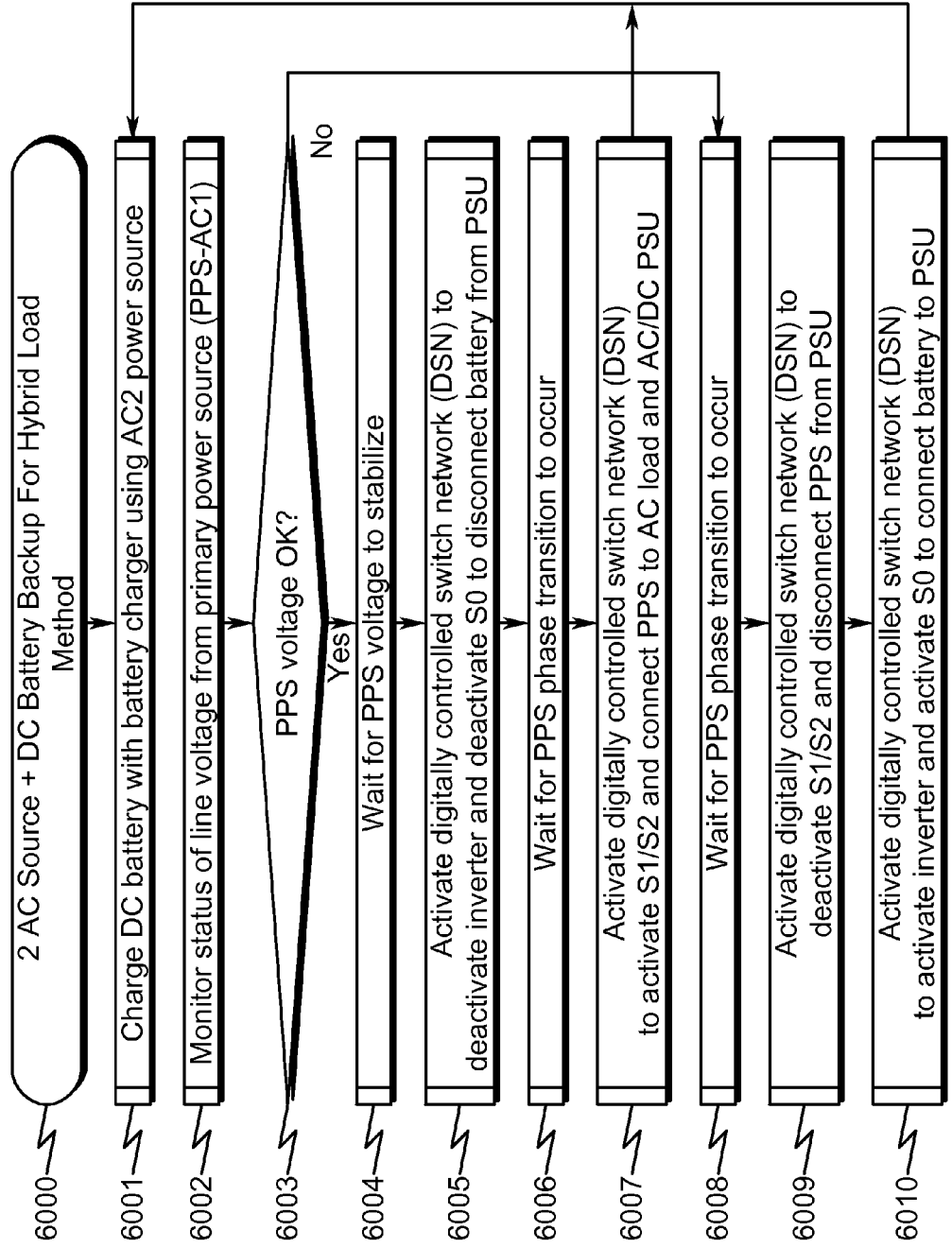
FIG. 60 illustrates a flowchart depicting a preferred exemplary invention method embodiment implementing 2 AC source+DC battery backup for hybrid load.

The configuration depicted in FIG. 55 (5500)-FIG. 57 (5700) may be expanded to support dual AC sources (5811, 5812) as generally depicted in FIG. 58 (5800)-FIG. 60 (6000). Here an AC source (5811) serves to support the loads (5841, 5842) as described in FIG. 55 (5500)-FIG. 57 (5700) with the exception that the battery (5813) is maintained by a battery charger (5814) that draws power from a separate AC charging supply (5812). These control functions are depicted in the timing diagram of FIG. 59 (5900) and method flowchart of FIG. 60 (6000). This separation of AC supplies (5811, 5812) permits optimization of wiring and other hardware associated with the support of the battery charging function. In some embodiments, this circuitry and hardware may be shared among various rack-mounted elements in a single or multiple bays of conventional rack-mounting hardware.

2 AC Source+DC Battery Backup for Redundancy (6100)-(6400)

Figure 61:
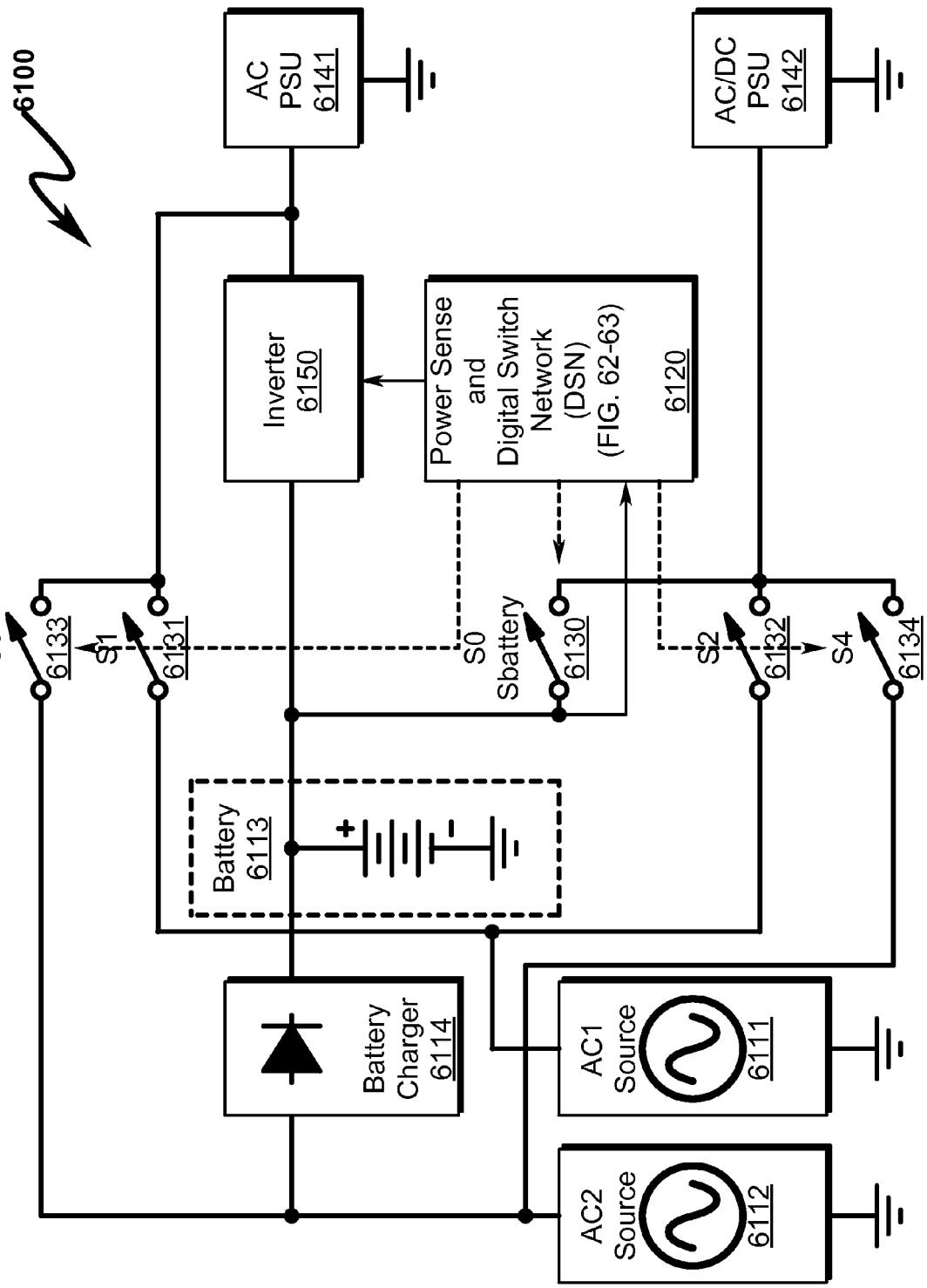
FIG. 61 illustrates a block diagram depicting a preferred exemplary invention system embodiment implementing 2 AC source+DC battery backup for redundancy.
Figure 62:
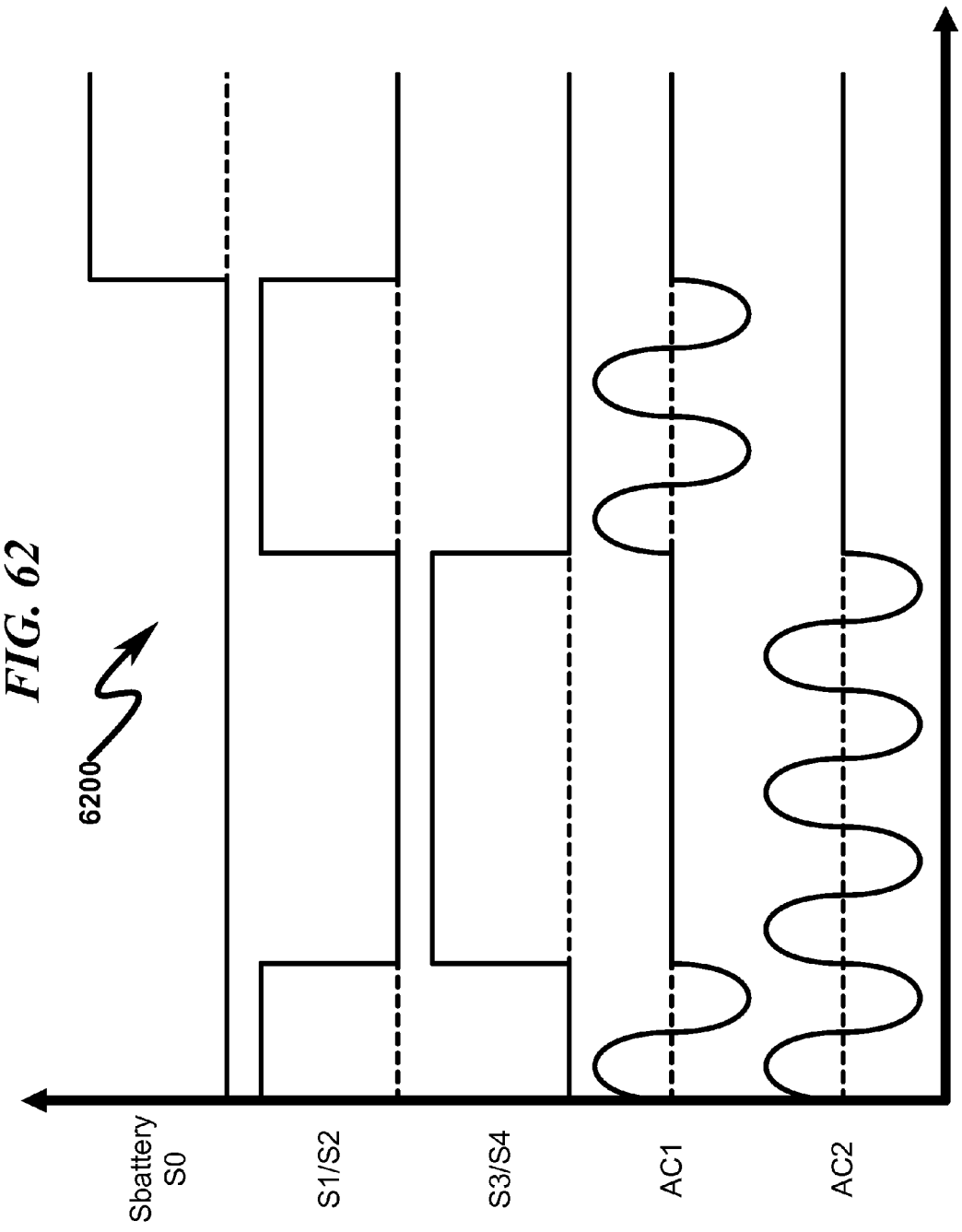
FIG. 62 illustrates a timing diagram depicting a preferred exemplary invention embodiment implementing 2 AC source+DC battery backup for redundancy.

The configuration depicted in FIG. 58 (5800)-FIG. 60 (6000) may be further expanded to incorporate redundancy in the dual AC sources (6111, 6112) as generally depicted in FIG. 61 (6100)-FIG. 64 (6400) by the addition of switches S3 (6133) and S4 (6134). If the primary AC1 source (6111) fails, switches S1 (6131) and S2 (6132) are opened by the DSN (6120) and power is sourced by the secondary AC2 source (6112) by closing switches S3 (6133) and S4 (6134) with the DSN (6120). These control functions are depicted in the timing diagram of FIG. 62 (6200) and method flowcharts of FIG. 63 (6300)-FIG. 64 (6400). Only if both the primary AC1 power source (6111) fails and the secondary AC2 power source (6112) fails are switches S1-S4 (6131, 6132, 6133, 6134) opened by the DSN (6120) and the S0 battery switch (6130) closed by the DSN (6120) to supply power to the inverter (6150) (and the AC load (6141)) and the AC/DC PSU (6142).

Figure 63:
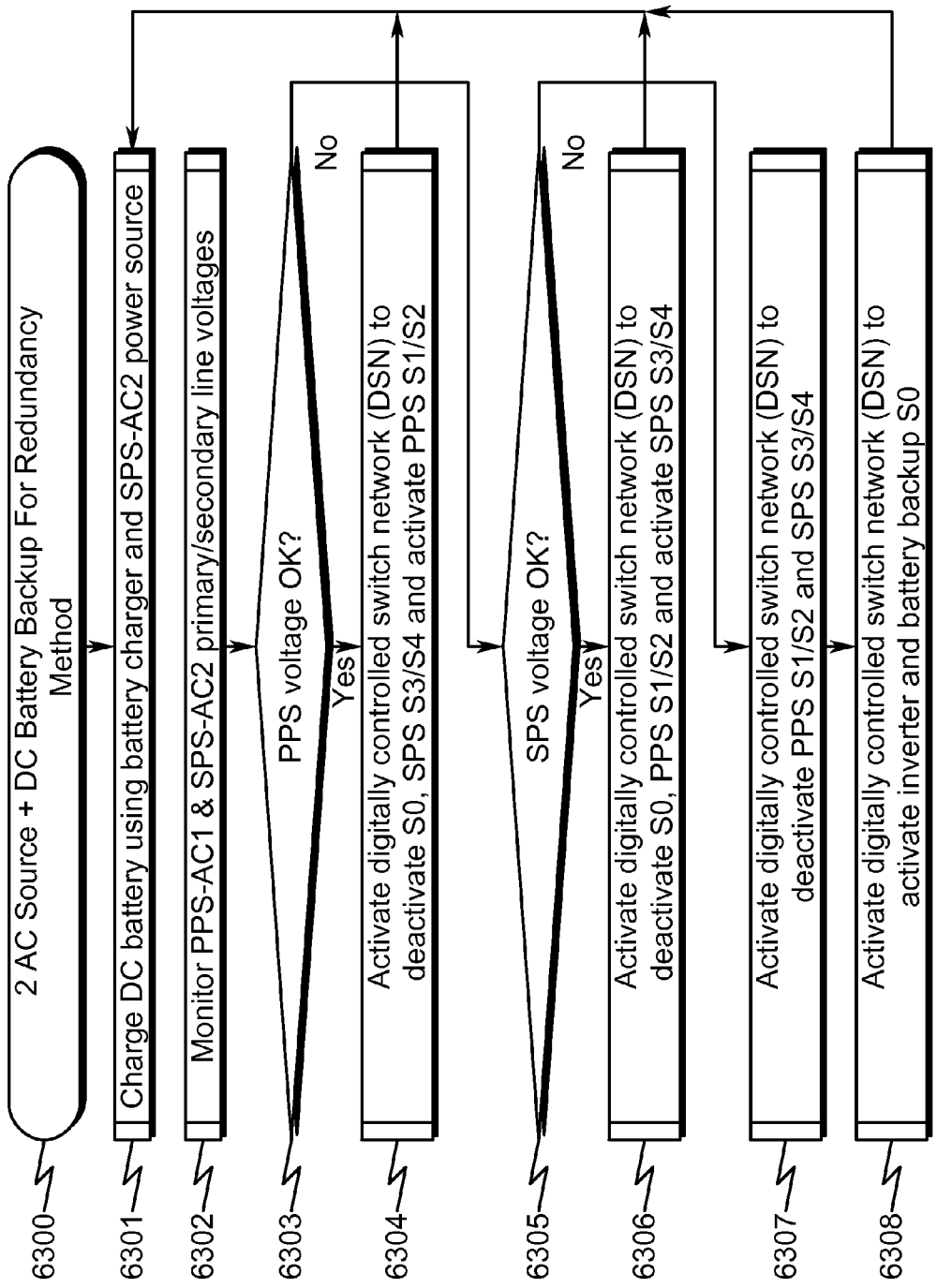
FIG. 63 illustrates a flowchart depicting a preferred exemplary invention method embodiment implementing 2 AC source+DC battery backup for redundancy.

It should be noted that the method flowcharts of FIG. 63 (6300)-FIG. 64 (6400) illustrate how in some circumstances the PPS/SPS transitions may be delayed in some circumstances to coincide with phase transitions of the primary/secondary power sources.

Alternate Battery Power Sources

In some preferred embodiments the battery backup source (BBS) may be replaced by an alternative energy source (renewable, etc.) in which case the SPS supplies operating power to the BBS renewable as compared to charging current for a conventional battery.

Preferred Embodiment System Summary

The present invention preferred exemplary system embodiment anticipates a wide variety of variations in the basic theme of construction, but can be generalized as a power supply output configuration system comprising:
(a) primary AC power source (PPS);
(b) secondary DC power source (SPS);
(c) backup battery charger (BBC);
(d) backup battery source (BBS);
(e) power condition sensing (PCS);
(f) digitally controlled switching network (DSN);
(g) power supply unit (PSU);
(h) AC power supply (APS);
(i) DC-to-AC converter/inverter (DAC);
(j) battery switch (S0);
(k) first switch (S1);
(l) second switch (S2);
(m) third switch (S3); and
(n) fourth switch (S4);
wherein
the BBC is configured to accept power from the SPS and provide charging current to the BBS;
the PCS is configured to periodically sense the power state condition (PSC) of the PPS and the SPS and generate a phase power condition (PPC) status that is electrically coupled to the DSN;
the DAC comprises a DC input port, an AC output port, and a control port;
the DAC DC input port is electrically coupled to the BBS;
the DAC AC output port is electrically coupled to the APS;
the DAC control port is electrically coupled to the DSN;
the S0 switch is electrically coupled between the BBS and the PSU;
the S1 switch is electrically coupled between the PPS and the APS;

the S2 switch is electrically coupled between the PPS and the PSU;

the S3 switch is electrically coupled between the SPS and the APS;

the S4 switch is electrically coupled between the SPS and the PSU;

the DSN is configured to activate the S1 switch and the S2 switch and deactivate the S0 switch, the S3 switch, and the S4 switch if the PPC status indicates the PPS can supply power;

the DSN is configured to activate the S3 switch and the S4 switch and deactivate the S0 switch, the S1 switch, and the S2 switch if the PPC status indicates that the PPS cannot supply power and the SPS can supply power;

the DSN is configured to activate the S0 switch and deactivate the S1 switch, the S2 switch, the S3 switch, and the S4 switch if the PPC status indicates that the PPS cannot supply power and the SPS cannot supply power;

the PSU comprises an AC+DC power supply (ADP);

the ADP comprises a boost converter (BCV) further comprising: a BCV input port and BCV output port;

the BCV is configured to accept AC or DC voltage input at the BCV input port;

the ADP comprises a DC-DC converter (DDC) further comprising: a DDC input port and DDC DC output port;

the BCV output port is electrically coupled to the DDC input port;

the APS is configured to accept AC power from the DAC AC output port;

the APS is configured to deliver power to a first protected load device;

the PSU is configured to accept DC power from the DDC DC output port; and the PSU is configured to deliver power to a second protected load device.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a power supply output configuration method, the method operating in conjunction with a power supply output configuration system comprising:

(a) primary AC power source (PPS);
(b) secondary DC power source (SPS);
(c) backup battery charger (BBC);
(d) backup battery source (BBS);
(e) power condition sensing (PCS);
(f) digitally controlled switching network (DSN);
(g) power supply unit (PSU);
(h) AC power supply (APS);
(i) DC-to-AC converter/inverter (DAC);
(j) battery switch (S0);
(k) first switch (S1);
(l) second switch (S2);
(m) third switch (S3); and
(n) fourth switch (S4);

wherein:
the BBC is configured to accept power from the SPS and provide charging current to the BBS;

the PCS is configured to periodically sense the power state condition (PSC) of the PPS and the SPS and generate a phase power condition (PPC) status that is electrically coupled to the DSN;

the DAC comprises a DC input port, an AC output port, and a control port;

the DAC DC input port is electrically coupled to the BBS;

the DAC AC output port is electrically coupled to the APS;

the DAC control port is electrically coupled to the DSN;

the S0 switch is electrically coupled between the BBS and the PSU;

the S1 switch is electrically coupled between the PPS and the APS;

the S2 switch is electrically coupled between the PPS and the PSU;

the S3 switch is electrically coupled between the SPS and the APS;

the S4 switch is electrically coupled between the SPS and the PSU;

the DSN is configured to activate the S1 switch and the S2 switch and deactivate the S0 switch, the S3 switch, and the S4 switch if the PPC status indicates the PPS can supply power;

the DSN is configured to activate the S3 switch and the S4 switch and deactivate the S0 switch, the S1 switch, and the S2 switch if the PPC status indicates that the PPS cannot supply power and the SPS can supply power;

the DSN is configured to activate the S0 switch and deactivate the S1 switch, the S2 switch, the S3 switch, and the S4 switch if the PPC status indicates that the PPS cannot supply power and the SPS cannot supply power;

the PSU comprises an AC+DC power supply (ADP);

the ADP comprises a boost converter (BCV) further comprising: a BCV input port and BCV output port;

the BCV is configured to accept AC or DC voltage input at the BCV input port;

the ADP comprises a DC-DC converter (DDC) further comprising: a DDC input port and DDC DC output port;

the BCV output port is electrically coupled to the DDC input port;

the APS is configured to accept AC power from the DAC AC output port;

the APS is configured to deliver power to a first protected load device;

the PSU is configured to accept DC power from the DDC DC output port; and the PSU is configured to deliver power to a second protected load device;

wherein: the method comprises the steps of:

(1) with the BBC, supplying power to the BBS;

(2) with the PCS, monitoring the status of line voltage from the PPS and the SPS;

(3) determining if the PPS line voltage is within predetermined limits, and if not, proceeding to step (5);

(4) waiting for the PPS line voltage to stabilize and with the DSN, deactivating the S0 switch, the S3 switch and the S4 switch and activate the S1 switch and the S2 switch and then proceed to step (1);

(5) determining if the SPS line voltage is within predetermined limits, and if not, proceeding to step (7);

(6) waiting for the SPS line voltage to stabilize and with the DSN, deactivating the S0 switch, the S1 switch and the S2 switch and activating the S3 switch and the S4 switch and then proceeding to step (1);

(7) with the DSN, deactivating the S1 switch, the S2 switch, the S3 switch, and the S4 switch;

(8) with the DSN, activating the S0 switch and then proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

The method steps depicted in this preferred embodiment are derived from FIG. 2 (0200). However, these steps can be augmented using alternative methodologies as depicted herein with no loss in the teachings of the present invention.

Alternate Preferred Embodiment System Summary

A present invention alternate preferred exemplary system embodiment utilizing a single PPS source anticipates a wide variety of variations in the basic theme of construction, but can be generalized as a power supply output configuration system comprising:
(a) primary AC power source (PPS);
(b) backup battery charger (BBC);
(c) backup battery source (BBS);
(d) power condition sensing (PCS);
(e) digitally controlled switching network (DSN);
(f) power supply unit (PSU);
(g) AC power supply (APS);
(h) DC-to-AC converter/inverter (DAC);
(i) battery switch (S0);
(j) first switch (S1); and
(k) second switch (S2);
wherein
the BBC is configured to accept power from the PPS and provide current to the BBS;
the PCS is configured to periodically sense the power state condition (PSC) of the PPS and generate a phase power condition (PPC) status that is electrically coupled to the DSN;
the DAC comprises a DC input port, an AC output port, and a control port;
the DAC DC input port is electrically coupled to the BBS;
the DAC AC output port is electrically coupled to the APS;
the DAC control port is electrically coupled to the DSN;
the S0 switch is electrically coupled between the BBS and the PSU;
the S1 switch is electrically coupled between the PPS and the APS;
the S2 switch is electrically coupled between the PPS and the PSU;
the DSN is configured to activate the S1 switch and the S2 switch and deactivate the S0 switch if the PPC status indicates the PPS can supply power;
the DSN is configured to activate the S0 switch and deactivate the S1 switch and the S2 switch if the PPC status indicates that the PPS cannot supply power;
the PSU comprises an AC+DC power supply (ADP);
the ADP comprises a boost converter (BCV) further comprising: a BCV input port and BCV output port;
the BCV is configured to accept AC or DC voltage input at the BCV input port;
the ADP comprises a DC-DC converter (DDC) further comprising: a DDC input port and DDC DC output port;
the BCV output port is electrically coupled to the DDC input port;
the APS is configured to accept AC power from the DAC AC output port;
the APS is configured to deliver power to a first protected load device;
the PSU is configured to accept DC power from the DDC DC output port; and
the PSU is configured to deliver power to a second protected load device.

This general system summary may be augmented by the various elements described herein to produce a wide variety of invention embodiments consistent with this overall design description.

Alternate Preferred Embodiment Method Summary

A present invention alternate preferred exemplary method embodiment utilizing a single PPS source anticipates a wide variety of variations in the basic theme of implementation, but can be generalized as a power supply output configuration method, the method operating in conjunction with a power supply output configuration system comprising:
(a) primary AC power source (PPS);
(b) backup battery charger (BBC);
(c) backup battery source (BBS);
(d) power condition sensing (PCS);
(e) digitally controlled switching network (DSN);
(f) power supply unit (PSU);
(g) AC power supply (APS);
(h) DC-to-AC converter/inverter (DAC);
(i) battery switch (S0);
(j) first switch (S1); and
(k) second switch (S2);
wherein:
the BBC is configured to accept power from the PPS and provide current to the BBS;
the PCS is configured to periodically sense the power state condition (PSC) of the PPS and generate a phase power condition (PPC) status that is electrically coupled to the DSN;
the DAC comprises a DC input port, an AC output port, and a control port;
the DAC DC input port is electrically coupled to the BBS;
the DAC AC output port is electrically coupled to the APS;
the DAC control port is electrically coupled to the DSN;
the S0 switch is electrically coupled between the BBS and the PSU;
the S1 switch is electrically coupled between the PPS and the APS;
the S2 switch is electrically coupled between the PPS and the PSU;
the DSN is configured to activate the S1 switch and the S2 switch and deactivate the S0 switch if the PPC status indicates the PPS can supply power;
the DSN is configured to activate the S0 switch and deactivate the S1 switch, and the S2 switch if the PPC status indicates that the PPS cannot supply power;
the PSU comprises an AC+DC power supply (ADP);
the ADP comprises a boost converter (BCV) further comprising: a BCV input port and BCV output port;
the BCV is configured to accept AC or DC voltage input at the BCV input port;
the ADP comprises a DC-DC converter (DDC) further comprising: a DDC input port and DDC DC output port;

the BCV output port is electrically coupled to the DDC input port;

the APS is configured to accept AC power from the DAC AC output port;

the APS is configured to deliver power to a first protected load device;

the PSU is configured to accept DC power from the DDC DC output port; and the PSU is configured to deliver power to a second protected load device;

wherein: the method comprises the steps of:
(1) with the BBC, supplying power to the BBS;
(2) with the PCS, monitoring the status of line voltage from the PPS;
(3) determining if the PPS line voltage is within predetermined limits, and if not, proceeding to step (5);
(4) waiting for the PPS line voltage to stabilize and with the DSN, deactivating the S0 switch and activate the S1 switch and the S2 switch and then proceed to step (1);
(5) determining if the PPS line voltage is within predetermined limits, and if not, proceeding to step (7);
(6) waiting for the PPS line voltage to stabilize and with the DSN, deactivating the S0 switch, the S1 switch and the S2 switch and then proceeding to step (1);
(7) with the DSN, deactivating the S1 switch, and the S2 switch;
(8) with the DSN, activating the S0 switch and then proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

The method steps depicted in this preferred embodiment are derived from FIG. 2 (0200). However, these steps can be augmented using alternative methodologies as depicted herein with no loss in the teachings of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PPS comprises a three-phase DELTA power source.

An embodiment wherein the PPS comprises a three-phase WYE power source.

An embodiment wherein the PLD comprises a computing device.

An embodiment wherein the PLD comprises a networked computing server.

An embodiment wherein the PPS comprises a single-phase line to phase voltage derived from a three-phase power system.

An embodiment wherein the SPS comprises an energy source selected from a group consisting of: solar panel; fuel cell; flywheel; and alternative energy source.

An embodiment wherein the SPS comprises a battery.

An embodiment wherein the SPS comprises a battery with battery chemistry selected from a chemical group consisting of: lead acid; lithium iron; nickel cadmium; sodium sulfur; vanadium redox; nickel cadmium; and alkaline.

An embodiment wherein the system further comprises an unprotected PSU electrically coupled to the PPS.

An embodiment wherein the DSN further comprises a manual bypass switch.

An embodiment wherein the DSN further comprises an automatic bypass switch.

An embodiment wherein the DSN further comprises redundant bypass switches.

An embodiment wherein the SPS further comprises battery and charging rectifier.

An embodiment wherein the SPS further comprises an AC power source supplying a battery charger/battery combination.

An embodiment wherein the SPS further comprises: an AC power source supplying a battery charger/battery combination; and an unprotected PSU electrically coupled to the battery.

An embodiment wherein the SPS further comprises: an AC power source supplying a battery charger/battery combination; and an unprotected PSU electrically coupled to the PPS.

An embodiment further comprising: a battery configured to act as a tertiary supply of power to the PSU.

An embodiment further comprising: a battery configured to act as a tertiary supply of power to the PSU and incorporating an unprotected PSU electrically coupled to the PPS.

An embodiment further comprising: a battery configured to be charged with an energy source selected from a group consisting of: solar panel; fuel cell; flywheel; and alternative energy source.

An embodiment wherein the SPS further comprises: an AC power source supplying a battery charger/battery combination; and an unprotected PSU electrically coupled to the SPS and bypass switch coupling the PSU and the AC power source.

An embodiment wherein the SPS further comprises: an AC power source supplying a battery charger/battery combination; incorporating an unprotected PSU electrically coupled to the SPS; a bypass switch coupling the PSU and the AC power source; and an unprotected PSU electrically coupled to the AC power source.

An embodiment wherein the PPS and the SPS comprise 3-phase power sources.

An embodiment wherein the PPS comprises a 3-phase power source and the SPS comprises a battery.

An embodiment wherein the PPS comprises a 3-phase power source and the SPS comprises a battery and 3-phase charging rectifier electrically coupled to the PPS 3-phase power source.

An embodiment wherein the PPS comprises a 3-phase power source and the SPS comprises a battery and 3-phase charging rectifier electrically coupled to an alternate 3-phase power source.

An embodiment wherein the PPS comprises a 3-phase power source and the SPS comprises a battery and incorporating an unprotected PSU electrically coupled to a single phase of the 3-phase power source.

An embodiment wherein the PPS comprises a 3-phase power source and the SPS comprises a battery and 3-phase charging rectifier electrically coupled to an alternate 3-phase power source and incorporating an unprotected PSU electrically coupled to a single phase of the 3-phase power source.

An embodiment wherein the PPS comprises a 3-phase power source and the SPS comprises a battery and 3-phase charging rectifier electrically coupled to an alternate 3-phase power source and incorporating an unprotected PSU electrically coupled to a single phase of the battery.

An embodiment wherein the PPS comprises a 3-phase power source and the SPS comprises a battery and 3-phase charging rectifier electrically coupled to an alternate 3-phase power source and incorporating a protected PSU electrically coupled to the battery.

An embodiment wherein the PPS comprises a three-phase DELTA power source.

An embodiment wherein the PPS comprises a three-phase WYE power source.

An embodiment wherein the PPS comprises a single-phase line to phase voltage derived from a three-phase power system.

An embodiment wherein the BBS comprises an energy source selected from a group consisting of: solar panel; fuel cell; flywheel; and alternative energy source.

An embodiment wherein the BBS comprises a battery.

An embodiment wherein the BBS comprises a battery with battery chemistry selected from a chemical group consisting of: lead acid; lithium iron; nickel cadmium; sodium sulfur; vanadium redox; nickel cadmium; and alkaline.

An embodiment wherein the S1 switch and the S2 switch are transitioned on a phase transition of the PPS.

An embodiment wherein the S3 switch and the S4 switch are transitioned on a phase transition of the SPS.

An embodiment wherein the S0 switch is transitioned on a phase transition of the PPS or the SPS.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A power supply output configuration system/method providing a digitally controlled uninterruptable power supply (UPS) to protected load devices (PLD) configured as power supply units (PSU) serviced by one or more power supply sources (PSS) has been disclosed. The system generally includes a number of power supply sources (PSS) that are monitored by power condition sensing (PCS) circuitry that determines individual power source states within the PSS. This physical state information is used by a digitally controlled switching network (DSN) that reconfigures the electrical connections between the PSS and the individual PLD elements to properly route power from the PSS to the PLD in the event of individual PSS failures. The DSN receives phase/voltage state information from the PSS to ensure that current between the PSS and PLD is transferred in a synchronized manner and that PSS resources are properly protected during the switching transition.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A power supply output configuration system comprising:
    (a) primary AC power source (PPS);
    (b) secondary DC power source (SPS);
    (c) backup battery charger (BBC);
    (d) backup battery source (BBS);
    (e) power condition sensing (PCS);
    (f) digitally controlled switching network (DSN);
    (g) power supply unit (PSU);
    (h) AC power supply (APS);
    (i) DC-to-AC converter/inverter (DAC);
    (j) battery switch (S0);
    (k) first switch (S1);
    (l) second switch (S2);
    (m) third switch (S3); and
    (n) fourth switch (S4);
    wherein
    said BBC is configured to accept power from said SPS and provide current to said BBS;
    said PCS is configured to periodically sense the power state condition (PSC) of said PPS and said SPS and generate a phase power condition (PPC) status that is electrically coupled to said DSN;
    said DAC comprises a DC input port, an AC output port, and a control port;
    said DAC DC input port is electrically coupled to said BBS;
    said DAC AC output port is electrically coupled to said APS;
    said DAC control port is electrically coupled to said DSN;
    said S0 switch is electrically coupled between said BBS and said PSU;
    said S1 switch is electrically coupled between said PPS and said APS;
    said S2 switch is electrically coupled between said PPS and said PSU;
    said S3 switch is electrically coupled between said SPS and said APS;
    said S4 switch is electrically coupled between said SPS and said PSU;
    said DSN is configured to activate said S1 switch and said S2 switch and deactivate said S0 switch, said S3 switch, and said S4 switch if said PPC status indicates said PPS can supply power;
    said DSN is configured to activate said S3 switch and said S4 switch and deactivate said S0 switch, said S1 switch, and said S2 switch if said PPC status indicates that said PPS cannot supply power and said SPS can supply power;
    said DSN is configured to activate said S0 switch and deactivate said S1 switch, said S2 switch, said S3 switch, and said S4 switch if said PPC status indicates that said PPS cannot supply power and said SPS cannot supply power;
    said PSU comprises an AC+DC power supply (ADP);
    said ADP comprises a boost converter (BCV) further comprising: a BCV input port and BCV output port;
    said BCV is configured to accept AC or DC voltage input at said BCV input port;
    said ADP comprises a DC-DC converter (DDC) further comprising: a DDC input port and DDC DC output port;
    said BCV output port is electrically coupled to said DDC input port;
    said APS is configured to accept AC power from said DAC AC output port;
    said APS is configured to deliver power to a first protected load device;
    said PSU is configured to accept DC power from said DDC DC output port; and
    said PSU is configured to deliver power to a second protected load device.

2. The power supply output configuration system of claim 1 wherein said PPS comprises a three-phase DELTA power source.

3. The power supply output configuration system of claim 1 wherein said PPS comprises a three-phase WYE power source.

4. The power supply output configuration system of claim 1 wherein said PPS comprises a single-phase line to phase voltage derived from a three-phase power system.

5. The power supply output configuration system of claim 1 wherein said BBS comprises an energy source selected from a group consisting of: solar panel; fuel cell; flywheel; and alternative energy source.

6. The power supply output configuration system of claim 1 wherein said BBS comprises a battery.

7. The power supply output configuration system of claim 1 wherein said BBS comprises a battery with battery chemistry selected from a chemical group consisting of: lead acid; lithium iron; nickel cadmium; sodium sulfur; vanadium redox; nickel cadmium; and alkaline.

8. The power supply output configuration system of claim 1 wherein said S1 switch and said S2 switch are transitioned on a phase transition of said PPS.

9. The power supply output configuration system of claim 1 wherein said S3 switch and said S4 switch are transitioned on a phase transition of said SPS.

10. The power supply output configuration system of claim 1 wherein said S0 switch is transitioned on a phase transition of said PPS or said SPS.

11. A power supply output configuration method, said method operating in conjunction with a power supply output configuration system, said system comprising:
    (a) primary AC power source (PPS);
    (b) secondary DC power source (SPS);
    (c) backup battery charger (BBC);
    (d) backup battery source (BBS);
    (e) power condition sensing (PCS);
    (f) digitally controlled switching network (DSN);
    (g) power supply unit (PSU);
    (h) AC power supply (APS);
    (i) DC-to-AC converter/inverter (DAC);
    (j) battery switch (S0);
    (k) first switch (S1);
    (l) second switch (S2);
    (m) third switch (S3); and
    (n) fourth switch (S4);

wherein:

said BBC is configured to accept power from said SPS and provide current to said BBS;

said PCS is configured to periodically sense the power state condition (PSC) of said PPS and said SPS and generate a phase power condition (PPC) status that is electrically coupled to said DSN;

said DAC comprises a DC input port, an AC output port, and a control port;

said DAC DC input port is electrically coupled to said BBS;

said DAC AC output port is electrically coupled to said APS;

said DAC control port is electrically coupled to said DSN;

said S0 switch is electrically coupled between said BBS and said PSU;

said S1 switch is electrically coupled between said PPS and said APS;

said S2 switch is electrically coupled between said PPS and said PSU;

said S3 switch is electrically coupled between said SPS and said APS;

said S4 switch is electrically coupled between said SPS and said PSU;

said DSN is configured to activate said S1 switch and said S2 switch and deactivate said S0 switch, said S3 switch, and said S4 switch if said PPC status indicates said PPS can supply power;

said DSN is configured to activate said S3 switch and said S4 switch and deactivate said S0 switch, said S1 switch, and said S2 switch if said PPC status indicates that said PPS cannot supply power and said SPS can supply power;

said DSN is configured to activate said S0 switch and deactivate said S1 switch, said S2 switch, said S3 switch, and said S4 switch if said PPC status indicates that said PPS cannot supply power and said SPS cannot supply power;

said PSU comprises an AC+DC power supply (ADP);

said ADP comprises a boost converter (BCV) further comprising: a BCV input port and BCV output port;

said BCV is configured to accept AC or DC voltage input at said BCV input port;

said ADP comprises a DC-DC converter (DDC) further comprising: a DDC input port and DDC DC output port;

said BCV output port is electrically coupled to said DDC input port;

said APS is configured to accept AC power from said DAC AC output port;

said APS is configured to deliver power to a first protected load device;

said PSU is configured to accept DC power from said DDC DC output port; and said PSU is configured to deliver power to a second protected load device;

wherein: said method comprises the steps of:
(1) with said BBC, supplying power to said BBS;
(2) with said PCS, monitoring the status of line voltage from said PPS and said SPS;
(3) determining if said PPS line voltage is within predetermined limits, and if not, proceeding to step (5);
(4) waiting for said PPS line voltage to stabilize and with said DSN, deactivating said S0 switch, said S3 switch and said S4 switch and activate said S1 switch and said S2 switch and then proceed to step (1);
(5) determining if said SPS line voltage is within predetermined limits, and if not, proceeding to step (7);
(6) waiting for said SPS line voltage to stabilize and with said DSN, deactivating said S0 switch, said S1 switch and said S2 switch and activating said S3 switch and said S4 switch and then proceeding to step (1);
(7) with said DSN, deactivating said S1 switch, said S2 switch, said S3 switch, and said S4 switch;
(8) with said DSN, activating said S0 switch and then proceeding to step (1).

12. The power supply output configuration method of claim 11 wherein said PPS comprises a three-phase DELTA power source.

13. The power supply output configuration method of claim 11 wherein said PPS comprises a three-phase WYE power source.

14. The power supply output configuration method of claim 11 wherein said PPS comprises a single-phase line to phase voltage derived from a three-phase power source.

15. The power supply output configuration method of claim 11 wherein said BBS comprises an energy source selected from a group consisting of: solar panel; fuel cell; flywheel; and alternative energy source.

16. The power supply output configuration method of claim 11 wherein said BBS comprises a battery.

17. The power supply output configuration method of claim 11 wherein said BBS comprises a battery with battery chemistry selected from a chemical group consisting of: lead acid; lithium iron; nickel cadmium; sodium sulfur; vanadium redox; nickel cadmium; and alkaline.

18. The power supply output configuration method of claim wherein said S1 switch and said S2 switch are transitioned on a phase transition of said PPS.

19. The power supply output configuration method of claim 11 wherein said S3 switch and said S4 switch are transitioned on a phase transition of said SPS.

20. The power supply output configuration method of claim 11 wherein said S0 switch is transitioned on a phase transition of said PPS or said SPS.

21. A power supply output configuration system comprising:
(a) primary AC power source (PPS);
(b) backup battery charger (BBC);
(c) backup battery source (BBS);
(d) power condition sensing (PCS);
(e) digitally controlled switching network (DSN);
(f) power supply unit (PSU);
(g) AC power supply (APS);
(h) DC-to-AC converter/inverter (DAC);
(i) battery switch (S0);
(j) first switch (S1); and
(k) second switch (S2);
wherein said BBC is configured to accept power from said PPS and provide current to said BBS;

said PCS is configured to periodically sense the power state condition (PSC) of said PPS and generate a phase power condition (PPC) status that is electrically coupled to said DSN;

said DAC comprises a DC input port, an AC output port, and a control port;

said DAC DC input port is electrically coupled to said BBS;

said DAC AC output port is electrically coupled to said APS;

said DAC control port is electrically coupled to said DSN;

said S0 switch is electrically coupled between said BBS and said PSU;
said S1 switch is electrically coupled between said PPS and said APS;
said S2 switch is electrically coupled between said PPS and said PSU;
said DSN is configured to activate said S1 switch and said S2 switch and deactivate said S0 switch if said PPC status indicates said PPS can supply power;
said DSN is configured to activate said S0 switch and deactivate said S1 switch and said S2 switch if said PPC status indicates that said PPS cannot supply power;
said PSU comprises an AC+DC power supply (ADP);
said ADP comprises a boost converter (BCV) further comprising: a BCV input port and BCV output port;
said BCV is configured to accept AC or DC voltage input at said BCV input port;
said ADP comprises a DC-DC converter (DDC) further comprising: a DDC input port and DDC DC output port;
said BCV output port is electrically coupled to said DDC input port;
said APS is configured to accept AC power from said DAC AC output port;
said APS is configured to deliver power to a first protected load device;
said PSU is configured to accept DC power from said DDC DC output port; and
said PSU is configured to deliver power to a second protected load device.

22. The power supply output configuration system of claim 21 wherein said PPS comprises a three-phase DELTA power source.

23. The power supply output configuration system of claim 21 wherein said PPS comprises a three-phase WYE power source.

24. The power supply output configuration system of claim 21 wherein said PPS comprises a single-phase line to phase voltage derived from a three-phase power system.

25. The power supply output configuration system of claim 21 wherein said BBS comprises an energy source selected from a group consisting of: solar panel; fuel cell; flywheel; and alternative energy source.

26. The power supply output configuration system of claim 21 wherein said BBS comprises a battery.

27. The power supply output configuration system of claim 21 wherein said BBS comprises a battery with battery chemistry selected from a chemical group consisting of: lead acid; lithium iron; nickel cadmium; sodium sulfur; vanadium redox; nickel cadmium; and alkaline.

28. The power supply output configuration system of claim wherein said S1 switch and said S2 switch are transitioned on a phase transition of said PPS.

29. The power supply output configuration system of claim 21 wherein said S1 switch is transitioned on a SPS phase transition of said PPS.

30. The power supply output configuration system of claim 21 wherein said S2 switch is transitioned on a phase transition of said PPS.

31. A power supply output configuration method, said method operating in conjunction with a power supply output configuration system, said system comprising:
(a) primary AC power source (PPS);
(b) backup battery charger (BBC);
(c) backup battery source (BBS);
(d) power condition sensing (PCS);
(e) digitally controlled switching network (DSN);
(f) power supply unit (PSU);
(g) AC power supply (APS);
(h) DC-to-AC converter/inverter (DAC);
(i) battery switch (S0);
(j) first switch (S1); and
(k) second switch (S2);
wherein:
said BBC is configured to accept power from said PPS and provide current to said BBS;
said PCS is configured to periodically sense the power state condition (PSC) of said PPS and generate a phase power condition (PPC) status that is electrically coupled to said DSN;
said DAC comprises a DC input port, an AC output port, and a control port;
said DAC DC input port is electrically coupled to said BBS;
said DAC AC output port is electrically coupled to said APS;
said DAC control port is electrically coupled to said DSN;
said S0 switch is electrically coupled between said BBS and said PSU;
said S1 switch is electrically coupled between said PPS and said APS;
said S2 switch is electrically coupled between said PPS and said PSU;
said DSN is configured to activate said S1 switch and said S2 switch and deactivate said S0 switch if said PPC status indicates said PPS can supply power;
said DSN is configured to activate said S0 switch and deactivate said S1 switch, and said S2 switch if said PPC status indicates that said PPS cannot supply power;
said PSU comprises an AC+DC power supply (ADP);
said ADP comprises a boost converter (BCV) further comprising: a BCV input port and BCV output port;
said BCV is configured to accept AC or DC voltage input at said BCV input port;
said ADP comprises a DC-DC converter (DDC) further comprising: a DDC input port and DDC DC output port;
said BCV output port is electrically coupled to said DDC input port;
said APS is configured to accept AC power from said DAC AC output port;
said APS is configured to deliver power to a first protected load device;
said PSU is configured to accept DC power from said DDC DC output port; and
said PSU is configured to deliver power to a second protected load device;
wherein: said method comprises the steps of:
(1) with said BBC, supplying power to said BBS;
(2) with said PCS, monitoring the status of line voltage from said PPS;
(3) determining if said PPS line voltage is within predetermined limits, and if not, proceeding to step (5);
(4) waiting for said PPS line voltage to stabilize and with said DSN, deactivating said S0 switch and activate said S1 switch and said S2 switch and then proceed to step (1);
(5) determining if said PPS line voltage is within predetermined limits, and if not, proceeding to step (7);
(6) waiting for said PPS line voltage to stabilize and with said DSN, deactivating said S0 switch, said S1 switch and said S2 switch and then proceeding to step (1);

(7) with said DSN, deactivating said S1 switch, and said S2 switch;

(8) with said DSN, activating said S0 switch and then proceeding to step (1).

32. The power supply output configuration method of claim 31 wherein said PPS comprises a three-phase DELTA power source.

33. The power supply output configuration method of claim 31 wherein said PPS comprises a three-phase WYE power source.

34. The power supply output configuration method of claim 31 wherein said PPS comprises a single-phase line to phase voltage derived from a three-phase power source.

35. The power supply output configuration method of claim 31 wherein said BBS comprises an energy source selected from a group consisting of: solar panel; fuel cell; flywheel; and alternative energy source.

36. The power supply output configuration method of claim 31 wherein said BBS comprises a battery.

37. The power supply output configuration method of claim 31 wherein said BBS comprises a battery with battery chemistry selected from a chemical group consisting of: lead acid; lithium iron; nickel cadmium; sodium sulfur; vanadium redox; nickel cadmium; and alkaline.

38. The power supply output configuration method of claim wherein said S1 switch and said S2 switch are transitioned on a phase transition of said PPS.

39. The power supply output configuration method of claim 31 wherein said S1 switch is transitioned on a phase transition of said PPS.

40. The power supply output configuration method of claim 31 wherein said S2 switch is transitioned on a phase transition of said PPS.

* * * * *